US005138669A

United States Patent [19]

Shimura et al.

[11] Patent Number: 5,138,669

[45] Date of Patent: Aug. 11, 1992

[54] RANGE-CONDITIONAL CHARACTER STRING RETRIEVING METHOD AND SYSTEM

[75] Inventors: Takanori Shimura, Koganei; Hisamitsu Kawaguchi, Hachioji; Kanji Kato, Tokorozawa; Atsushi Hatakeyama, Kokubunji; Mitsuru Akizawa, Hachioji, all of Japan

[73] Assignee: Hitachi, Ltd., Tokyo, Japan

[21] Appl. No.: 724,161

[22] Filed: Jul. 1, 1991

Related U.S. Application Data

[63] Continuation-in-part of Ser. No. 555,483, Aug. 9, 1990.

[30] Foreign Application Priority Data

Jun. 29, 1990 [JP] Japan ........ 2-169747
Jul. 4, 1990 [JP] Japan ........ 2-175208
Jul. 4, 1990 [JP] Japan ........ 2-175213

[51] Int. Cl.[5] ........ G06K 9/68
[52] U.S. Cl. ........ 382/37
[58] Field of Search ........ 382/10–14, 382/36–37; 364/513, 200

[56] References Cited

U.S. PATENT DOCUMENTS 4,241,402 12/1980 Mayper, Jr. et al. ........ 364/225

OTHER PUBLICATIONS

R. A. Haskin & L. A. Hollaar, "Operational Characteristics of a Hardware-Based Pattern Matcher" ACM Trans. on Database Systems, vol. 8, #1 (1983).

*Primary Examiner*—Stephen Brinich
*Attorney, Agent, or Firm*—Antonelli, Terry, Stout & Kraus

[57] ABSTRACT

A range-conditional character string retrieving method and system capable of performing retrieval of a numerical value from a character string at an increased speed by shortening the time taken for generation of finite automaton, range condition retrieval for a character string containing admixedly numeric characters and non-numeric characters such as alphabetic letters and highly intelligent retrieval of a numerical value with designation of preceding and succeeding characters. Given range condition is partitioned in accordance with difference in the digit number between upper and lower limit values, whereon retrieval is performed in each of partitioned ranges in parallel. When a finite automaton transits from a predetermined state to at least two state in dependence on the result of collation of a character string subjected to retrieval, conditions for the state transitions are designated in terms of corresponding codes. A numerical value detecting unit for detecting a numerical value of interest from the character string subjected to retrieval is provided in association with a range decision unit for deciding whether the numerical value detected by the numerical value detecting unit falls within a specified range. A character string collating unit for retrieving a specific character string from the string subjected to retrieval is provided in association with a range condition collating unit for detecting a numerical value falling within a specific range from the specific character string.

34 Claims, 74 Drawing Sheets

F I G. 1
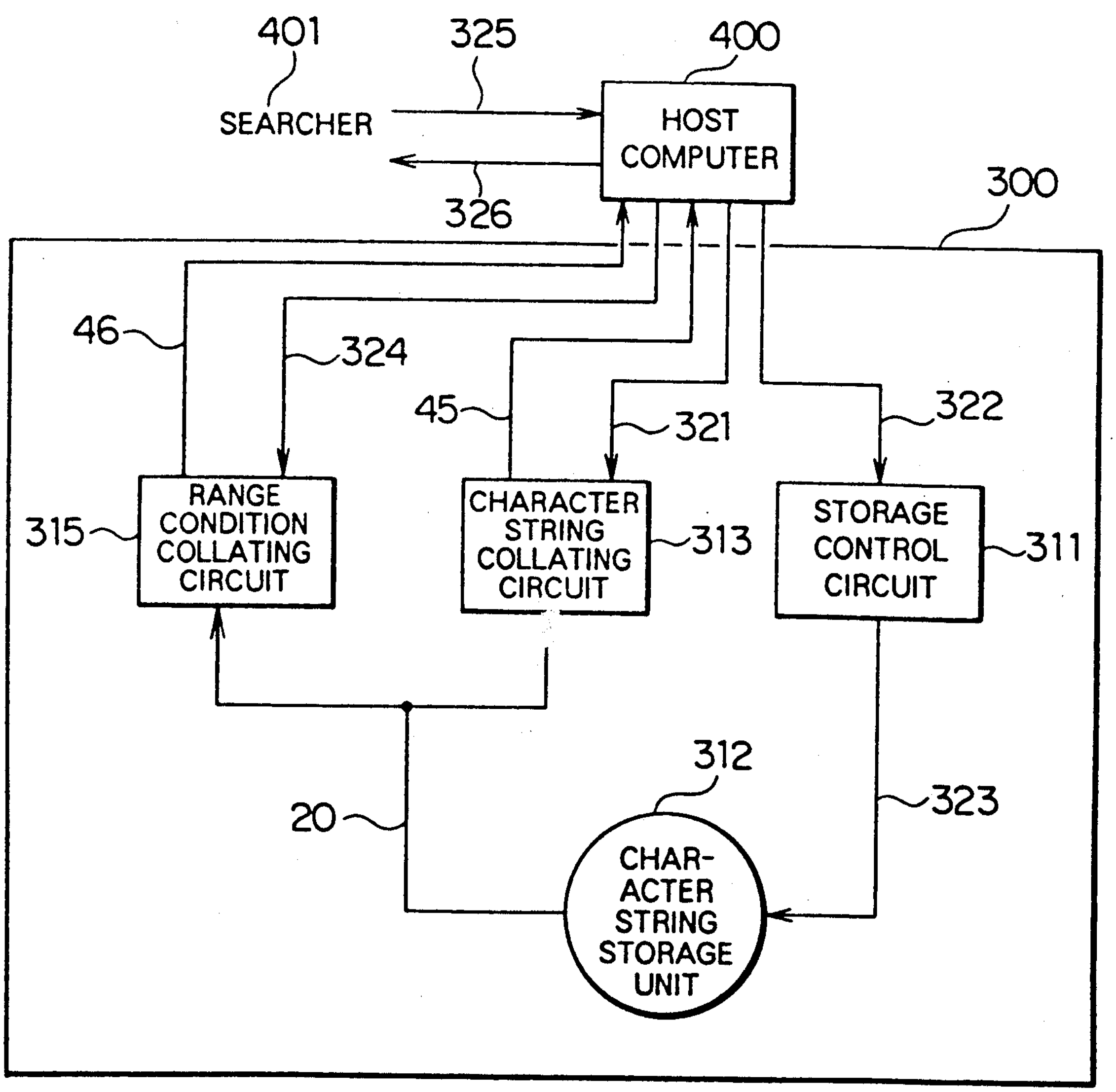

| STATE | RESULT OF COMPARATIVE COLLATION | | | | | | | |
|---|---|---|---|---|---|---|---|---|
| | MIN | RANGE 1 | LOWER | RANGE 2 | UPPER | RANGE 3 | MAX | FAIL |
| 0 | (0) 0 | ø | (1) 1 | (2) 2 | (3) 3 | (4~8) | (9) | 0 |
| 1 | (0) 7 | (1) 7 | (2) 4 | (3~4) 5 | (5) 5 | (6~8) 5 | (9) 5 | 0 |
| 2 | (0) 5 | (1) 5 | (2) 5 | (3~4) 5 | (5) 5 | (6~8) 5 | (9) 5 | 0 |
| 3 | (0) 5 | (1) 5 | (2) 5 | (3~4) 5 | (5) 6 | (6~8) 7 | (9) 7 | 0 |
| 4 | (0) 7 | (1) 7 | (2) 7 | (3~4) 7 | (5) 7 | (6~8) 7 | (9) 7 | ◎ |
| 5 | (0) 7 | (1) 7 | (2) 7 | (3~4) 7 | (5) 7 | (6~8) 7 | (9) 7 | ◎ |
| 6 | (0) 7 | (1) 7 | (2) 7 | (3~4) 7 | (5) 7 | (6~8) 7 | (9) 7 | ◎ |
| 7 | (0) 7 | (1) 7 | (2) 7 | (3~4) 7 | (5) 7 | (6~8) 7 | (9) 7 | 0 |

5

CONDITION FOR TRANSITION

DESTINATION STATE OF TRANSITION

STATE IN WHICH NUMERICAL VALUE SATISFYING RANGE CONDITION HAS BEEN DETECTED AND RETRIEVED RESULT 925 IS OUTPUTED

| | STATE | RESULT OF COMPARATIVE COLLATION | | | | | | | |
|---|---|---|---|---|---|---|---|---|---|
| | | MIN | RANGE 1 | LOWER | RANGE 2 | UPPER | RANGE 3 | MAX | FAIL |
| 1ST DIGIT | 0 | (0) 0 | ϕ | (1) 1 | (2~8) 2 | (9) 2 | ϕ | (9) 2 | O |
| 2ND DIGIT | 1 | (0) 5 | (1~4) 5 | (5) 3 | (6~8) 4 | (9) 4 | ϕ | (9) 4 | O |
| 2ND DIGIT | 2 | (0) 4 | (1~4) 4 | (5) 4 | (6~8) 4 | (9) 4 | ϕ | (9) 4 | O |
| DETECTION OF OTHER THAN NUMERAL | 3 | (0) 5 | (1~4) 5 | (5) 5 | (6~8) 5 | (9) 5 | ϕ | (9) 5 | ◎ |
| DETECTION OF OTHER THAN NUMERAL | 4 | (0) 5 | (1~4) 5 | (5) 5 | (6~8) 5 | (9) 5 | ϕ | (9) 5 | ◎ |
| SKIP OF NUMERAL | 5 | (0) 5 | (1~4) 5 | (5) 5 | (6~8) 5 | (9) 5 | ϕ | (9) 5 | O |
| | 6 | | | | | | | | |
| | 7 | | | | | | | | |
| | 8 | | | | | | | | |
| | 9 | | | | | | | | |
| | 10 | | | | | | | | |
| | 11 | | | | | | | | |
| | 12 | | | | | | | | |
| | 13 | | | | | | | | |

CONDITION FOR TRANSITION

DESTINATION STATE OF TRANSITION

STATE IN WHICH NUMERICAL VALUE SATISFYING RANGE CONDITION HAS BEEN DETECTED AND RETRIEVED RESULT 925 IS OUTPUTTED

| | STATE | RESULT OF COMPARATIVE COLLATION | | | | | | | |
|---|---|---|---|---|---|---|---|---|---|
| | | MIN | RANGE 1 | LOWER | RANGE 2 | UPPER | RANGE 3 | MAX | FAIL |
| 1ST DIGIT | 0 | (0) 0 | ø | (1) 1 | ø | (1) 1 | (2~8) 6 | (9) 6 | 0 |
| 2ND DIGIT | 1 | (0) 2 | ø | (0) 2 | (1~3) 2 | (4) 3 | (5~8) 6 | (9) 6 | 0 |
| 3RD DIGIT | 2 | (0) 4 | ø | (0) 4 | (1) 4 | (2) 4 | (3~8) 4 | (9) 4 | 0 |
| | 3 | (0) 4 | ø | (0) 4 | (1) 4 | (2) 5 | (3~8) 6 | (9) 6 | 0 |
| DETECTION OF OTHER THAN NUMERAL | 4 | (0) 6 | ø | (0) 6 | (1) 6 | (2) 6 | (3~8) 6 | (9) 6 | ◎ |
| | 5 | (0) 6 | ø | (0) 6 | (1) 6 | (2) 6 | (3~8) 6 | (9) 6 | ◎ |
| SKIP OF NUMERAL | 6 | (0) 6 | ø | (0) 6 | (1) 6 | (2) 6 | (3~8) 6 | (9) 6 | 0 |
| | 7 | | | | | | | | |
| | 8 | | | | | | | | |
| | 9 | | | | | | | | |
| | 10 | | | | | | | | |
| | 11 | | | | | | | | |
| | 12 | | | | | | | | |
| | 13 | | | | | | | | |

EXAMPLE 1

PARTITIONING OF RANGE CONDITION TO THREE SUBRANGES $12 \leqq K \leqq 34567 \longrightarrow$ ① $12 \leqq K_1 \leqq 99$ ② $100 \leqq K_2 \leqq 9999$ ③ $10000 \leqq K_3 \leqq 34567$

| | STATE | RESULT OF COMPARATIVE COLLATION | | | | | | | |
|---|---|---|---|---|---|---|---|---|---|
| | | MIN | RANGE 1 | LOWER | RANGE 2 | UPPER | RANGE 3 | MAX | FAIL |
| 1ST DIGIT | 0 | (0) 0 | ϕ | (1) 1 | (2~8) 2 | (9) 2 | ϕ | (9) 2 | O |
| 2ND DIGIT | 1 | (0) 5 | (1) 5 | (2) 3 | (3~8) 4 | (9) 4 | ϕ | (9) 4 | O |
| | 2 | (0) 4 | (1) 4 | (2) 4 | (3~8) 4 | (9) 4 | ϕ | (9) 4 | O |
| DETECTION OF OTHER THAN NUMERICAL | 3 | (0) 5 | (1) 5 | (2) 5 | (3~8) 5 | (9) 5 | ϕ | (9) 5 | ◎ |
| | 4 | (0) 5 | (1) 5 | (2) 5 | (3~8) 5 | (9) 5 | ϕ | (9) 5 | ◎ |
| SKIP OF NUMERICAL | 5 | (0) 5 | (1) 5 | (2) 5 | (3~8) 5 | (9) 5 | ϕ | (9) 5 | O |
| | 6 | | | | | | | | |
| | 7 | | | | | | | | |
| | 8 | | | | | | | | |
| | 9 | | | | | | | | |
| | 10 | | | | | | | | |
| | 11 | | | | | | | | |
| | 12 | | | | | | | | |
| | 13 | | | | | | | | |

CODITION FOR TRANSITION

DESTINATION STATE OF TRANSITION

STATE IN WHICH NUMERICAL VALUE SATISFYING RANGE CONDITION HAS BEEN DETECTED

| | STATE | RESULT OF COMPARATIVE COLLATION | | | | | | | |
|---|---|---|---|---|---|---|---|---|---|
| | | MIN | RANGE 1 | LOWER | RANGE 2 | UPPER | RANGE 3 | MAX | FAIL |
| 1ST DIGIT | 0 | (0) 0 | ϕ | (1) 1 | (2~8) 1 | (9) 1 | ϕ | (9) 1 | O |
| 2ND DIGIT | 1 | (0) 2 | ϕ | (0) 2 | (1~8) 2 | (9) 2 | ϕ | (9) 2 | O |
| 3RD DIGIT | 2 | (0) 3 | ϕ | (0) 3 | (1~8) 3 | (9) 3 | ϕ | (9) 3 | O |
| 4TH DIGIT | 3 | (0) 4 | ϕ | (0) 4 | (1~8) 4 | (9) 4 | ϕ | (9) 4 | ◎ |
| DETECTION OF OTHER THAN NUMERAL | 4 | (0) 5 | ϕ | (0) 5 | (1~8) 5 | (9) 5 | ϕ | (9) 5 | ◎ |
| SKIP OF NUMERAL | 5 | (0) 5 | ϕ | (0) 5 | (1~8) 5 | (9) 5 | ϕ | (1) 5 | O |
| | 6 | | | | | | | | |
| | 7 | | | | | | | | |
| | 8 | | | | | | | | |
| | 9 | | | | | | | | |
| | 10 | | | | | | | | |
| | 11 | | | | | | | | |
| | 12 | | | | | | | | |
| | 13 | | | | | | | | |

| | STATE | RESULT OF COMPARATIVE COLLATION | | | | | | | |
|---|---|---|---|---|---|---|---|---|---|
| | | MIN | RANGE 1 | LOWER | RANGE 2 | UPPER | RANGE 3 | MAX | FAIL |
| 1ST DIGIT | 0 | (0) 0 | ø | (1) 1 | (2) 1 | (3) 2 | (4~8) 11 | (9) 11 | 0 |
| 2ND DIGIT | 1 | (0) 3 | ø | (0) 3 | (1~3) 3 | (4) 3 | (5~8) 3 | (9) 3 | 0 |
| | 2 | (0) 3 | ø | (0) 3 | (1~3) 3 | (4) 4 | (5~8) 11 | (9) 11 | 0 |
| 3RD DIGIT | 3 | (0) 5 | ø | (0) 5 | (1~4) 5 | (5) 5 | (6~8) 5 | (9) 5 | 0 |
| | 4 | (0) 5 | ø | (0) 5 | (1~4) 5 | (5) 6 | (6~8) 11 | (9) 11 | 0 |
| 4TH DIGIT | 5 | (0) 7 | ø | (0) 7 | (1~5) 7 | (6) 7 | (7~8) 7 | (9) 7 | 0 |
| | 6 | (0) 7 | ø | (0) 7 | (1~5) 7 | (6) 8 | (7~8) 11 | (9) 11 | 0 |
| 5TH DIGIT | 7 | (0) 9 | ø | (0) 9 | (1~6) 9 | (7) 9 | (8) 9 | (9) 9 | 0 |
| | 8 | (0) 9 | ø | (0) 9 | (1~6) 9 | (7) 10 | (8) 11 | (9) 11 | 0 |
| DETECTION OF OTHER THAN NUMERAL | 9 | (0) 11 | ø | (0) 11 | (1~8) 11 | (9) 11 | ø | (9) 11 | ◎ |
| | 10 | (0) 11 | ø | (0) 11 | (1~8) 11 | (9) 11 | ø | (9) 11 | ◎ |
| SKIP OF NUMERAL | 11 | (0) 11 | ø | (0) 11 | (1~8) 11 | (9) 11 | ø | (9) 11 | 0 |
| | 12 | | | | | | | | |
| | 13 | | | | | | | | |

FIG. 19
EXAMPLE 4
PARTITIONING OF RANGE CONDITION "Sho-Wa 3nen ≦ K1 ≦ Sho-Wa 9nen" TO TWO SUBRANGES
① Sho-Wa 3nen ≦ K1 ≦ Sho-Wa 9nen AND
② Sho-Wa 10nen ≦ K2 ≦ Sho-Wa 64nen
① Sho-Wa 3nen ≦ K1 ≦ Sho-Wa 9nen
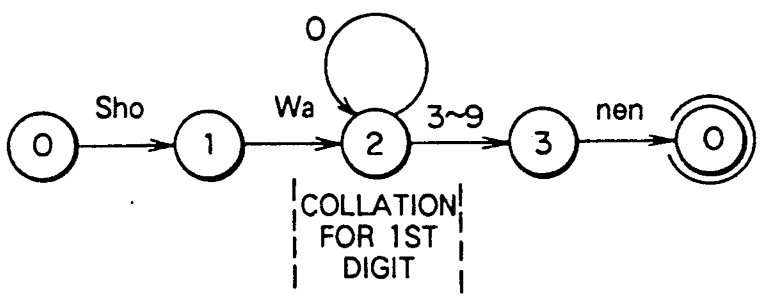
② Sho-Wa 10nen ≦ K2 ≦ Sho-Wa 46nen
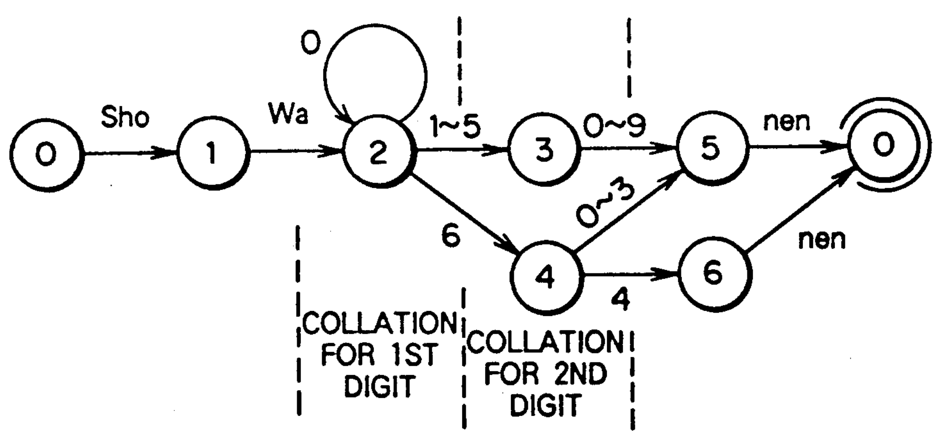

FIG. 20
EXAMPLE 4
① Sho-Wa 3nen ≦ K1 ≦ Sho-Wa 9nen
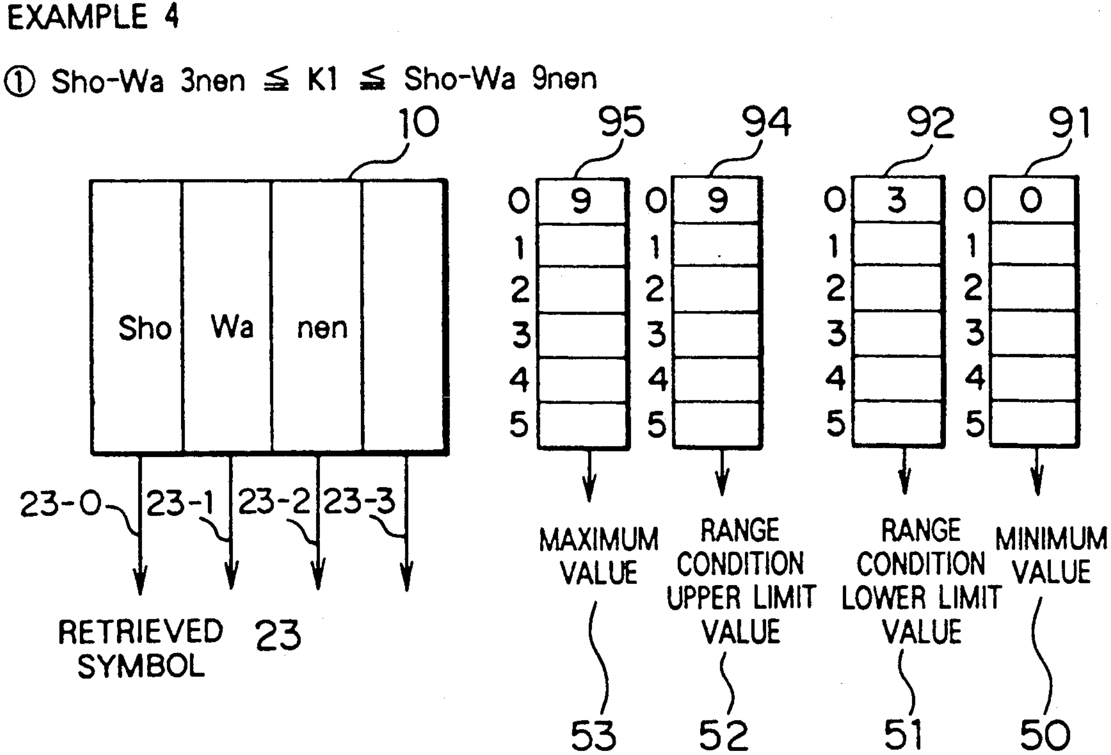
② Sho-Wa 10nen ≦ K2 ≦ Sho-Wa 64nen
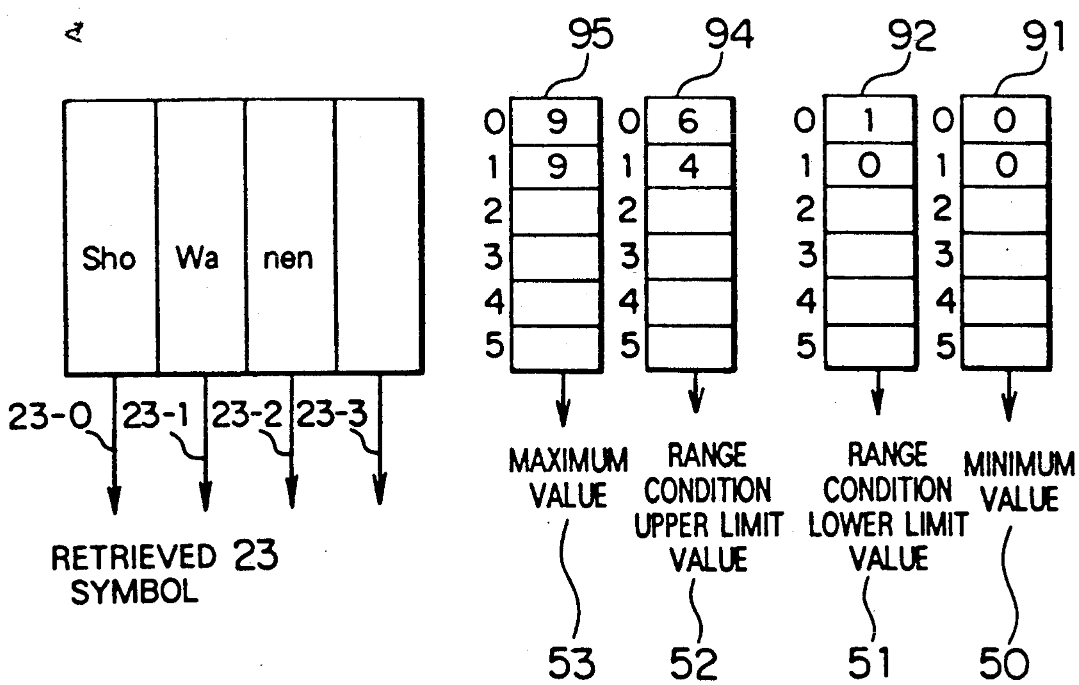

FIG. 21A

① Sho-Wa 3nen ≦ K1 ≦ Sho-Wa 9nen 10 35 106 5

| | STATE | RESULT OF COMPARATIVE COLLATION | | | | | | | RESULT OF COMPARATIVE COLLATION | | | |
|---|---|---|---|---|---|---|---|---|---|---|---|---|
| | | MIN | RANGE 1 | LOWER | RANGE 2 | UPPER | RANGE 3 | MAX | 0 | 1 | 2 | 3 |
| COLLATION WITH "Sho" | 0 | (0) 0 | (1~2) 0 | (3) 0 | (4~8) 0 | (9) 0 | ø | (9) 0 | Sho 1 | Wa 0 | nen 0 | (-) 0 |
| COLLATION WITH "Wa" | 1 | (0) 0 | (1~2) 0 | (3) 0 | (4~8) 0 | (9) 0 | ø | (9) 0 | Sho 1 | Wa 2 | nen 0 | 0 |
| 1ST DIGIT | 2 | (0) 2 | (1~2) 0 | (3) 3 | (4~8) 3 | (9) 3 | ø | (9) 3 | Sho 1 | Wa 0 | nen 0 | 0 |
| COLLATION WITH "nen" | 3 | (0) 0 | (1~2) 0 | (3) 0 | (4~8) 0 | (9) 0 | ø | (9) 0 | Sho 1 | Wa 0 | nen ⓞ | 0 |
| | 4 | | | | | | | | | | | 0 |
| | 5 | | | | | | | | | | | 0 |
| | 6 | | | | | | | | | | | 0 |
| | 7 | | | | | | | | | | | 0 |

DESTINATION FOR TRANSITION

DESTINATION STATE OF TRANSITION

STATE IN WHICH NUMERICAL VALUE SATISFYING RANGE CONDITION HAS BEEN DETECTED

FIG. 21B

② Sho-Wa 10nen ≦ K2 ≦ Sho-Wa 64nen 106 10 35 5

| STATE | RESULT OF COMPARATIVE COLLATION | | | | | | | RESULT OF COMPARATIVE COLLATION | | | |
|---|---|---|---|---|---|---|---|---|---|---|---|
| | MIN | RANGE 1 | LOWER | RANGE 2 | UPPER | RANGE 3 | MAX | 0 | 1 | 2 | 3 |
| 0 | (0) 0 | ϕ | (1) 0 | (2~5) 0 | (6) 0 | (7~8) 0 | (9) 0 | Sho 1 | Wa 0 | nen 0 | 0 |
| 1 | (0) 0 | ϕ | (1) 0 | (2~5) 0 | (6) 0 | (7~8) 0 | (9) 0 | Sho 1 | Wa 2 | nen 0 | 0 |
| 2 | (0) 2 | ϕ | (1) 3 | (2~5) 3 | (6) 4 | (7~8) 0 | (9) 0 | Sho 1 | Wa 0 | nen 0 | 0 |
| 3 | (0) 5 | ϕ | (0) 5 | (1~3) 5 | (4) 5 | (5~8) 5 | (9) 5 | Sho 1 | Wa 0 | nen 0 | 0 |
| 4 | (0) 5 | ϕ | (0) 5 | (1~3) 5 | (4) 6 | (5~8) 0 | (9) 0 | Sho 1 | Wa 0 | nen 0 | 0 |
| 5 | (0) 0 | ϕ | (0) 0 | (1~3) 0 | (4) 0 | (5~8) 0 | (9) 0 | Sho 1 | Wa 0 | nen ◎ | 0 |
| 6 | (0) 0 | ϕ | (0) 0 | (1~3) 0 | (4) 0 | (5~8) 0 | (9) 0 | Sho 1 | Wa 0 | nen ◎ | 0 |
| 7 | | | | | | | | | | | 0 |

| CURRENT STATE (106) | COMPARISON RESULT (10) | SUCCEEDING STATE (108) | RETRIEVED RESULT (46) |
|---|---|---|---|
| 0 | 0 | $S_{00}$ | UNDETECTED/DETECTED |
| | 1 | $S_{01}$ | UNDETECTED/DETECTED |
| | ~ | ~ | ~ |
| | n | $S_{0n}$ | UNDETECTED/DETECTED |
| | n+1 | $S_{0n+1}$ | UNDETECTED/DETECTED |
| 1 | 0 | $S_{10}$ | UNDETECTED/DETECTED |
| | 1 | $S_{11}$ | UNDETECTED/DETECTED |
| | ~ | ~ | ~ |
| | n | $S_{1n}$ | UNDETECTED/DETECTED |
| | n+1 | $S_{1n+1}$ | UNDETECTED/DETECTED |
| ~ | ~ | ~ | ~ |
| m | 0 | $S_{m0}$ | UNDETECTED/DETECTED |
| | 1 | $S_{m1}$ | UNDETECTED/DETECTED |
| | ~ | ~ | ~ |
| | n | $S_{mn}$ | UNDETECTED/DETECTED |
| | n+1 | $S_{m+1}$ | UNDETECTED/DETECTED |

INPUT ADDRESS (CURRENT STATE, COMPARISON RESULT)

OUTPUT ADDRESS (SUCCEEDING STATE, RETRIEVED RESULT)

| CURRENT STATE | CONDITION FOR STATE TRANSITION | | | | |
|---|---|---|---|---|---|
| 1 | LOWER LIMIT VALUE 01 | LOWER LIMIT VALUE 01 | ~ | LOWER LIMIT VALUE n1 | UPPER LIMIT VALUE n1 |
| 2 | LOWER LIMIT VALUE 02 | LOWER LIMIT VALUE 02 | ~ | LOWER LIMIT VALUE n1 | UPPER LIMIT VALUE n2 |
| • • • | ~ | ~ | | ~ | ~ |
| m | LOWER LIMIT VALUE 0m | UPPER LIMIT VALUE 0m | ~ | LOWER LIMIT VALUE nm | UPPER LIMIT VALUE n2 |

INPUT ADDRESS

CONDITION 0 FOR STATE TRANSITION

CONDITION n FOR STATE TRANSITION

OUTPUT DATA

| CURRENT STATE | CONDITION FOR STATE TRANSITION | | | | | | | | | |
|---|---|---|---|---|---|---|---|---|---|---|
| | LOWER LIMIT VALUE 0 | UPPER LIMIT VALUE 0 | LOWER LIMIT VALUE 1 | UPPER LIMIT VALUE 1 | LOWER LIMIT VALUE 2 | UPPER LIMIT VALUE 2 | LOWER LIMIT VALUE 3 | UPPER LIMIT VALUE 3 | LOWER LIMIT VALUE 4 | UPPER LIMIT VALUE 4 |
| 0 | 0 | 0 | 1 | 1 | 2 | 9 | | | | |
| 1 | 0 | 3 | 4 | 4 | 5 | 9 | | | | |
| 2 | 0 | 9 | | | | | | | | |
| 3 | 0 | 9 | | | | | | | | |
| 4 | 0 | 2 | 3 | 9 | | | | | | |
| 5 | 0 | 9 | | | | | | | | |
| 6 | 0 | 9 | | | | | | | | |
| | | | | | | | | | | |

INPUT ADDRESS

OUTPUT DATA

| CURRENT STATE (106) | COMPARISON RESULT (10) | SUCCEEDING STATE (108) | RETRIEVED RESULT (46) |
|---|---|---|---|
| 0 | 0 | 0 | 0 |
| | 1 | 1 | 0 |
| | 2 | 2 | 0 |
| | 3 | – | – |
| | 4 | – | – |
| | 5 | 0 | 0 |
| 1 | 0 | 3 | 0 |
| | 1 | 4 | 0 |
| | 2 | 5 | 0 |
| | 3 | – | – |
| | 4 | – | – |
| | 5 | 0 | 0 |
| 2 | 0 | 5 | 0 |
| | 1 | – | – |
| | 2 | – | – |
| | 3 | – | – |
| | 4 | – | – |
| | 5 | 0 | 0 |
| 3 | 0 | 5 | 0 |
| | 1 | – | – |
| | 2 | – | – |
| | 3 | – | – |
| | 4 | – | – |
| | 5 | 0 | 0 |
| 4 | 0 | 5 | 0 |
| | 1 | 6 | 0 |
| | 2 | – | – |
| | 3 | – | – |
| | 4 | – | – |
| | 5 | 0 | 0 |
| 5 | 0 | 6 | 0 |
| | 1 | – | – |
| | 2 | – | – |
| | 3 | – | – |
| | 4 | – | – |
| | 5 | 0 | 1 |
| 6 | 0 | 6 | 0 |
| | 1 | – | – |
| | 2 | – | – |
| | 3 | – | – |
| | 4 | – | – |
| | 5 | – | – |

| STATE | RANGE INFORMATION | | | | | |
|---|---|---|---|---|---|---|
| | 0 | 1 | 2 | 3 | 4 | 5 |
| 0 | 1 | 9 | MAX | | | |
| 1 | 0 | 4 | 5 | 9 | MAX | |
| 2 | 0 | 9 | MAX | | | |
| 3 | 0 | 9 | MAX | | | |
| 4 | 0 | 2 | 9 | MAX | | |
| 5 | 0 | 9 | MAX | | | |
| 6 | 0 | 9 | MAX | | | |
| 7 | | | | | | |
| 8 | | | | | | |
| 9 | | | | | | |
| 10 | | | | | | |
| 11 | | | | | | |

| STATE | RESULT OF COMPARATIVE COLLATION (RANGE-HIT) 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | (1) 1 | (2~8) 2 | (9) 2 | 0 | (MAX) 0 | | | | | | | |
| 1 | 0 | (0) 3 | (1~3) 3 | (4) 4 | ϕ | (5) 5 | (6~8) 5 | (9) 5 | 0 | (MAX) 0 | | | |
| 2 | 0 | (0) 5 | (1~8) 5 | (9) 5 | 0 | (MAX) 0 | | | | | | | |
| 3 | 0 | (0) 5 | (1~8) 5 | (9) 5 | 0 | (MAX) 0 | | | | | | | |
| 4 | 0 | (0) 5 | (1) 5 | (2) 5 | (3~8) 6 | (9) 6 | 0 | (MAX) 0 | | | | | |
| 5 | 0 | (0) 6 | (1~8) 6 | (9) 6 | 0 | (MAX) 0 | | | | | | | |
| 6 | 0 | (0) 6 | (1~8) 6 | (9) 6 | 0 | (MAX) 0 | | | | | | | |

CONDITION FOR TRANSITION

DESTINATION STATE OF TRANSITION

F I G. 32

106 11' 3

| STATE | RANGE INFORMATION | | | | | |
|---|---|---|---|---|---|---|
| | 0 | 1 | 2 | 3 | 4 | 5 |
| 0 | 1 | 2 | 6 | 8 | 9 | MAX |
| 1 | 0 | 9 | MAX | | | |
| 2 | 0 | 3 | 9 | MAX | | |
| 3 | 0 | 9 | MAX | | | |
| 4 | 0 | 9 | MAX | | | |
| 5 | [illegible] | 9 | MAX | | | |
| 6 | 0 | 5 | 9 | MAX | | |
| 7 | 0 | 9 | MAX | | | |
| 8 | 0 | 4 | 9 | MAX | | |
| 9 | 0 | 9 | MAX | | | |
| 10 | | | | | | |

CONDITION FOR TRANSITION

DESTINATION STATE OF TRANSITION

| STATE | RESULT OF COMPARATIVE COLLATION (RANGE-HIT) | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| 0 | 0 | (1) 1 | ø | (2) 2 | (3~5) 3 | (6) 4 | (7) 5 | (8) 6 | ø | (9) 7 | 0 | (MAX) 0 | |
| 1 | 0 | (0) 7 | (1~8) 7 | (9) 7 | 0 | (MAX) 0 | | | | | | | |
| 2 | 0 | (0) 7 | (1~2) 7 | (3) 8 | (4~8) 5 | (9) 5 | 0 | (MAX) 0 | | | | | |
| 3 | 0 | (0) 5 | (1~8) 5 | (9) 5 | 0 | (MAX) 0 | | | | | | | |
| 4 | 0 | (0) 5 | (1~8) 9 | (9) 9 | 0 | (MAX) 0 | | | | | | | |
| 5 | 0 | (0) 9 | (1~8) 9 | (9) 9 | 0 | (MAX) 0 | | | | | | | |
| 6 | 0 | (0) 9 | (1~4) 9 | (5) 5 | (6~8) 5 | (9) 5 | 0 | (MAX) 0 | | | | | |
| 7 | 0 | (0) 5 | (1~8) 5 | (9) 5 | 0 | (MAX) 0 | | | | | | | |
| 8 | 0 | (0) 5 | (1~3) 5 | (4) 5 | (5~8) 9 | (9) 9 | 0 | (MAX) 0 | | | | | |
| 9 | 0 | (0) 9 | (1~8) 9 | (9) 9 | 0 | (MAX) 0 | | | | | | | |

| CURRENT STATE | CONDITION FOR STATE TRANSITION | | | | | | | | | |
|---|---|---|---|---|---|---|---|---|---|---|
| | LOWER LIMIT VALUE 0 | UPPER LIMIT VALUE 0 | LOWER LIMIT VALUE 1 | UPPER LIMIT VALUE 1 | LOWER LIMIT VALUE 2 | UPPER LIMIT VALUE 2 | LOWER LIMIT VALUE 3 | UPPER LIMIT VALUE 3 | LOWER LIMIT VALUE 4 | UPPER LIMIT VALUE 4 |
| 0 | | | | | | | | | | |
| 1 | | | | | | | | | | |
| 2 | 0 | 0 | 1 | 2 | 3 | 5 | 6 | 6 | 7 | 9 |
| 3 | 0 | 9 | | | | | | | | |
| 4 | 0 | 9 | | | | | | | | |
| 5 | 0 | 4 | | | | | | | | |
| 6 | | | | | | | | | | |

23 98

| RETRIEVAL SYMBOL | | | |
|---|---|---|---|
| 0 | 1 | 2 | 3 |
| SHO | WA | NEN | |

F I G. 37

106 10 108 46

5 35

| CURRENT STATE (106) | COMPARISON RESULT (10) | | SUCCEEDING STATE (108) | RETRIEVED RESULT (46) |
|---|---|---|---|---|
| 0 | 0 | | | |
| | 1 | | | |
| | 2 | | | |
| | 3 | | | |
| | 4 | | | |
| | 5 | 0 | 1 | 0 |
| | | 1 | | |
| | | 2 | | |
| | | 3 | | |
| 1 | 0 | | | |
| | 1 | | | |
| | 2 | | | |
| | 3 | | | |
| | 4 | | | |
| | 5 | 0 | 1 | 0 |
| | | 1 | 2 | 0 |
| | | 2 | | |
| | | 3 | | |
| 2 | 0 | | 2 | 0 |
| | 1 | | 3 | 0 |
| | 2 | | 4 | 0 |
| | 3 | | 5 | 0 |
| | 4 | | 6 | 0 |
| | 5 | 0 | 1 | 0 |
| | | 1 | | |
| | | 2 | | |
| | | 3 | | |
| 3 | 0 | | 6 | 0 |
| | 1 | | | |
| | 2 | | | |
| | 3 | | | |
| | 4 | | | |
| | 5 | 0 | 1 | 0 |
| | | 1 | | |
| | | 2 | | |
| | | 3 | | |
| 4 | 0 | | 6 | 0 |
| | 1 | | | |
| | 2 | | | |
| | 3 | | | |
| | 4 | | | |
| | 5 | 0 | 1 | |
| | | 1 | | |
| | | 2 | 0 | 1 |
| | | 3 | | |
| 5 | 0 | | 6 | 0 |
| | 1 | | | |
| | 2 | | | |
| | 3 | | | |
| | 4 | | | |
| | 5 | 0 | 1 | 0 |
| | | 1 | | |
| | | 2 | 0 | 1 |
| | | 3 | | |
| 6 | 0 | | | |
| | 1 | | | |
| | 2 | | | |
| | 3 | | | |
| | 4 | | | |
| | 5 | 0 | 1 | 0 |
| | | 1 | | |
| | | 2 | 0 | 1 |
| | | 3 | | |
| 7 | 0 | | | |
| | 1 | | | |
| | 2 | | | |
| | 3 | | | |
| | 4 | | | |
| | 5 | 0 | | |
| | | 1 | | |
| | | 2 | | |
| | | 3 | | |

| STATE | RANGE INFORMATION | | | | | |
|---|---|---|---|---|---|---|
| | 0 | 1 | 2 | 3 | 4 | 5 |
| 0 | | | | | | |
| 1 | | | | | | |
| 2 | 0 | 1 | 3 | 6 | 9 | |
| 3 | 0 | 9 | | | | |
| 4 | 0 | 9 | | | | |
| 5 | 0 | 4 | | | | |
| 6 | | | | | | |
| 7 | | | | | | |

23 98

| RETRIEVAL SYMBOL | | | |
|---|---|---|---|
| 0 | 1 | 2 | 3 |
| SYO | WA | NEN | |

| STATE | RESULT OF COMPARATIVE COLLATION (RANGE-HIT) | | | | | | | | | | | | | RESULT OF COMPARATIVE COLLATION (CODE-HIT) | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 0 | 1 | 2 | 3 |
| 0 | | | | | | | | | | | | | | (SHO) 1 | | | |
| 1 | | | | | | | | | | | | | | | (WA) 2 | | |
| 2 | 0 | (0) 2 | ø | (1) 3 | (2) 3 | (3) 4 | (4~5) 4 | (6) 5 | (7~8) 6 | (9) 6 | | | | | | | |
| 3 | 0 | (0) 6 | (1~8) 6 | (9) 6 | | | | | | | | | | | | | |
| 4 | 0 | (0) 6 | (1~8) 6 | (9) 6 | | | | | | | | | | | | (NEN) 0 | |
| 5 | 0 | (0) 6 | (1~3) 6 | (4) 6 | | | | | | | | | | | | (NEN) 0 | |
| 6 | | | | | | | | | | | | | | | | (NEN) 0 | |

CONDITION FOR TRANSITION

DESTINATION STATE OF TRANSITION

| CURRENT STATE | CONDITION FOR STATE TRANSITION | | | | | | | | | |
|---|---|---|---|---|---|---|---|---|---|---|
| | LOWER LIMIT VALUE 0 | UPPER LIMIT VALUE 0 | LOWER LIMIT VALUE 1 | UPPER LIMIT VALUE 1 | LOWER LIMIT VALUE 2 | UPPER LIMIT VALUE 2 | LOWER LIMIT VALUE 3 | UPPER LIMIT VALUE 3 | LOWER LIMIT VALUE 4 | UPPER LIMIT VALUE 4 |
| 0 | | | | | | | | | | |
| 1 | A | A | B | D | E | E | | | | |
| 2 | B | B | C | Z | | | | | | |
| 3 | A | Z | | | | | | | | |
| 4 | A | E | F | F | | | | | | |
| 5 | C | Z | | | | | | | | |
| 6 | A | Z | | | | | | | | |
| 7 | A | G | | | | | | | | |
| 8 | | | | | | | | | | |

23, 98

| RETRIEVAL SYMBOL | | | |
|---|---|---|---|
| 0 | 1 | 2 | 3 |
| △ (BLANK) | | | |

FIG. 42

| CURRENT STATE | COMPARISON RESULT | | SUCCEEDING STATE | RETRIEVED RESULT |
|---|---|---|---|---|
| 0 | 0 | | | |
| | 1 | | | |
| | 2 | | | |
| | 3 | | | |
| | 4 | | | |
| | 5 | 0 | 1 | 0 |
| | | 1 | | |
| | | 2 | | |
| | | 3 | | |
| 1 | 0 | | 2 | 0 |
| | 1 | | 3 | 0 |
| | 2 | | 4 | 0 |
| | 3 | | | |
| | 4 | | | |
| | 5 | 0 | 1 | 0 |
| | | 1 | | |
| | | 2 | | |
| | | 3 | | |
| 2 | 0 | | 5 | 0 |
| | 1 | | 6 | 0 |
| | 2 | | | |
| | 3 | | | |
| | 4 | | | |
| | 5 | 0 | 1 | 0 |
| | | 1 | | |
| | | 2 | | |
| | | 3 | | |
| 3 | 0 | | 6 | 0 |
| | 1 | | | |
| | 2 | | | |
| | 3 | | | |
| | 4 | | | |
| | 5 | 0 | 1 | 0 |
| | | 1 | | |
| | | 2 | | |
| | | 3 | | |
| 4 | 0 | | 6 | 0 |
| | 1 | | 7 | 0 |
| | 2 | | | |
| | 3 | | | |
| | 4 | | | |
| | 5 | 0 | 1 | 0 |
| | | 1 | | |
| | | 2 | | |
| | | 3 | | |
| 5 | 0 | | 8 | 0 |
| | 1 | | | |
| | 2 | | | |
| | 3 | | | |
| | 4 | | | |
| | 5 | 0 | 1 | 0 |
| | | 1 | | |
| | | 2 | | |
| | | 3 | | |
| 6 | 0 | | 8 | 0 |
| | 1 | | | |
| | 2 | | | |
| | 3 | | | |
| | 4 | | | |
| | 5 | 0 | 1 | 0 |
| | | 1 | | |
| | | 2 | | |
| | | 3 | | |
| 7 | 0 | | 8 | 0 |
| | 1 | | | |
| | 2 | | | |
| | 3 | | | |
| | 4 | | | |
| | 5 | 0 | 1 | 0 |
| | | 1 | | |
| | | 2 | | |
| | | 3 | | |
| 8 | 0 | | | |
| | 1 | | | |
| | 2 | | | |
| | 3 | | | |
| | 4 | | | |
| | 5 | 0 | 1 | 1 |
| | | 1 | | |
| | | 2 | | |
| | | 3 | | |

| STATE | RANGE INFORMATION | | | | | |
|---|---|---|---|---|---|---|
| | 0 | 1 | 2 | 3 | 4 | 5 |
| 0 | | | | | | |
| 1 | A | E | | | | |
| 2 | B | Z | | | | |
| 3 | A | Z | | | | |
| 4 | A | F | | | | |
| 5 | C | Z | | | | |
| 6 | A | Z | | | | |
| 7 | A | G | | | | |
| 8 | | | | | | |

23 98

| RETRIEVAL SYMBOL | | | |
|---|---|---|---|
| 0 | 1 | 2 | 3 |
| (BLANK) Δ | | | |

| STATE | RESULT OF COMPARATIVE COLLATION (RANGE-HIT) | | | | | | | | | | | | | RESULT OF COMPARATIVE COLLATION (CODE-HIT) | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 0 | 1 | 2 | 3 |
| 0 | | | | | | | | | | | | | | Δ (BLANK) 1 | | | |
| 1 | | (A) 2 | (B~D) 3 | (E) 4 | | | | | | | | | | | | | |
| 2 | | (B) 5 | (C~Y) 6 | (Z) 6 | | | | | | | | | | | | | |
| 3 | | (A) 6 | (B~Y) 6 | (Z) 6 | | | | | | | | | | | | | |
| 4 | | (A) 6 | (B~E) 6 | (F) 7 | | | | | | | | | | | | | |
| 5 | | (C) 8 | (D~Y) 8 | (Z) 8 | | | | | | | | | | | | | |
| 6 | | (A) 8 | (B~Y) 8 | (Z) 8 | | | | | | | | | | | | | |
| 7 | | (A) 8 | (B~F) 8 | (G) 8 | | | | | | | | | | | | | |
| 8 | | | | | | | | | | | | | | Δ (BLANK) 0 | | | |

CONDITION FOR TRANSITION

DESTINATION STATE OF TRANSITION

| STATE | RANGE INFORMATION | RESULT OF COMPARATIVE COLLATION (RANGE-HIT) | | | | | | | | | | | | | RESULT OF COMPARATIVE COLLATION (CODE-HIT) | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 0 | 1 | 2 | 3 |
| 0 | 0~5 | | | | | | | | | | | | | | | | | |
| 1 | 0 | | | | | | | | | | | | | | | 0 | | |
| | 1 | | | | | | | | | | | | | | | 1 | | |
| | 2 | | | | | | | | | | | | | | | 3 | | |
| | 3 | | | | | | | | | | | | | | | 6 | | |
| | 4 | | | | | | | | | | | | | | | 9 | | |
| | 5 | | | | | | | | | | | | | | | | | |
| 2 | 0 | | 0 | | 0 | 0 | 0 | 0 | 0 | | | | | | | | | |
| | 1 | | 1 | | 9 | 9 | 9 | 9 | 4 | | | | | | | | | |
| | 2 | | 3 | | | | | | | | | | | | | | | |
| | 3 | | 6 | | | | | | | | | | | | | | | |
| | 4 | | 9 | | | | | | | | | | | | | | | |
| | 5 | | | | | | | | | | | | | | | | | |
| 3 | 0~5 | | | | | | | | | | | | | | | | | |
| 4 | 0~5 | | | | | | | | | | | | | | | | | |
| 5 | 0~5 | | | | | | | | | | | | | | | | | |
| 6 | 0~5 | | | | | | | | | | | | | | | | | |

| CURRENT STATE (105) | NUMERICAL VALUE DETECTION SIGNAL (101) | CHARACTER STRING (20) | SUCCEEDING STATE (107) | CHARACTER STRING DETECTION SIGNAL (100) | RESULT OF RETRIEVAL (45) |
|---|---|---|---|---|---|
| 0 | 0 | CHARACTER 000 ~ CHARACTER 00k | S000 ~ S00k | 0/1 ~ 0/1 | UNDETECTED/DETECTED ~ UNDETECTED/DETECTED |
| | 1 | CHARACTER 100 ~ CHARACTER 10k | S100 ~ S10k | 0/1 ~ 0/1 | UNDETECTED/DETECTED ~ UNDETECTED/DETECTED |
| ⋮ | | | | | |
| n | 0 | CHARACTER 0n0 ~ CHARACTER 0nk | S0n0 ~ S0nk | 0/1 ~ 0/1 | UNDETECTED/DETECTED ~ UNDETECTED/DETECTED |
| | 1 | CHARACTER 1n0 ~ CHARACTER 1nk | S1n0 ~ S1nk | 0/1 ~ 0/1 | UNDETECTED/DETECTED ~ UNDETECTED/DETECTED |

INPUT ADDRESS (first three columns) — OUTPUT DATA (last three columns)

| CURRENT STATE (106) | CHARACTER STRING DETECTION SIGNAL (100) | COMPARISON RESULT (10) | SUCCEEDING STATE (108) | POSITION OF NUMERIC CHARACTER FOR COMPARISON (103) | NUMERICAL VALUE DETECTION SIGNAL (101) | RESULT OF RETRIEVAL (46) |
|---|---|---|---|---|---|---|
| 0 | 0 | 0 ~ n | S000 ~ S00n | P000 ~ P00n | 0/1 ~ 0/1 | UNDETECTED/DETECTED ~ UNDETECTED/DETECTED |
| | 1 | 0 ~ n | S100 ~ S10n | P100 ~ P10n | 0/1 ~ 0/1 | UNDETECTED/DETECTED ~ UNDETECTED/DETECTED |
| ⋮ | | | | | | |
| j | 0 | 0 ~ n | S0j0 ~ S0jn | P0j0 ~ P0jn | 0/1 ~ 0/1 | UNDETECTED/DETECTED ~ UNDETECTED/DETECTED |
| | 1 | 0 ~ n | S1j0 ~ S1jn | P1j0 ~ P1jn | 0/1 ~ 0/1 | UNDETECTED/DETECTED ~ UNDETECTED/DETECTED |

INPUT ADDRESS (columns 106, 100, 10) — OUTPUT DATA (columns 108, 103, 101, 46)

F I G. 65
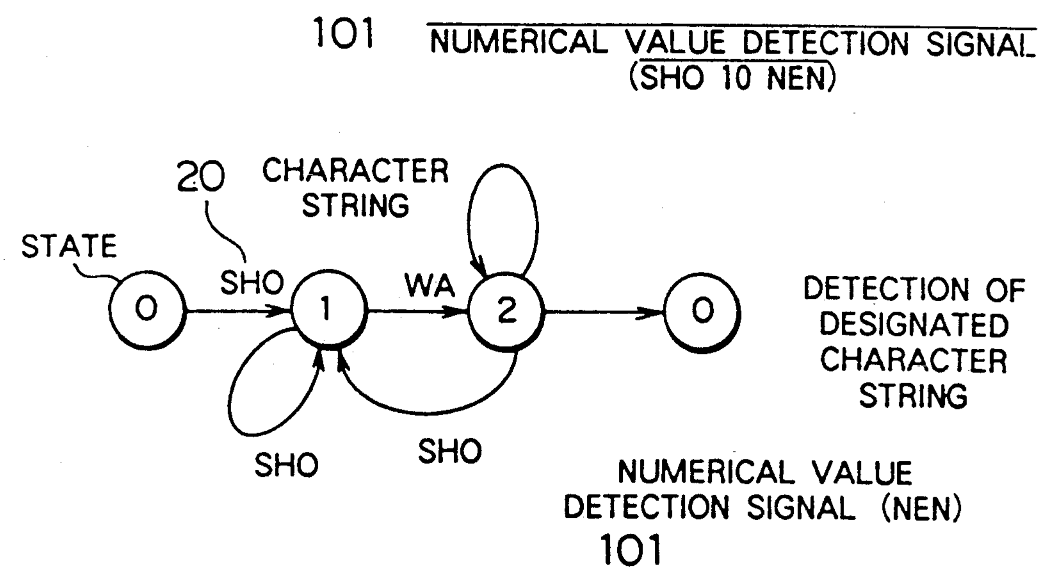

| CURRENT STATE (105) | NUMERICAL VALUE DETECTION SIGNAL (101) | CHARACTER STRING (20) | SUC-CEEDING STATE (107) | CHARACTER STRING DETECTION SIGNAL (100) | RETRIEVAL RESULT (45) |
|---|---|---|---|---|---|
| 0 | 0 OR 1 | "Sho" | 1 | 0 | 0 |
| | | OTHER THAN "Sho" | 0 | 0 | 0 |
| 1 | 0 OR 1 | "Sho" | 1 | 0 | 0 |
| | | "Wa" | 2 | 1 | 0 |
| | | OTHER THAN "Sho", "Wa" | 0 | 0 | 0 |
| 2 | 0 | "Sho" | 1 | 0 | 0 |
| | | OTHER THAN "Sho" | 2 | 0 | 0 |
| | 1 | "NEN" | 0 | 0 | 1 |
| | | OTHER THAN "Sho", "NEN" | 0 | 0 | 0 |

$3 \leq K \leq 64$

| CURRENT STATE | CONDITION FOR STATE TRANSITION | | | | | | | | | |
|---|---|---|---|---|---|---|---|---|---|---|
| | LOWER LIMIT VALUE | UPPER LIMIT VALUE | LOWER LIMIT VALUE | UPPER LIMIT VALUE | LOWER LIMIT VALUE | UPPER LIMIT VALUE | LOWER LIMIT VALUE | UPPER LIMIT VALUE | LOWER LIMIT VALUE | UPPER LIMIT VALUE |
| | 0 | 0 | 1 | 1 | 2 | 2 | 3 | 3 | 4 | 4 |
| 0 | 0 | 0 | 1 | 2 | 3 | 5 | 6 | 6 | 7 | 9 |
| 1 | 0 | 0 | 1 | 2 | 3 | 5 | 6 | 6 | 7 | 9 |
| 2 | 0 | 9 | | | | | | | | |
| 3 | 0 | 9 | | | | | | | | |
| 4 | 0 | 4 | | | | | | | | |

| CURRENT STATE (106) | CHARACTER STRING DETECTION SIGNAL (100) | COMPARISON RESULT (10) | SUCCEEDING STATE (108) | NUMERICAL VALUE DETECTION SIGNAL (10) | RETRIEVED RESULT (46) |
|---|---|---|---|---|---|
| 0 | 0 | 0 | 0 | 0 | 0 |
| | | 1 | 0 | 0 | 0 |
| | | 2 | 0 | 0 | 0 |
| | | 3 | 0 | 0 | 0 |
| | | 4 | 0 | 0 | 0 |
| | | 5 | 0 | 0 | 0 |
| | 1 | 0 | 1 | 0 | 0 |
| | | 1 | 2 | 0 | 0 |
| | | 2 | 3 | 1 | 0 |
| | | 3 | 4 | 1 | 0 |
| | | 4 | 0 | 1 | 0 |
| | | 5 | 0 | 0 | 0 |
| 1 | 0 | 0 | 1 | 0 | 0 |
| | | 1 | 2 | 0 | 0 |
| | | 2 | 3 | 1 | 0 |
| | | 3 | 4 | 1 | 0 |
| | | 4 | 0 | 1 | 0 |
| | | 5 | 0 | 0 | 0 |
| | 1 | 0 | 1 | 0 | 0 |
| | | 1 | 2 | 0 | 0 |
| | | 2 | 3 | 1 | 0 |
| | | 3 | 4 | 1 | 0 |
| | | 4 | 0 | 1 | 0 |
| | | 5 | 0 | 0 | 0 |
| 2 | 0 | 0 | 0 | 1 | 0 |
| | | 1 | | | |
| | | 2 | | | |
| | | 3 | | | |
| | | 4 | | | |
| | | 5 | 0 | 0 | 0 |
| | 1 | 0 | 0 | 1 | 0 |
| | | 1 | | | |
| | | 2 | | | |
| | | 3 | | | |
| | | 4 | | | |
| | | 5 | 0 | 0 | 0 |

F I G. 69B

5

| CURRENT STATE (106) | CHARACTER STRING DETECTION SIGNAL (100) | COMPARISON RESULT (10) | SUCCEEDING STATE (108) | NUMERICAL VALUE DETECTION SIGNAL (10) | RETRIEVED RESULT (46) |
|---|---|---|---|---|---|
| 3 | 0 | 0 | 0 | 1 | 0 |
| | | 1 | | | |
| | | 2 | | | |
| | | 3 | | | |
| | | 4 | | | |
| | | 5 | 0 | 0 | 0 |
| | 1 | 0 | 0 | 1 | 0 |
| | | 1 | | | |
| | | 2 | | | |
| | | 3 | | | |
| | | [illegible] | | | |
| | | 5 | | | |
| 4 | 0 | 0 | 0 | 1 | 0 |
| | | 1 | | | |
| | | 2 | | | |
| | | 3 | | | |
| | | 4 | | | |
| | | 5 | | | |
| | 1 | 0 | 0 | 1 | 0 |
| | | 1 | | | |
| | | 2 | | | |
| | | 3 | | | |
| | | 4 | | | |
| | | 5 | 0 | 0 | 0 |

F I G. 71
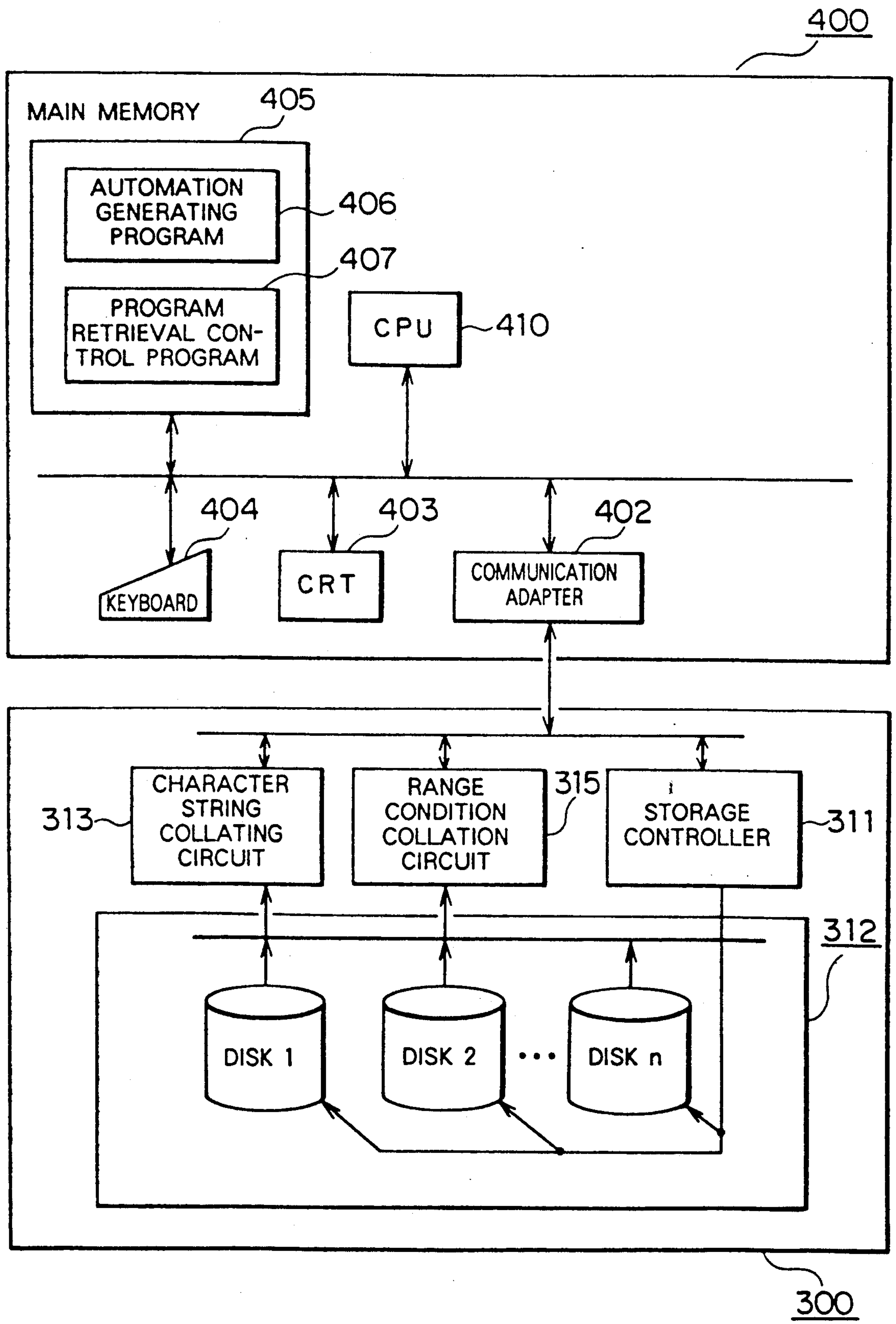

RANGE-CONDITIONAL CHARACTER STRING RETRIEVING METHOD AND SYSTEM

CROSS-REFERENCE TO RELATED APPLICATION

This application is a continuation-in-part application of U.S. patent application Ser. No. 555,483 filed Aug. 9, 1990, entitled "HIERARCHICAL RESEARCH TYPE TEXT SEARCH METHOD AND APPARATUS AND MAGNETIC DISK UNIT USED IN THE APPARATUS" and assigned to the same assignee as this application, the disclosure of which is hereby incorporated by reference.

BACKGROUND OF THE INVENTION

The present invention relates in general to a range-conditional character string retrieving method and system which are capable of searching or retrieving a numerical value represented by a numeric character string by comparing or collating a value of interest with a given condition in information processing system such as a database system, a document filing system or the like for processing information or data which contains non-numeric data. More particularly, the present invention is concerned with range-conditional character string retreiving method and system suited profitably for a full-text search of document data through a range-conditional character string retrieval technique.

Heretofore, in the search or retrieval of document data, there has been adopted among others a search or retrieval method which resorts to utilization of additional information such as keywords, classification codes or the like. It is however difficult to express exactly the condition for the search or retrieval into details and localize sufficiently the items or data of interest with only the aid of the keyword and the classification code. Under the circumstances, those document data which are not intended by the searcher may unwantedly be mixedly included in the result of the search or retrieval as noise, so to say. Consequently, the searcher is utimately forced to select the document data of interest by reading directly the text or document, giving rise to a problem that the serach or retrieving processing can not be conducted with satisfactory efficiency. Besides, as the amount of document data increases, labor required for indexing such as involved in affixing the keyword and the classification code is intolerably increased, incurring significant delay in registration of document data. It is additonally noted that the meanings or contents of the keywords and the classification codes tend to change to out-of-dateness as the time lapses, presenting difficulty in maintaining the database in the up-to-date state.

As an approach to solve the problems mentioned above, there has been proposed a method of collating comparatively the contents of a text in a document with keywords inputted arbitrarily by the user while scanning the text (this method will hereinafter be referred to as the full-text search). In this conjunction, reference may be made to R. L. Haskin and L. A. Hollaar "Operational Characteristics of a Hardware-Based Pattern Matcher", ACM Trans. on Database Systems, Vol. 8, No. 1 (1983).

FIG. 2 of the accompanying drawings shows an example of the character string seraching or retrieving system which is based on the full-text search procedure. Referring to the figure, a searcher 401 designates a retrieval keyword 325 as the condition for retrieval which is to be inputted to a host computer 400. In response to the retrieval keyword 325, the host computer 400 transfers retrieval control information 321 to a character string collating circuit 313 of the character string retrieving system 300, whereupon a storage control circuit 311 of the latter is activated to read out a character string 20 to be subjected to retrieval from a character string storage unit 312 by using control information 323 and send the character string 20 to the character string collating circuit 313. In the character string collating circuit 313, the input character string 20 is collated with a specific character string set previously to serve as the retrieval control information 321, wherein upon detection of a character string in the string 20 which coincides with the specific character string, retrieved result (i.e. result of the retrieval) indicated at 45 is sent to the host computer 400. The host computer 400 then displays document information 326 corresponding to the retrieved result 45 to the user 401.

At this juncture, it is noted that the full-text search is designed not only for retrieval of the non-numeric character string such as alphabetic letter string but also for the retrieval of numeric character strings by which numerical values falling within a specific range are retrieved at one time (referred to as the range-conditional retrieval or retrieving). Assuming, by way of example, that a range condition defined by "15≦K≦142" is designated, then the whole document containing descriptions related to numerical values covered by the range of "15" to "142" is subjected to the retrieval.

As one of methods for realizing the full-text search, there is known a method in which a finite automaton or automata are used, and a character string retrieving system capable of performing the range-conditional retrieval in the full-text search by using the finite automaton technique is disclosed in U.S. Pat. No. 4,241,402.

In a character string collating circuit 313 of the. character string retrieving system disclosed in the above-mentioned U.S. Patent, the range-conditional retrieval or search is realized by resorting to the finite automaton technique. More specifically, in the full-text search, the numerical values are stored in the character string storage unit 312 together with non-numeric character in the form of character codes, being justified to the left, wherein the character string 20 to be subjected to retrieval is inputted to the character string collating circuit (matcher) 313 on a one-by-one character basis to thereby decide if a numeric character string representing a numerical value satisfying the range condition is present in the input character string 20.

A structure of a finite automaton for realizing the range condition "15≦K≦142" is illustrated in FIG. 3 of the accompanying drawings for the purpose of exemplification. This automaton is so structured that state transition thereof may occur every time one character is inputted for retrieval of the numerical value falling within the aforementioned range. Let's assume, for example, that a character string of ", 40," is contained in a document of concern and that the finite automaton is initially in the state 0 (zero). On the assumption, input of "," brings about no transition from the state 0, since this symbol or token represents no numerical value. However, upon inputting of "4", state transition to the state 2 takes place. When "0" is inputted in succession, the automaton goes to the state 6. Finally, upon inputting of "," decision is made that the numeric character string "40" represents a numerical value which satisfies the aforementioned range condition, whereupon transition is made to the state 0 indicated as enclosed in double circles (which is a reference symbol indicating detection of a numerical value satisfying a given range condition). The retrieved result (i.e. result of the retrieval) 45 is sent to the host computer 400.

In the character string retrieving system using the finite automaton such as described above, it is necessary for reducing the wait or latency time in order to (1) shorten the time taken for generating the finite automaton corresponding to the given range condition and (2) speed up the collation between the range condition and the input character string read out from the character string storage unit 312.

In the character string retrieving or searching system 300 described above, it will however be noted that when numerical values satisfying a given range conditions are to be searched by the finite automaton in the character string collating circuit 313, such finite automaton has to be generated which has state transition paths (forkings) corresponding to all numerical values covered by the given range condition. This in turn means that as the digit number of the numerical value (i.e. number of the characters constituting the numeric character string representing the numerical value) increases, the finite automaton structure becomes much complicated, presenting a problem that a lot of time is required for creation of the automaton. Besides, such complex finite automaton requires an increased capacity of the state transition table for storing the automaton. In this conjunction, it will be understood that the character string collating or retrieving speed is determined by the time taken accessing the state transition table. The state transition table of a large capacity in turn increases tcorrespondingly he access time, as a result of which limitation is necessarily imposed on the character string collation speed which would be about 100 ms per character or token at the highest.

Furthermore, there exists a demand for such applicability of the character string retrieving system that the range-conditional retrieval is to be carried out for a code such as comercial product identification codes and others in which numeric character strings and non-numeric character strings (such as alphabetic letters, Chinese characters, Japanese cursive and/or square character) are coexistent in a character string. Assuming, for example, that the range-conditional retrieval is to be performed on a character string containing alphabetic letters affixed to numerical values, there will be required as many as twenty-six state transition paths, corresponding to "A" to "Z", respectively, making the finite automaton complicate remarkably with the time required for creation thereof being equally extended to serious disadvantage. As a result of this, the state transition table storing such automaton has to be increased in the capacity to another disadvantage. Furthermore, since the character string collating speed is naturally limited by the time involve in accessing the state transition table, limitation is imposed on the effort to increase the search or retrieving speed, to further drawback.

SUMMARY OF THE INVENTION

In the light of the state of the art described above, it is an object of the present invention to provide a high-speed range-conditional character string retrieving system and method which is capable of reducing the time required for creation or generation of the finite automaton, allows retrieval of numerical values contained in character strings to be performed at a high speed and which can reduce the wait or latency time involved in the search or retrieval.

Another object of the present invention is to provide a range-conditional character string retrieving method and system which is capable of performing the range-conditional retrieval for character strings in which numerical values and non-numeric characters or tokens such as alphabetic letters and others are coexistent as well as such intelligent numerical valus are coexistent as well as such intelligent numerical value retrieval as that of a numeric character string which is affixed with non-numeric character or characters in precedence and/or in succession.

In view of the above and other objects which will become more apparent as description proceeds, there is provided according to the present invention in its broadest sense a range-conditional character string retrieving or searching system for retrieving or searching a character string including a numerical value (represented by a numeric character substring) falling within a specific range and a specific non-numeric character substring from an input character string subjected to retrieval and composed of symbols or tokens represented in codes, wherein the system comprises a character string collating unit for retrieving or searching the specific character substring and a range conditon collating unit for retrieving numerical values falling within the specific range from the input character string.

In the range-conditional character string retrieving system mentioned above, it is proposed according to a first aspect of the present invention to implement the range condition collating unit such that when an upper limit value and a lower limit value defining the specific range for the numerical values to be searched or retrieved differ from each other by at least two digits in numerical representation, the specific range for the numerical values is partitioned into following subranges (a), (b) and (c);

(a) a subrange covering the lower limit value to a maximum numerical value of a same digit number as that of the lower limit value, (b) a subrange covering a minimum numerical value of a digit number greater than that of the lower limit value by one digit to a maximum value of a digit number smaller than that of the upper limit value by one digit, and (c) a subrange covering a minimum numerical value of a same digit number as that of the upper limit value to the upper limit value, while when the lower limit value and the upper limit value differ by one digit, the specific range for the numerical value ot be retrieved is partitioned into the aforementioned subranges (a) and (c), and when the lower limit value and the upper limit value are of a same digit number, the specific range is held as it is, whereon the range-conditional retrieval of the numerical value is performed in parallel in the individual subranges or the specific range held intact by the respective range condition collating circuits provided for the subranges or the specific range, respectively.

In accordance with the concept of range partitioning taught by the present invention, even the range condition defined by the upper and lower limit values which differ by two or more digits may sufficiently be divided or partitioned to only three subranges at most, as exemplified below.

Let's consider, for example, a range condition that 12≦K≦1234567. In this case, partition into three subranges mentioned below is sufficient. Namely,

| | |
|---|---|
| subrange 1 | 12 to 99, |
| subrange 2 | 100 to 999, |
| | 1000 to 9999, |
| | 10000 to 99999, |
| | 100000 to 999999, |
| subrange 3 | 1000000 to 1234567. |

The subrange (2) is defined to cover a numerical value of three digits to that of six digits, wherein the figure or numeral (numeric character) of any digit (at any position) may assume any one of numerical values of "0" to "9" (or alternatively "1" to "9"). Accordingly, the automaton can be so implemented that destination state reached by the state transitions remains same independent of detection of any numerical values falling within the subrange (2). To say in another way, the numeric character strings of three to six digits can be handled in the same manner without need for complicated configuration of the automaton.

Hardware implementation of the range condition collating unit can be realized by taking advantage of the fact that character codes of alphabetic letter, numeric characters and other symbols are orderly coded in respsective sets as in the case of ASCII code. More specifically, in a preferred embodiment of the invention, the range condition collating unit may be composed of an upper limit value range storage for storing an upper limit value of the range for retrieval and a maximum numerical value of a same digit number as that of the upper limit value, a lower limit value storage for storing a lower limit value of the range for retrieval and a minimum numerical value of a same digit number as that of the lower limit value, a value coincidence decision circuit for comparing a character string subjected to retrieval with the outputs of the upper limit value storage and the lower limit value storage, respectively, and a finite automaton including a memory and a register, wherein numeric characters or numerals of the digit or position (or state) for which coincidence decision is to be made are read out to subsequently undergo the value comparison with the character of the input character string on a one-by-one character basis. The finite automaton makes state transition in accordance with the result of the comparison or coincidence decision. When the state of the finite automaton as reached coincides with or satisfies the designated range, the result of the decision is outputted to the host computer as the result of retrieval.

In a preferred mode for carrying out the embodiment mentioned above, it is preferred to effect simultaneously the comparison of the character of the input character string with the upper limit of the range condition, the maximum value of a same digit number as that of the upper limit value, the lower limit value and the minimum value of a same digit number as that of the lower limit value, repectively, so that the collation with a given one character of the input character string can be performed within one machine cycle.

Further, it is preferred that a plurality of the range condition collating units each of the structure described above are provided in parallel to one another and assigned with the partitioned range conditions, respectively, to thereby cause the plural range condition collating units to perform the respective retrievals simultaneously in parallel.

In another preferred embodiment of the range condition collating unit according to the first aspect of the invention, it is preferred to provide a retrieval-designated symbol register for storing a character (symbol) string designated for retrieval to thereby allow the finite automaton to make state transition in accordance with the result of comparison of the input character string with the symbol stored in the retrieval-designated symbol register as well.

According to a second aspect of the invention, it is proposed to arrange the range condition collating unit of the range-conditional character string retrieving system such that in case the range-conditional retrieval is carried out with the aid of the finite automaton, condition for the state transitions made by the finite automaton in accordance with the range condition designated by the searcher can be given in terms of a range of character codes. More specifically, when the finite automaton makes state transitions from a predetermined state to a plurality of states, the conditions for such states transitions are stored in a range information memory in terms of a range (upper limit value and lower limit value) of the character codes, wherein the state transition conditions corresponding to the current state of the finite automaton are read out from the range information memory to collate comparatively the state transition conditions designated in terms of the range with the input character string by a plurality of value coincidence deciding comparators simultaneously, whereon the destination of the state transition of the finite automaton is determined in accordance with the result of the abovementioned comparisons.

In a preferred mode for realizing the range condition collating unit according to the second aspect of the invention, it is preferred to provide a retrieval-designated symbol register for storing a character or symbol string to be retrieved so that the state transition of the finite automaton may occur in dependence on the result of the comparison between the input character string and the symbol string stored in the retrieval-designated symbol register as well.

The range condition collating unit of the range-conditional character string retrieving system according to a third aspect of the present invention includes a range condition collating circuit composed of a numerical value detecting circuit for detecting a numerical value from the input character string, and a range decision circuit for deciding whether or not the numerical value detected by the numerical value detecting circuit falls within a specific range.

In this conjunction, it is also preferred to provide a numerical value storage for buffering the numerical value detected by the numerical value detecting circuit.

Besides, a shift register should preferably be provided for storing at lest either one of a character string preceding immediately to the numerical value as detected or a character string immediately succeeding thereto.

Further, it is preferred to provide a binary conversion circuit for converting the character code of the numerical value detected by the numerical value detector to a binary code.

The range decision circuit may be constituted by a microcomputer.

As a further alternative, the range decision function may be implemented as a finite automaton.

In the range condition collating unit of the range-conditional character string retrieving system according to a fourth aspect of the invention, it is proposed that a first communication circuit is provided in association with the aforementioned character string collating unit for transmitting a non-numeric character string detection signal to the aforementioned range condition collating unit and that a second communication circuit is provided in association with the abovementioned range condition collating unit for transmitting a numerical value detection signal to the character string collating unit.

In yet another mode for implementing the range condition collating unit according to the fourth aspect of the invention, a synchronizing circuit may be provided for establishing synchronism in operation between the character string collating circuit and the range condition collating circuit.

With the range-conditional character string retrieving system according to the fourth aspect of the invention which is adapted to retrieve a character string containing a specific non-numeric character substring and a numerical value (numeric character substring) falling within a specific range from an input character string composed of symbols (tokens) expressed in codes and which includes the character string collating means for searching the specific non-numeric character substring and the range condition collating circuit for detecting numerical values falling within the specific range from the input character string, it is possible to search or retrieve simultaneously both the specific non-numeric character string and the numerical value within the specific range.

In the case of the range condition collating unit of the range-conditional character string retrieving system proposed according to the first aspect of the invention, the numerical value range conditioned for the retrieval is partitioned in correspondence to the digit numbers of the numerical values to be retrieved, wherein the range condition collating unit is provided for each of the subranges resulting from the partition so that the range-conditional retrieval can be executed in parallel. Accordingly, the finite automaton can be generated for each of the partitioned numerical value ranges, which in turn means that the respective automatons are simplified to thereby shorten the time taken for the host computer to generate the automatons. Further, the time required for transferring the retrieval control information such as state transition information and others from the host computer to the range condition collating unit can significantly be reduced. Furthermore, since the state transition table incorporated in the range condition collating unit may be of a reduced capacity, the table access time is correspondingly reduced, resulting in that the numerical value retrieval is speeded up.

By providing the range condition collating unit with the retrieval-designated symbol register for storing a non-numeric character string to be retrieved in association with a comparison circuit for comparing the input character string subjected to retrieval with the non-numeric character string placed in the abovementioned register, the range-conditional retrieval of a character string containing mixedly a numeric character substring and a non-numeric character substring can be conducted at a high speed.

In the case of the range condition collating unit proposed according to the second aspect of the invention, the conditions for the state transition of the finite automaton are designated in terms of the range (upper and lower limit values) of character codes. By virtue of this arrangement, the number of the state transitions involved in performing the range-conditional retrieval is determined by the number of destination states of the state transition (a few states at at the most), whereby the number of the state transition paths is prevented from increasing, even when a great variety of character codes such as alphabetic codes are to be handled, so far as the character codes are orderly arrayed. Thus, the automaton configurations can be simplified, providing advantage that the time taken for generation of the automaton by the host computer is shortened. Besides, the time required for transferring the retrieval control information such as the state transition information from the host computer to the range condition collating unit is reduced. Further, since the state transition table can be of a small capacity, the table access time is correspondingly shortened. As an overall result, the numerical value retrieval can be executed at a significantly high speed.

By providing the range condition collating unit according to the second aspect of the invention with a retrieval-designated symbol register for storing a character string to be retrieved in association with a comparison circuit for comparing the input character string with the character string placed in the abovementioned register, it is possible to execute at an enhanced speed the range-conditional retrieval for retrieving or searching such a character string which contains mixedly a non-numeric character substring and a numeric character substring.

In the case of the range condition collating unit according to the third aspect of the invention, there are provided the numerical value detecting circuit for detecting a numeric character string from an input character string and the range decision circuit for deciding whether or not the numerical value of the numeric character string as detected falls within a specific range. By virtue of this arrangement, the range condition collating unit can be implemented in a relatively small scale circuit with a high operation speed. Thus, the detection of the numerical value and the range-conditional decision thereof can be performed at a high speed.

By providing the numercial value storage for buffering the numerical value (numeric character string) detected by the numerical value detecting circuit, the range decision circuit can be implemented in a configuration of a relatively low processing speed.

Further, by providing a shift register for storing temporarily at least either one of character strings immediately preceding or succeeding to the numerical value detected by the numerical value detecting circuit, it is possible to detect simultaneously a specific non-numeric character string and a numerical value within a specific range.

Additionally, by providing the binary conversion circuit for converting the character code of the numerical value detected by the numerical value detecting circuit, the range decision circuit can be realized in a considerably simpified circuit configuration.

It should further be added that the range decision circuit may be implemented inexpensively by employing a microcomputer.

When the range decision circuit is realized in the finite automaton configuration, retrieval of one character can be achieved within one machine cycle.

Finally, in the range condition collating unit according to the fourth aspect of the invention in which the first communication circuit for sending the character string detection signal to the range condition collating circuit is provided in association with the character string collating circuit while providing the second communication circuit in association with the range condition collating circuit for transmitting the numerical value detection signal to the character string collating circuit, the latency time can considerably be decreased in the communication between the range condition collating unit and the character string collating unit.

Besides, by providing the synchronizing circuit for establishing synchronism in operation between the character string collating unit and the range condition collating unit, the latency time in the communication therebetween can further be decreased.

As an overall result, retrieval of a character string which contains coexistently a numeric character substring and a non-numeric character string and which meets the range condition can be carried out at a speed increased remarkably.

BRIEF DESCRIPTION OF THE DRAWINGS

FIG. 1 is a functional block diagram showing only schematically a general arrangement of a range-conditional character string retrieving system according to the present invention;

FIG. 10 is a table diagram showing, by way of example, values entered in a state transition table in realizing the state transition shown in FIG. 8;

FIGS. 13A and 13B are views showing set values of the state transition table in realizing the state transitions illustrated in FIG. 11;

FIGS. 16A, 16B and 16C are views showing a table diagram showing set values of the state transition table in realizing the state transitions shown in FIG. 14;

FIG. 19 shows state transition diagrams for illustrating first example of operation of the partitioned condition collating circuit shown in FIG. 17;

FIG. 20 shows values placed in a minimum value register, a maximum value register, a range condition lower limit value register 92, the range condition upper limit value register, respectively, in executing the first example of operation of the partitioned condition collating circuit shown in FIG. 17;

FIGS. 21A and 21B show contents of the state transition table in executing the first example of operation of the partitioned condition collating circuit shown in FIG. 17;

FIG. 24 is a view showing a state transition table for illustrating operation of the range condition collating circuit shown in FIG. 22;

FIG. 25 is a view showing, by way of example, a structure of a range information memory of the range condition collating circuit shown in FIG. 22;

FIG. 26 shows a concrete example of the contents or values placed in the range information memory for realizing the state transition illustrated in FIG. 3;

FIG. 27 is a view showing values placed in a state transition table for realizing the state transition illustrated in FIG. 3;

FIG. 29 is a view showing another exemplary structure of the range information memory of the range condition collating circuit shown in FIG. 22;

FIG. 30 is a view showing a further exemplary structure of the state transition table of the range condition collating circuit shown in FIG. 22;

FIG. 32 is a view showing still another exemplary structure of the information memory of the range condition collating circuit shown in FIG. 22;

FIG. 33 is a view showing still another exemplary structure of the state transition table of the range condition collating circuit shown in FIG. 22;

FIG. 36 is a view shown values placed in a range information memory in realizing the state transitions shown in FIG. 35;

FIG. 37 is a view showing values entered in a state transition table in realizing the state transitions illustrated in FIG. 35;

FIG. 38 is a view similar to FIG. 36 and shows another exemplary sructure of the range information memory in case retrieval symbols are affixed to a numerical value in precedence and in succession thereto;

FIG. 39 is a view similar to FIG. 37 and shows another exemplary structure of the state transition table in case retrieval symbols are affixed to a numerical value in precedence and in succession thereto:

FIG. 41 is a view showing contents of the range information memory in realizing the state transitions illustrated in FIG. 40;

FIG. 42 is a view showing contents of the state transition table in realizing the state transitions illustrated in FIG. 40;

FIG. 43 is a view corresponding to FIG. 41 and shows a further exemplary structure of the range information memory in case a range condition for an alphabetic letter string is given;

FIG. 44 is a view corresponding to FIG. 42 and shows yet another exemplary structure of the state transition table in case a range condition for an alphabetic letter string is given;

FIG. 46 is a view showing contents of a range information memory incorporated in the range condition collating circuit shown in FIG. 45;

FIG. 63 is a view showing an example of the state transition table of the character string collating circuit shown in FIG. 62;

FIG. 64 is a view showing an example of the state transition table of the range condition collating circuit shown in FIG. 62;

FIG. 65 is a view showing a state transition diagram of the character string collating circuit shown in FIG. 62;

FIG. 66 is a view showing contents of the state transition table of the character string collating circuit shown in FIG. 62;

FIG. 68 is a view showing a structure of the range information memory of the range condition collating circuit shown in FIG. 62;

FIGS. 69A and 69B show contents of the state transition table used in the range condition collating circuit shown in FIG. 62;

FIG. 71 shows in a block diagram details of the range-conditional character string retrieving system according to a further embodiment of the invention.

DETAILED DESCRIPTION OF THE PREFERRED EMBODIMENTS

Figure 2:
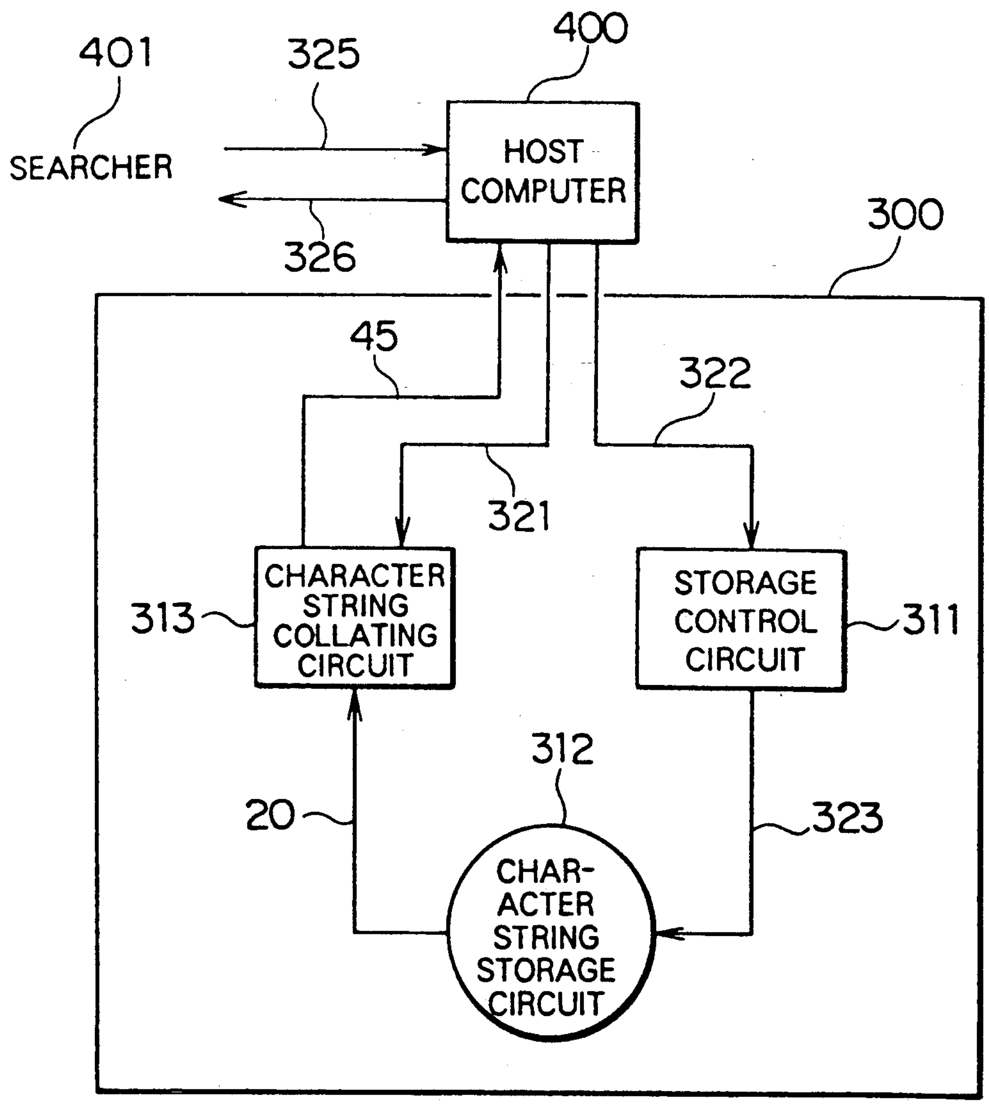
FIG. 2 is a block diagram showing a character string retrieving system based on a full-text search technique known heretofore.

In the following, the present invention will be described in detail in conjunction with preferred or exemplary embodiments thereof by reference to the accompanying drawings.

For better understanding of the preferred embodiments of the present invention as well as for convenience of the description, it will be helpful to define or elucidate several terms used herein. The phrase "character string" is used to encompass conceptually a numeric character string and a non-numeric character string and may contain both the numeric character string and the non-numeric character string, which may thus be termed "numeric character substring" and "non-numeric character substring" respectively, where appropriate. With the term "string" and "substring", it is intended to mean not only the character string which includes a succession of plural characters (numeric and-/or non-numeric characters) but also the character string which includes only one character (numeric or non-numeric). In this context, the character string or series which is subjected to retrieval (i.e. from which a character string of interest is to be retrieved) may be termed "input character string (or series)" or "character string subjected to retrieval". The non-numeric character string may be composed of alphabetic letter(s), Chinese character(s), Japanese kana(s), and/or other symbols such as unit symbols, punctuations, blanks, etc.. The phrase "numerical value" means a value represented by a numeric character string containing one or more numeric characters. Accordingly, description, for example, "a numerical value of one or more digits" may be used equivalently to "a numeric character string containing one or more numeric characters" with the digits being assigned with orderly significances. Further, a value (e.g. code value) may be represented by symbols other than the numeric characters such as, for example, alphabetic letters arrayed orderly in its broader sense. Further, a numerical value of one character (i.e. one digit) may be termed "numeric character value". Finally, a character representing a numerical value of a given digit (at a given position or place) may be termed "numeral". It should however be understood that the above are words of convenience and are not to be construed as limiting terms.

FIG. 1 is a functional block diagram showing a general arrangement of a range-conditional character string retrieving system 300 according to an embodiment of the present invention which is arranged to perform search or retrieval of a character string containing a numerical value or values (represented by a numeric character string or strings). Referring to FIG. 1, upon starting of the search or retrieval, a searcher or user 401 inputs a retrieving condition (i.e. condition for search or retrieval) 325 into a host computer 400. In response, the host computer 400 analyzes the retrieving condition 325, and transfers to a range condition collating circuit 315 retrieval (search) control information 324 related to a numerical value part(s) of the retrieving condition 325 (which part may also be termed the range-conditional part), while for non-mumeric character parts of the retrieving conditions 325, the host computer 400 transfers corresponding retrieval control information 321 to a character string collating circuit 313. The character string collating circuit 313 and the range condition collating circuit 315 operate in parallel with each other to perform the retrieval of a character string of concern by reading out a character string 20 to be subjected to the retrieval (which may also be referred to as the input character string as previously elucidated) from a character string storage unit 312 on a one-by-one character basis. When presence of a numerical value (represented by a numeric character substring) which satisfies the retrieving condition is detected in the input character string 20 by the range condition collating circuit 315, result of the retrieval indicated at 46 (also referred to as the retrieved result 46) is then transferred to the host computer 400. Similarly, upon detection of the presence of a non-numeric character substring which satisfies the retrieving condition in the input character string 20 by the character collating circuit 313, retrieved result 45 is similarly transferred to the host computer 400. Upon reception of the retrieved result 45 and/or 46, the host computer 400 informs the searcher 401 document or text information 326 which contains the non-numeric character substring(s) and the numerical value(s) which have been found to satisfy the retrieving condition 325.

At this juncture, it should be mentioned that as orher circuits which constitute parts of the range-conditional character string retrieving system 300, there may additionally be incorporated a retrieval control circuit, a composite condition discriminating circuit and others, although they are omitted from illustration in FIG. 1. In that case, the retrieval control circuit may be so implemented as to receive the retrieving condition 325 intact from the host computer 400 without undergoing the analysis by it, whereon the retrieval control circuit itself analyzes the retrieving condition to supply the retrieval control information 321 to the character string collating circuit 313 while supplying the retrieval control information 324 to the range condition collating circuit 315. On the other hand, the composite condition discriminating circuit may be incorporated in the range-conditional character string retrieving system 300 in such a configuration as to be capable of checking whether or not the composite such as inter-character positional relations contained in the retrieving condition is satisfied. In this manner, it is apparent that the range-conditional character string retrieving system 300 may additionally include a variety of functional units other than those shown in the FIG. 1.

Figure 4:
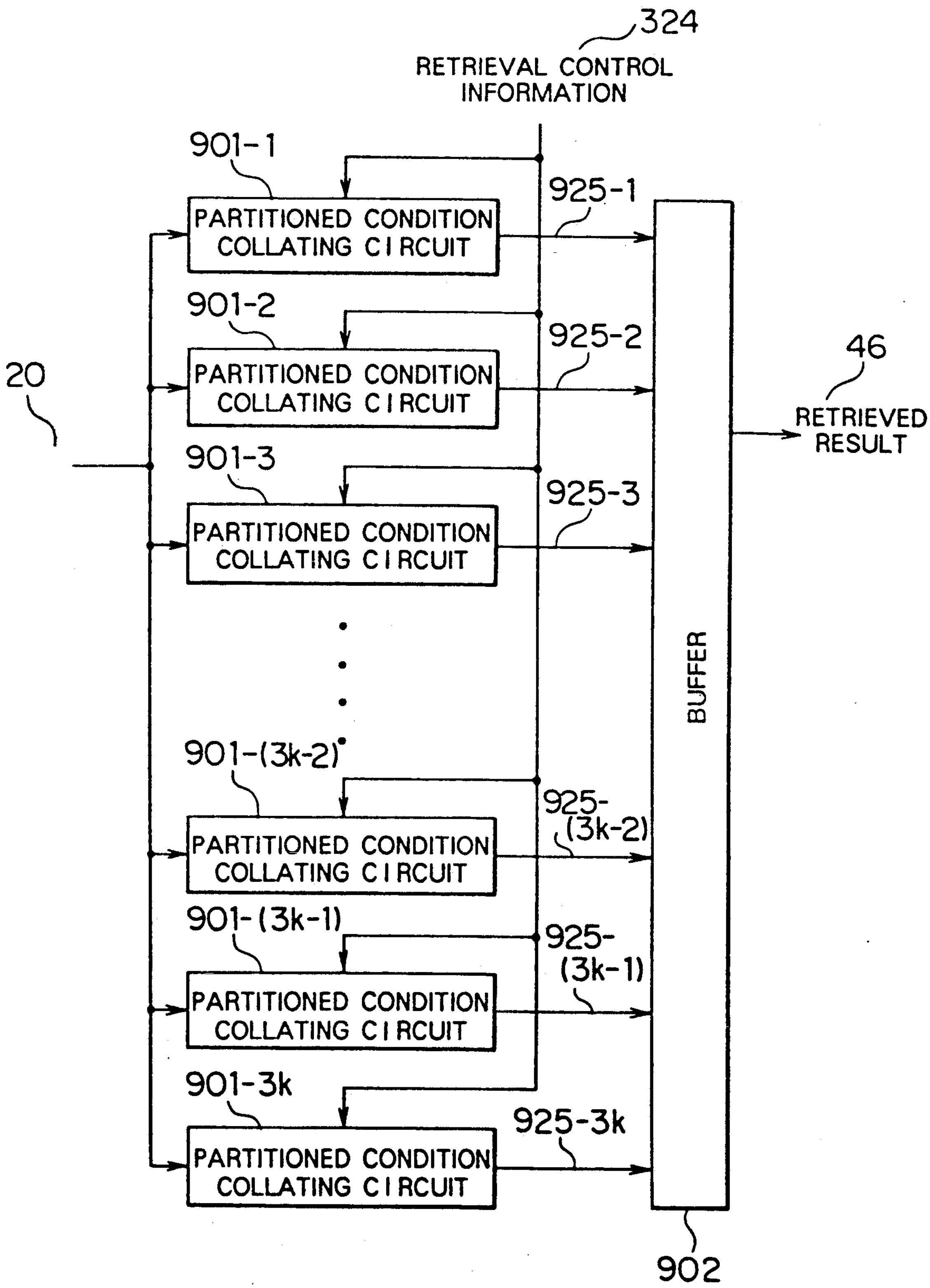
FIG. 4 shows in a block diagram a circuit configuration of a range condition collating circuit according to a first aspect of the present invention.

Referring to FIG. 4 which shows in a block diagram a circuit arrangement of a range condition collating circuit 315-1 according to a first embodiment of the invention, the range condition collating circuit 315-1 is constituted by a plurality of partitioned condition collating circuitrs 901-i (where i is an integer in a range of 1, . . . , 3 k). According to the range condition partitioning concept taught by the aspect of the present invention, the range condition as given is divided or partitioned into three condition parts when the numbers of digits of numerical values representing, respectively, a lower limit value and an upper limit value which delimit the given range condition differ from each other by two or more digits. Accordingly, when k partitioned range conditions (where k represents a given integer) are to be simultaneously retrieved, the range condition collating circuit 315-1 is then constituted by 3 k partitioned condition collating circuits 901-i connected in parallel with one another.

The range condition contained in the retrieving condition 325 designated by the operator 401 is partitioned by the host computer 400 into a number of condition parts in correspondence to the digit numbers of the numerical values which delimit the range condition. Further, the retrieval control information 324 corresponding to the partitioned range conditions is generated by the host computer 400 to be supplied distributively to the respective partitioned range condition collating circuits 901-i which then perform the range-conditional retrievals in parallel with one another to thereby output the results of retrieval 925-i, respectively. The retrieved results 925-i outputted from the individual partitioned condition collating circuits 901-i are loaded in a buffer 902 to be buffered and subsequently transferred to the host computer 400 in a sequential order as the retrieved result, as indicated generally at 46.

Figure 5:
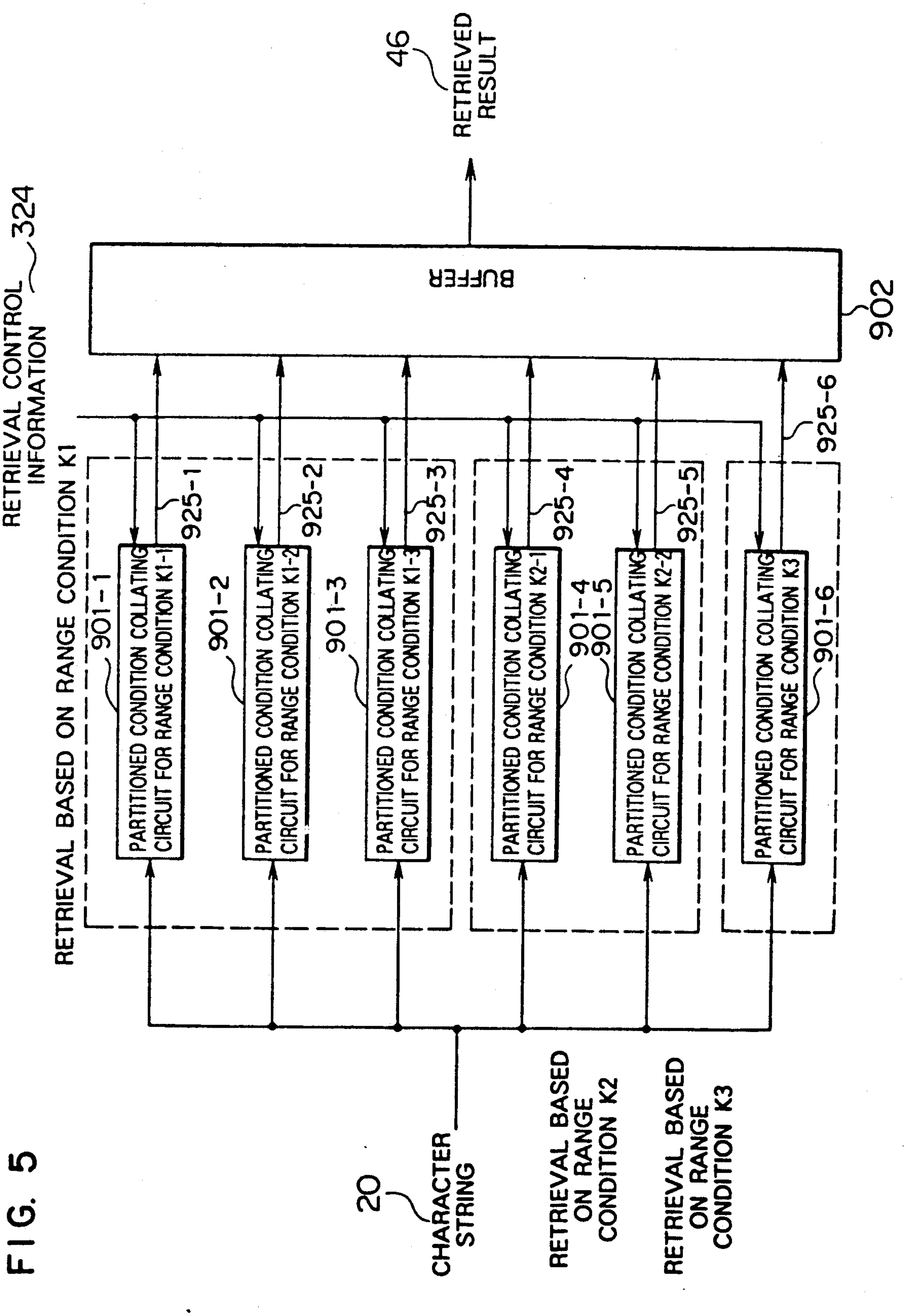
FIG. 5 is a block diagram showing a circuit configuration of a first embodiment of the range condition collating circuit shown in FIG. 4.

As a first concrete example of the range condition collating circuit 315-1, FIG. 5 shows a circuit configuration thereof with is constituted by six partitioned condition collating circuits 901-i (where i=1, . . . , 6). According to the range condition partitioning concept taught by the invention, at least two range conditions can simultaneously be subjected to retrieval. Unless the number of the range conditions partitioned on a digit-number basis exceeds six, three or more partitioned range conditions can simultaneously retrieved as well. By way of example, let's assume in connection with the divided condition collating circuit arrangement shown in FIG. 5 that the range condition K1 contains an upper limit value and a lower limit value which differ from each other by two or more digits, the range condition K2 contains upper and lower limit values differing by one digit and that upper and lower limit values of the range condition K3 are of a same digit number. In that case, the number of the partitioned range conditions is six. Accordingly, the three range conditions K1 to K3 can simultaneously be considered in the retrieval.

More specifically, in the case assumed above, the host computer 400 divides the range condition K1 into three subconditions, i.e. the range condition K1-1, the range condition K1-2 and the range condition K1-3. On the other hand, the range condition K2 is partitioned by the host computer 400 into two subconditions, i.e. the range condition K2-1 and the range condition K2-2, while the range condition K3 is left as it is. The retrieval control information 324 corresponding to the six partitioned range conditions, respectively, are loaded to the partitioned condition collating circuits 901-i (i=1, . . . , 6), respectively, whereby the retrieval is simultaneously effectuated on the basis of the six partitioned range conditions.

Figure 6:
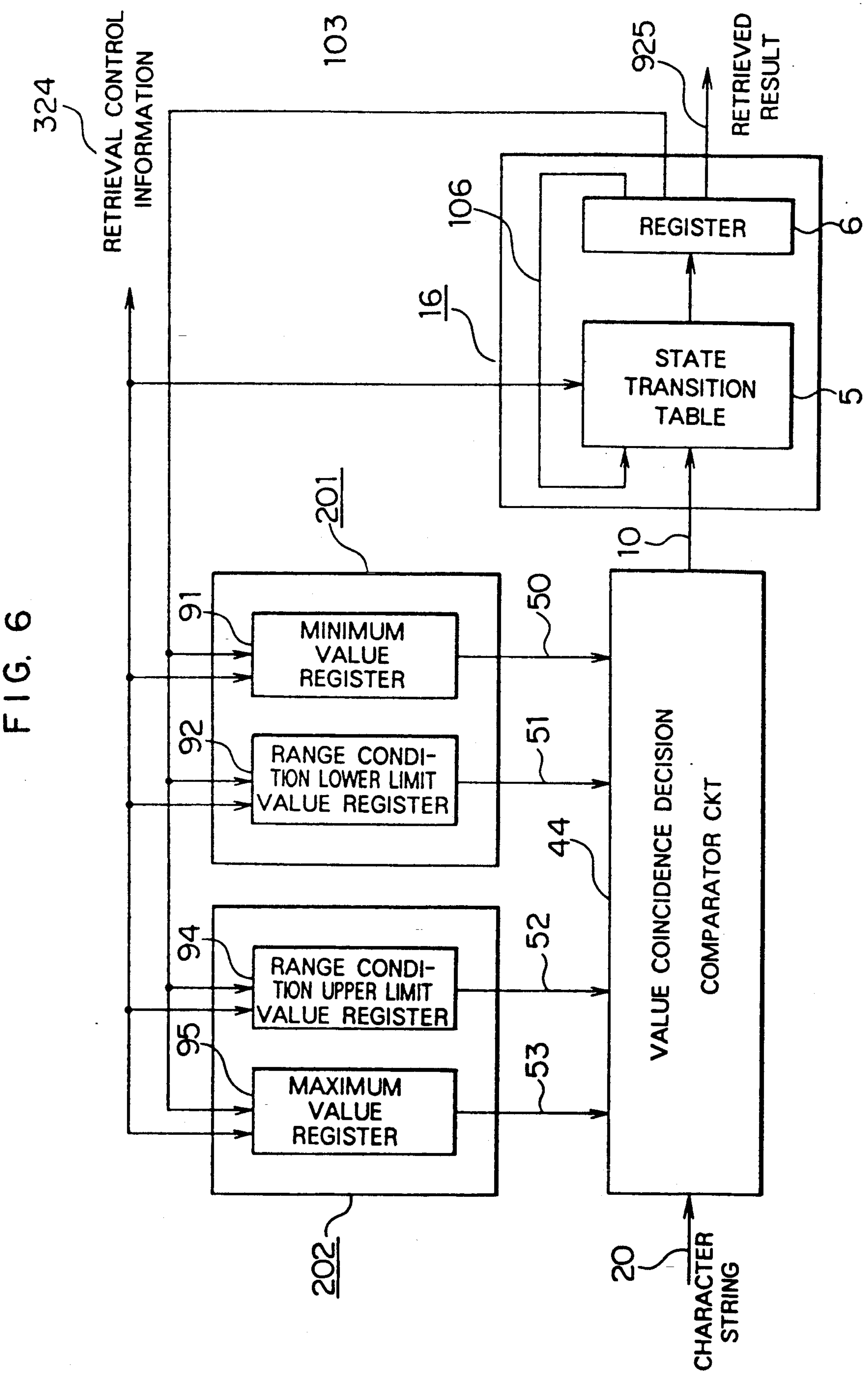
FIG. 6 is a block diagram showing a circuit configuration of a first embodiment of a partitioned range condition collating circuit shown in FIG. 4.

FIG. 6 is a block diagram showing a circuit configuration of a first embodiment of the partitioned condition collating circuit 901 according to the invention. Referring to the figure, the partitioned condition collating circuit 901 is constituted by a lower limit value register 201 composed of a minimum value register 91 and a range condition lower limit value register 92, an upper limit value register 202 composed of a range condition upper limit register 94 and a maximum value register 95, a value coincidence decision comparator circuit 44 and a finite automaton 16 which is composed of a state transition table 5 and a register 6 and which makes state transitions in accordance with the results of comparison 10 outputted from the value coincidence decision comparator circuit 44.

In the range condition lower limit value register 92, there is stored the lower limit value of the partitioned range condition in the form of character codes on a character-by-character basis. On the other hand, the minimum value register 91 stores in the form of character codes on a character-by-character basis a minimum value of a same digit number as that of the lower limit value of the partitioned range condition. In the case of a numerical value of four digits, by way of example, the minimum value stored in the register 91 is "0000". The range condition upper limit value register 94 stores an upper limit value of the partitioned range condition in the form of character codes on the character-by-character basis. Finally, the maximum value register 95 stores therein a maximum value of a same digit number as that of the upper limit value of the range condition in the form of character code on the character-by-character basis. In the case of a numerical value of four digits, for example, the maximum value stored in the register 95 is "9999". On the other hand, the finite automaton 16 reads out from the character codes stored in these four different registers 91, 92, 94 and 95, respectively, a numerical value or numeral to be collated in dependence on the position or digit at which the collation is to be performed and compares the numeral as read out with the input character string 20.

In this conjunction, it is to be noted that the state transition information for the state transition table 5 of the finite automaton 16 and the numerical values stored in the lower limit value register 201 and the upper limit value register 202, respectively, are supplied from the host computer 400 as the previously mentioned retrieval control information 324. The finite automaton 16 operates in conformance with the retrieval control information.

Now, description will be made of the operation of the partitioned condition collating circuit 901 shown in FIG. 6. It is assumed that the finite automaton 16 is initially in the state 0 (zero). In this state 0, the finite automaton 16 issues a select signal 103 to select and read out a string of characters (numeric character) corresponding to the collation for the first character of the range condition from the minimum value register 91, the range condition lower limit value register 92, the range condition upper limit value register 94 and the maximum value register 95, respectively. The numeric characters outputted from the minimum value register 91, the range condition lower limit value register 92, the range condition upper limit value register 94 and the maximum value register 95, respectively, are compared with the character string 20 by the value coincidence decision comparator circuit 44. In dependence on the results of the comparison indicated at 10, the state transition takes place correspondingly in the finite automaton 16, whereon the lower limit value register 201 or the upper limit value register 202 is selected in dependence on the reached state of the finite automaton 16.

By repeating the state transition described above, the range collation is performed while reading the input character string 20. When a string of numerical values which satisfies the range condition is detected in the input character string, result of the retrieval indicated at 925 is outputted.

Figure 7:
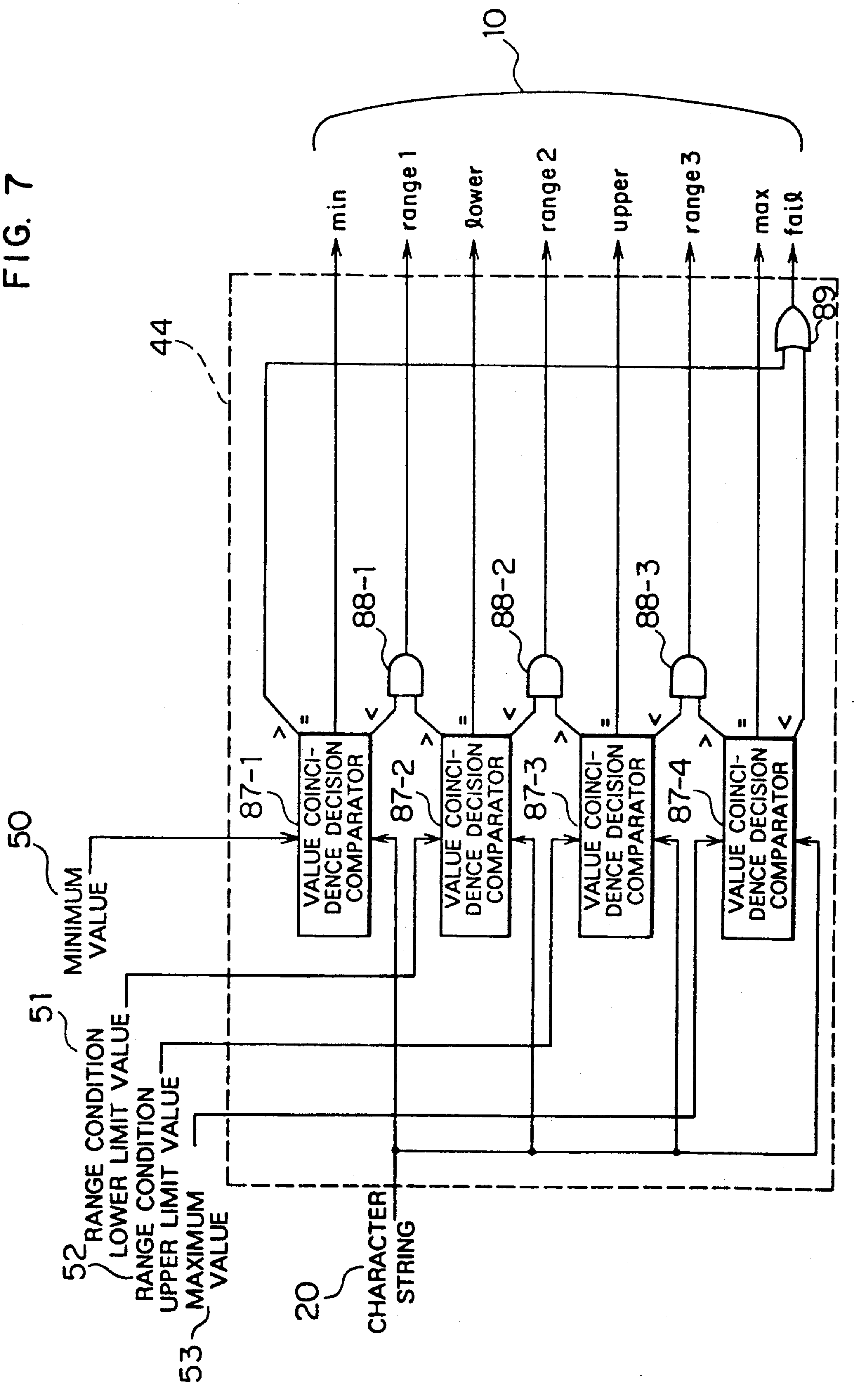
FIG. 7 is a block diagram showing an exemplary embodiment of a value coincidence decision comparator circuit shown in FIG. 6.

FIG. 7 is a block diagram showing an exemplary embodiment of the value coincidence decision comparator circuit 44 of the partitioned condition collating circuit shown in FIG. 6. As can be seen in FIG. 7, the coincidence decision comparator circuit 44 is composed of four comparators 87-i (where i=1, 2, 3, 4) connected in parallel and each capable of making decision as to value coincidence, wherein the input character string 20 is comparatively collated simultaneously with a minimum value 50, a lower limit value 51 of the range condition, an upper limit value 52 of the range condition and a maximum value 53 which are outputted from the lower limit value register 201 and the upper limit value register 202. When coincidence with the maximum value 50 is decided or detected, comparison result "min" is selected as the output 10, while coincidence with the lower limit value 51 of the range condition results in selection of the comparison result "lower". Further, when coincidence with the upper limit value 52 of the range condition is decided, "upper" is selected as the comparison result. Coincidence with the maximum value 53 results in selection of "max" as the comparison result. On the other hand, a numerical value greater than the minimum value 50 and smaller than the lower limit value 51 of the range condition can be detected by an AND circuit 88-1 which then selects "range 1" as the comparison result, while a numerical value greater than the lower limit value 51 of the range condition and smaller than the upper limit value 52 of the range condition can be detected by an AND circuit 88-2, whereby "range 2" is selected as the output. Further, a numerical value greater than the upper limit value 52 of the range condition and smaller than the maximum value 53 can be detected by an AND circuit 88-3 which then selects "range 3" as the output. Finally, character codes smaller than the minimum value 50 and greater than the maximum value can be detected by an OR circuit 89, whereby "fail" is selected as the comparison result. The result of the comparative collation indicated generally at 10 is selected from the outputs "min", "lower", "upper", "max", "range 1", "range 2", "range 3" and "fail" to be utilized for bringing about the state transition in the finite automaton 16.

Next, description will be turned to the state transition of the finite automaton 16 constituting a part of the partitioned condition collating circuit 901 of the partitioned condition collating circuit shown in FIG. 6.

It is assumed that the range condition is given by $$12 \leq K1 \leq 35$$

Figure 8:
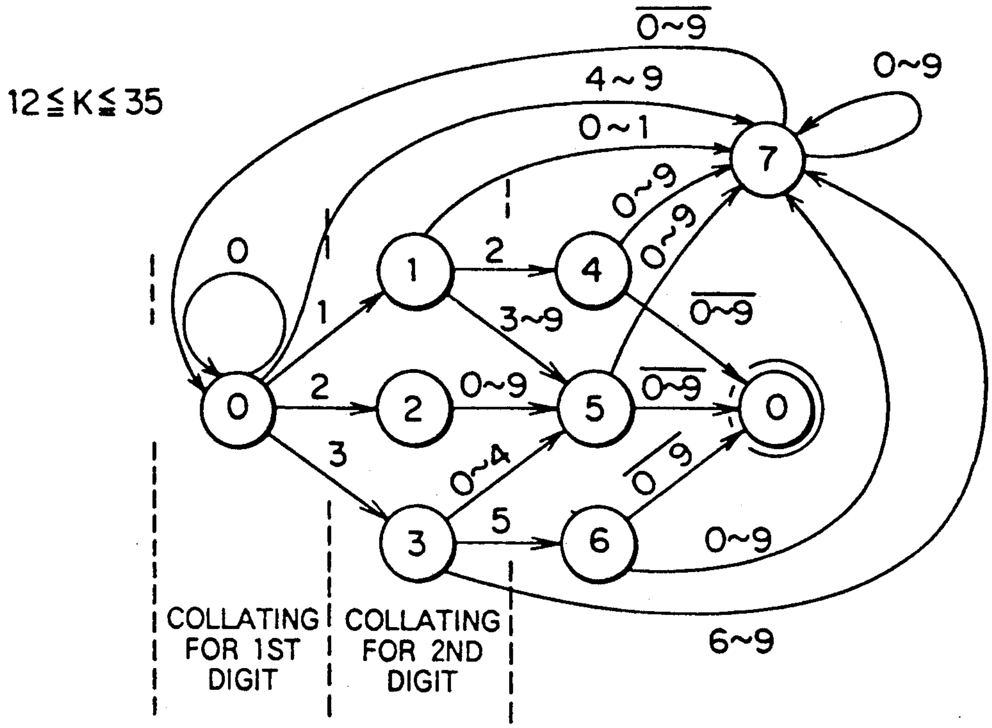
FIG. 8 shows a state transition diagram for illustrating a first example of operation of the partitioned condition collating circuit shown in FIG. 6.

A corresponding state transition diagram of the finite automaton 16 is illustrated in FIG. 8. As will be seen from this state transition diagram, the state transition by one to the right as viewed in the figure indicates that the comparative collation is performed with a numeric character of a succeeding digit or position. In the states aligned in the vertical direction, numeric characters of a same digit or position are simultaneously searched. The topmost state represents that a numerical value coinciding with the lower limit value of the range condition is searched. In the mid state, numerical values greater than the lower limit value of the range condition and smaller than the upper limit value of the range condition are being searched. In the lowermost state, a numerical value coinciding with the upper limit value of the range condition is searched. Parenthetically, it should be mentioned that the finite automaton 16 resumes the state 0 whenever other character code than that of the numerical value is detected, although omitted from illustration in FIG. 8.

In each of the state of the finite automaton 16, the range information values 50, 51, 52 and 53 corresponding to the digit position for which collation is to be performed are simultaneously read out from the range condition lower limit value register 92, the range condition upper limit value register 94, the minimum value register 91 and the maximum value register 95, respectively, to undergo the comparative collation.

In this context, it is assumed that addresses of the range condition lower limit value register 92, the range condition upper limit value register 94, the minimum value register 91 and the maximum value register 95, respectively, are in the sequential order of the digits or positions of the numerical values to be retrieved. More specifically, it is assumed that the content of the zeroth address (0) in each register is a character code for the collation with a numerical value of a first numeral in the numeric character string to be retrieved, and the content at the first address (address 1) in each register is a character code for collation with a numerical value of the second numeral in the string.

Figure 9:
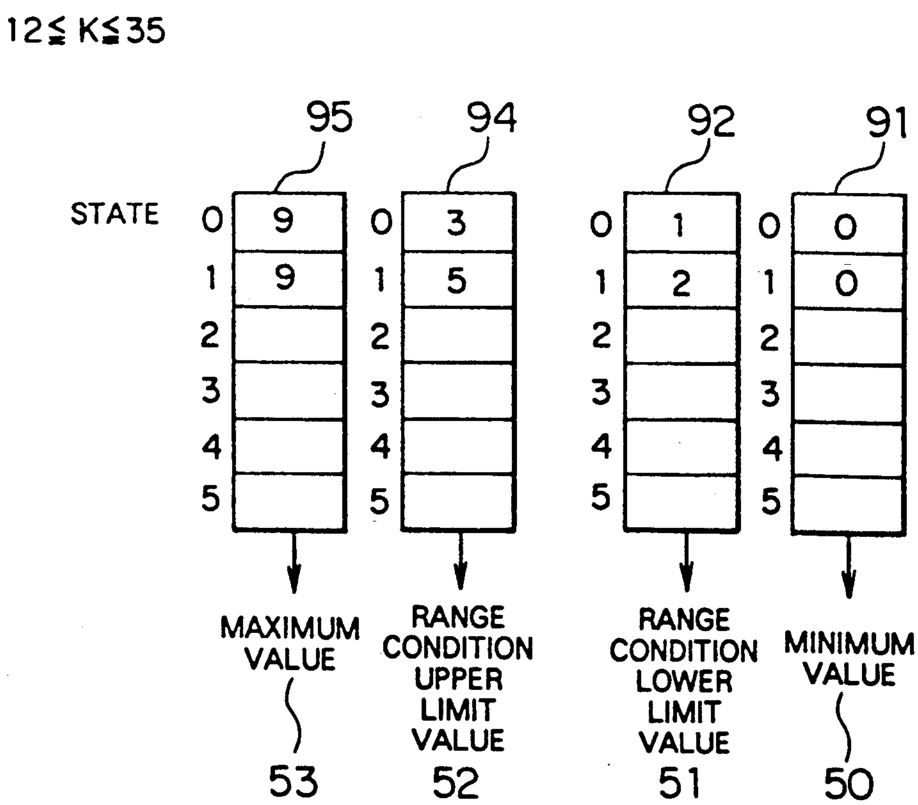
FIG. 9 is a view showing, by way of example, values placed in a minimum value register, a range condition lower limit value register, the range condition upper limit value register and a maximum value register, respectively, for realizing the state transitions shown in FIG. 8.

FIG. 9 is a view for illustrating, by way of example, the contents of the mimimum value register 91, the range condition lower limit value register 92, the range condition upper limit value register 94 and the maximum value register 95, respectively. More specifically, stored in the range condition lower limit value register 92 are "1" and "2", wherein "1" at the zeroth address (0) is selected for collation with a numerical value of the first digit or position, while "2" at the first address (1) is selected for collation with a numerical value of the second digit in dependence on the state of the finite automaton 16. Similarly, there are stored "3" and "5" in the range condition upper limit value register 94, while "0" and "0" are stored in the minimum value register 91 with "9" and "9" being placed in the maximum value register 95.

FIG. 10 is a view showing, by way of example, contents of the state transition table 5 incorporated in the finite automaton 16. The state 0 represents the state in which collation of the numerical value of the first digit is performed. Upon detection of coincidence with the lower limit value of the range condition (i.e. generation of "lower" output) in the state 0, state transition occurs to the state 1, while when the above collation results in that the numerical value of the first digit is greater than the lower limit value of the range condition and smaller than the upper limit value of the range condition (i.e. upon generation of "range 2" output), transition to the state 2 takes place, while upon coincidence with the upper limit value of the range condition (i.e. "upper" output), transition is made to the state 3.

In the states 1, 2 and 3, collation of the numerical value of the second digit is performed.

The state 1 represents the state in which a numerical value coinciding with the lower limit value of range condition is searched. When the numerical value which coincides with this lower limit value is detected in this state 1 (i.e. generation of "lower" output), transition is made to the state 4, While detection of a numerical value greater than the lower limit value of the range condition (i.e. output of "range 2", "upper", "range 3" or "max") results in the state transition to the state 5.

The state 2 represents the state in which a numerical value greater than the lower limit value of the range condition and smaller than the upper limit value thereof is searched. In this state, detection of any one of numerical values falling within the range of the minimum value to the maximum (output of "min", "range 1", "lower", "range 2", "range 3" or "max") is attended with the state transition to the state 5.

In the state 3, search is performed for a numerical value which coincides with the upper limit value of the range condition. Upon detection of the numerical value coincident with the upper limit value ("upper" output), transition is made to the state 6, while detection of a numerical value smaller than the upper limit value (output of "min", "range 1", "lower" or "range 2") brings about the state transition to the state 5.

When a character string other than the numeric character string is detected in the states 4, 5 and 6, it is decided that the range condition is satisfied, whereupon transition is made to the state 0 indicated as enclosed in double circles in FIG. 10.

In case numerical values other than those falling within the condition range are detected, reading of these numerical values are skipped, as indicated by the transition to the state 7.

As will now be understood, according to the range-conditional retrieval of the invention described above, the automaton is so realized that there are required the three states for collation with the numerical values of the individual digits at the most, i.e. the state for searching the numerical value coinciding with the upper limit value of the range condition, the state for searching the numerical value coinciding with the lower limit value of the condition range and the state in which the numerical value greater than the lower limit value of the range condition and smaller than the upper limit value thereof is seached, wherein the state transition is made in dependence on the result 10 of the simultaneous comparisons of the character of the input character string 20 with the minimum value 50, the lower limit value 51 of the range condition, the upper limit value 52 thereof and the maximum value 53 in each of the states.

as a second example (example 2) of the range condition, let's consider the following condition:

$15 \leq K \leq 142.$

In the case of this example of the range condition, it will be seen that the upper limit value defining the condition differs from the lower limit value by one in the number of digits. More specifically, the lower limit value is of two digits while the upper limit value is of three digits. Under the circumstances, the range condition is partitioned into two subconditions as follows:

(1) $15 \leq K1 \leq 99$ (condition K1)

(2) $100 \leq K2 \leq 142$ (condition K2)

Figure 11:
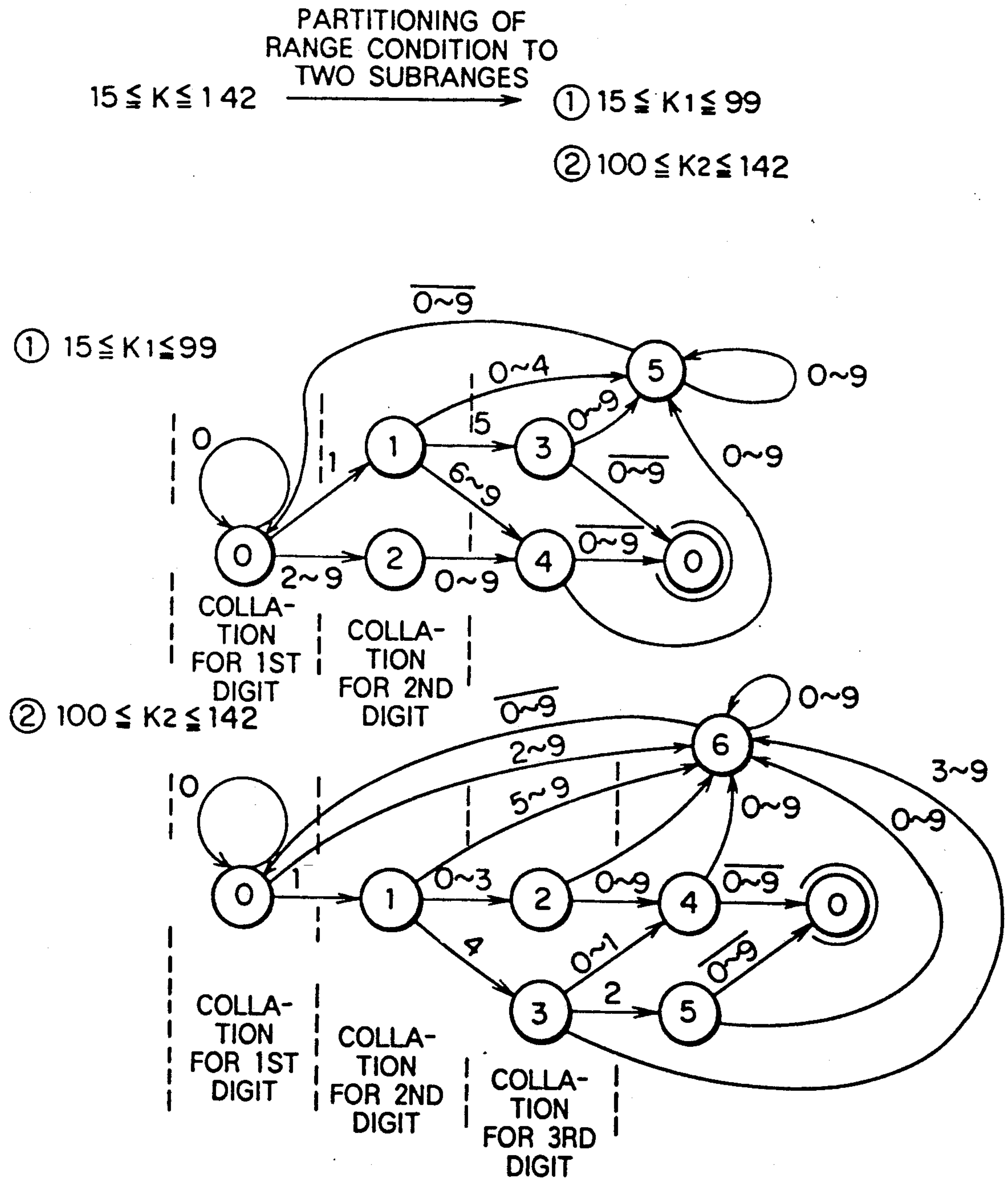
FIG. 11 is a view showing a state transition diagram for illustrating a second example of operation of the partitioned condition collating circuit shown in FIG. 6.
Figure 12:
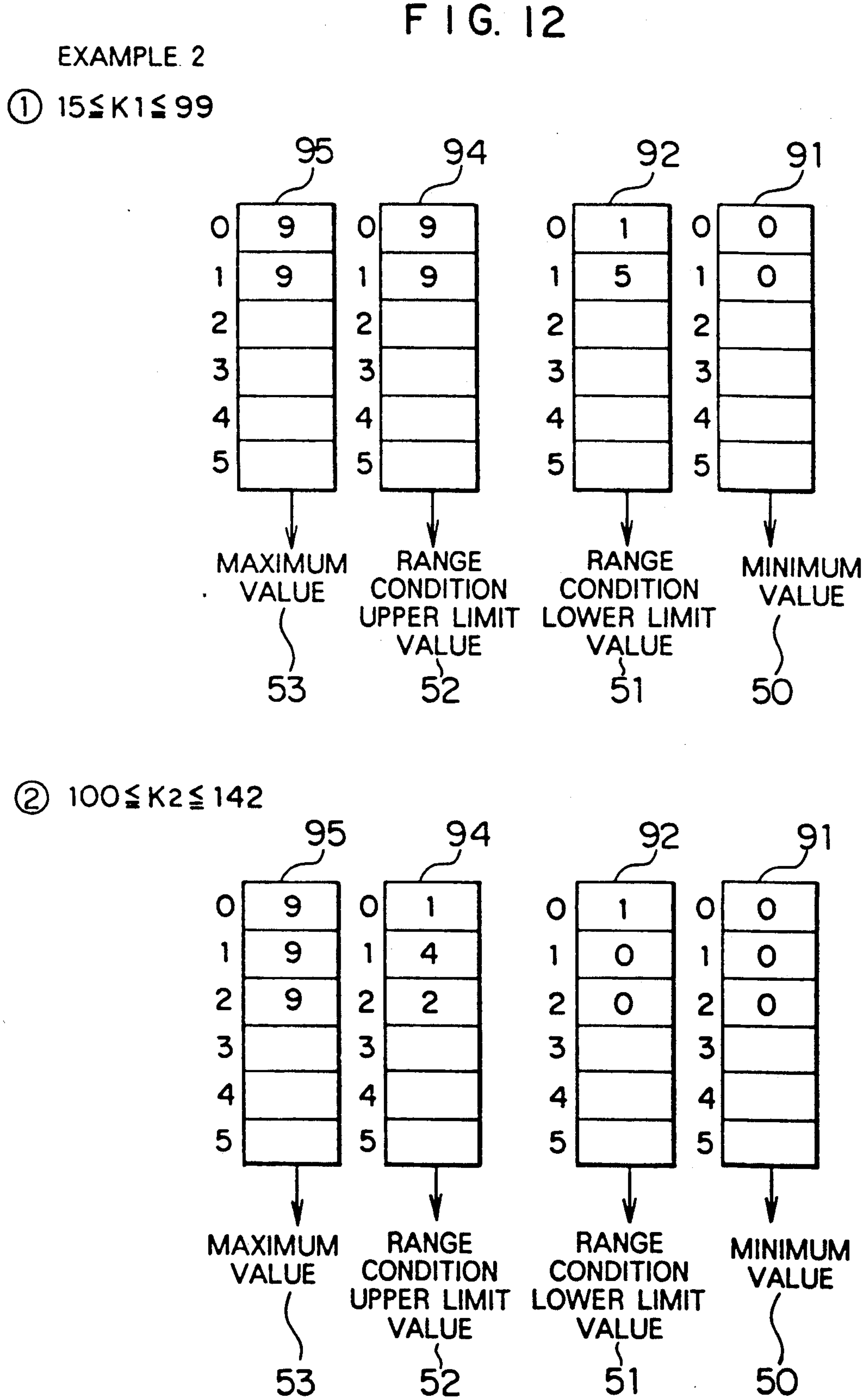
FIG. 12 is a view showing, by way of example, values placed in the minimum value register, the range condition lower limit value register, the range condition upper limit value register and the maximum value register, respectively, for realizing the state transitions illustrated in FIG. 11.

FIG. 11 shows state transition diagrams for the partitioned range conditions mentioned above. In this connection, FIG. 12 shows the contents of the range condition lower limit value register 92, the range condition upper limit value register 94, the minimum value register 91 and the maximum value register 95, respectively. Further, FIGS. 13A and 13B show corresponding contents of the state transition table 5.

At first, the range condition K1 will be considered.

In this case, there are stored "1" and "5" in the range condition lower limit value register 92, "9" and "9" in the range condition upper limit value register 94, "0" and "0" in the minimum value register 91 and "9" and "9" in the maximum value register 95.

In the state 0, collation for the numerical value of the first digit is performed. When the numerical value of a character of the input character string 20 is "0 ", the state remains in the state 0. When this numerical value is "1", transition is made to the state 1. When it assumes one of the numerical values in the range of "2" to "9", state transition occurs to the state 2.

In the state 1, collation for the numerical value of a second character in the input character string 20 is performed. In case the second numeral of the character string 20 has a numerical value of "5", transition is made to the state 3, while when it has a numerical value of "6" to "9", inclusive, transition to the state 4 takes place.

In the state 2, collation for the numerical value of the second character in the string 20 is also performed. When this character is of a numrical value in a range of "0" to "9", inclusive, state transition to the state 4 occurs.

In the state 3 and 4, other character than the numerical values is searched. Upon detection of this other character, this means that a numeric chracter string which satisfies the partitioned range condition K1 mentioned previously is detected. In other words, a retrieved result 925 is obtained. Thus, the state 0 is resumed.

Now, consideration will be paid to the subcondition K2. In this case, there are stored "1", "0" and "0" in the range condition lower limit value register 92 with "1", "4" and "2" being placed in the range condition upper limit value register 94, while "0", "0" and "0" are placed in the minimum value register 91 with "9", "9", and "9" being stored in the maximum value register 95.

In the state 0, collation is performed with the numerical value of a first character in the input character string 20. In case the first character has a numrical value of "0", the state 0 remains as it is, while transition is made to the state 1 when the numerical value is "1".

In the state 1, collation is performed for the numerical value of a second character. When the second character in the input character string 20 has a numerical value of in a range "0" to "3" inclusive, state transition to the state 2 occurs. In case the numerical value of the second character is "4", transition is made to the state 3.

In the state 2, collation is performed with the numerical value of a third character in the character string 20. When this character has a numerical value in a range of "0" to "9" inclusive, transition is made to the state 4.

In the state 3, a third character in the input string 20 undergoes the comparative collation. When this character has a numerical value of "0" or "1", state transition occurs to the state 4, while transition is made to the state 5 when the third character is of a numerical value "2".

In the states 4 and 5, detection of other characters than the numeric character means that the numeric character string satisfying the range condition K2 has been detected, whereon the retrieved result 925 is outputted. Now, the automaton resumes the state 0.

It is to be noted the retrievals based on the two partitioned range conditions K1 and K2 are carried out simultaneously in parallel.

Next, let's consider a third example of the range condition for retrieval of numerical strings defined as follows:

$12 \leq K \leq 34567$

As can be seen, in the case of this example, the upper limit value of the range condition differs from the lower limit value thereof by two or more of digits (i.e. by three digits between five digits of the former and two digits of the latter). In this case, the above range condition is partitioned into threee subconditions mentioned below:

(1) 12≦K1≦99 (condition K1)

(2) 100≦K2≦9999 (condition K2)

(3) 10000≦K3≦34567 (condition K3)

Figure 14:
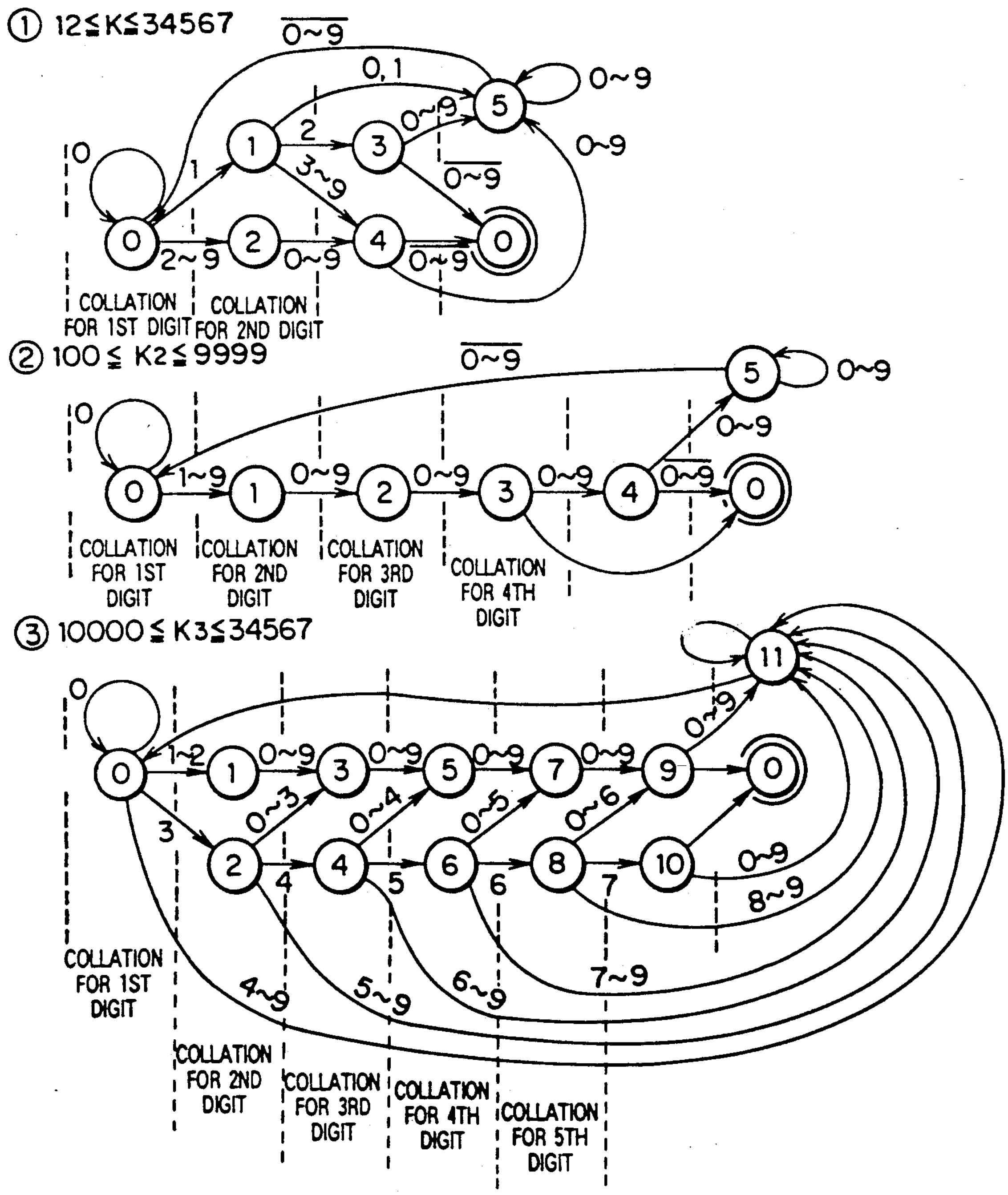
FIG. 14 is a state transition diagram for illustrating a third example of operation of the partitioned condition collating circuit shown in FIG. 6.

FIG. 14 shows state transition diagrams for the three range conditions resulting from the above division. In each of the states, range data 50, 51, 52 and 53 corresponding to the numerical values at the digit or position at which collation is to be performed are simultaneously read out from the range condition lower limit value register 92, the range condition upper limit value register 94, the minimum value register 91 and the maximum value register 95, respectively, for comparation with the input character string 20. Incidentally, it is assumed that the finite automaton 16 regains the state 0 whenever character code other than that of the numerical value is detected, although omitted from illustration of the state transition diagrams shown in FIG. 14.

Figure 15:
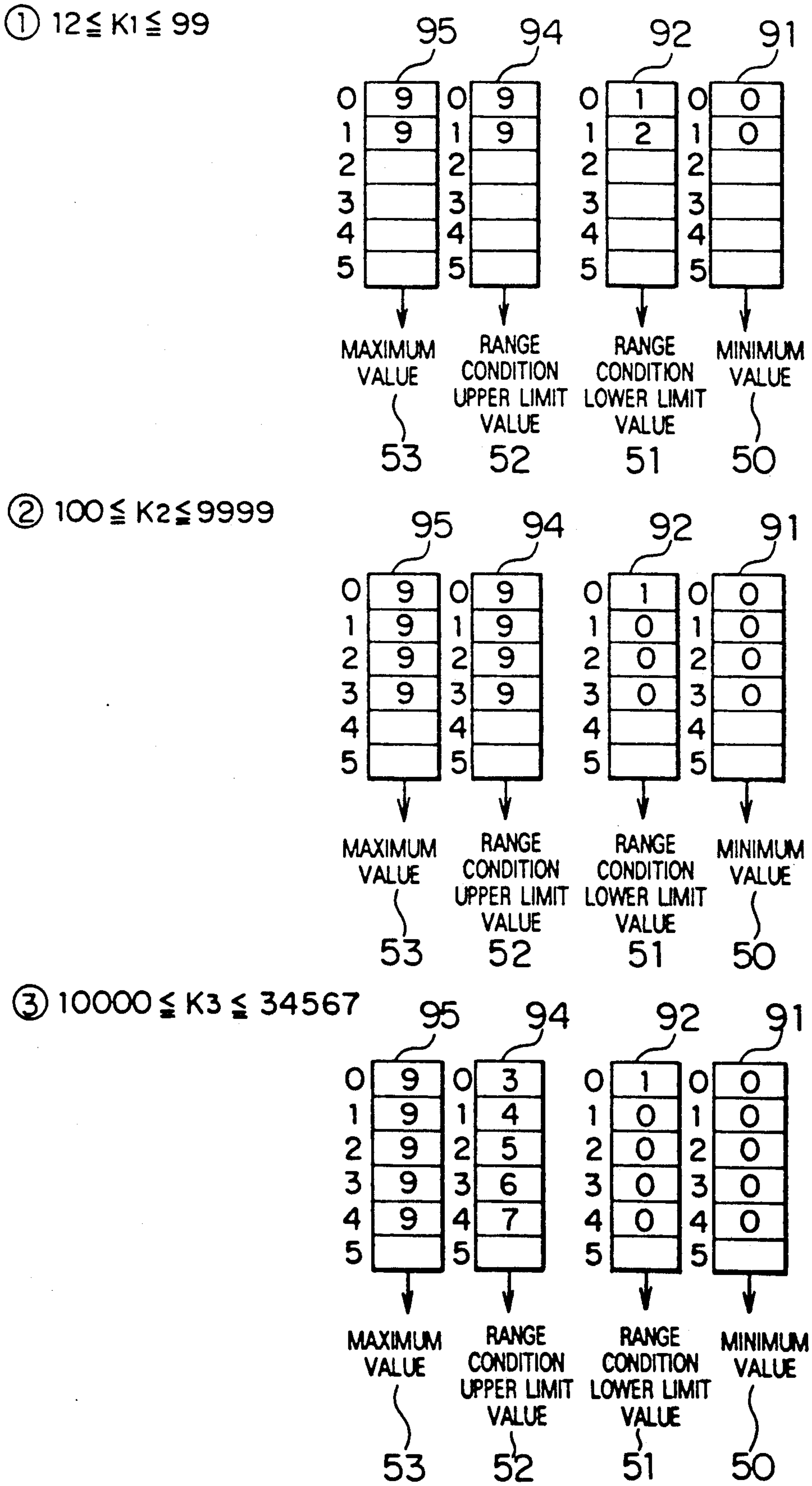
FIG. 15 is a view showing the contents of the minimum value register, the maximum value register, the range condition lower limit value register and the range condition upper limit value register, respectively, in realizing the state transitions shown in FIG. 14.

FIG. 15 shows the contents in the range condition lower limit value register 92, the range condition upper limit value register 94, the minimum value register 91 and the maximum value register 95, respectively, in the case of the abovementioned example. Further, FIGS. 16A to 16C show, respectively, the corresponding contents of the state transition table 5. State transitions occur in accordance with the results 10 of the comparative collation of the input character string 20 with the outputs of the range condition lower limit value register 92, the range condition upper limit value register 94, the minimum value register 91 and the maximum value register 95.

Description will first be directed to the detection of the numerical value of two digits which satisfies the range condition K1.

There are placed "1" and "2" in the range condition lower limit value register 92, "9" and "9" in the range condition upper limit value register 94, "0" and "0" in the minimum value register 91 and "9" and "9" in the maximum value register 95, respectively. Starting from this state, collation for retrieval is performed. In the state 0, collation for the numerical value of the first digit (first numeric character) is performed, while the collation for the numericasl value of the second digit is made in the states 1 and 2.

More specifically, in the state 0, collation for a numerical value of the first character in the input character string 20 is realized by reading out the information for the first digit from the range condition lower limit value register 92, the range condition upper limit value register 94, the minimum value register 91 and the maximum value register 94, respectively. When the first numeral in the input character string 20 is "0", the automaton 16 remains in the state 0. When this numeral is of a value "1", state transition occurs to the state 1. In case the first numeral in the input string 20 lies within a range of "2" to "9", inclusive, state transition is made to the state 1.

In the state 1, collation for the numerical value of the second digit of the input character string 20 is performed. When it is "2" state transition is made to the state 3, while in case the second character in the string 20 is of a numerical value in a range of "3" to "9", inclusive, transition is made to the state 4.

In the state 2, the collation for the second numeric character of the input string 20 is performed as well. When it lies within a range of "0" to "9", transition to the state 4 takes place.

The states 3 and 4 are to serve for detection of other characters than the numeric character. Upon detection of a non-numeric character, it is decided that a string of numerical values which satisfies the raange condition K1 has been detected, whereon the corresponding retrieved result 925 is outputted. At the same tune, the automaton resumes the state 0.

Next, description will be turned to the condition K2 for retrieving numerical values of three and four digits, respectively. For this purpose, there are placed "1", "0", "0" and "0" in the range condition lower limit value register 92 with, "9", "9", "9" and "9" being placed in the range condition upper limit value register 94, while "0", "0", "0" and "0" are placed in the minimum value register 91 with "9", "9", "9" and "9" being placed in the maximum value register 95.

In the state 0, comparative collation is performed for the numerical value of the first digit in the input character string. Similarly, in the state 1, collation is performed for the numerical value of the second digit. In the state 2, collation is performed for the numerical value of the third digit. In the state 3, collation is performed for the numerical value of the fourth digit.

More specifically, the state 0 is to serve for collation with the numerical value of a first character in the input character string 20.

When the first character is of numerical value "0", the automaton remains in the state 0, while it makes transition to the state 1 when the first character in the string 20 is of a numerical value in a range of "1" to "9" inclusive.

In the state 1, comparative collation is performed for a numerical value of the second character in the input character string 20. When the second character is a numeral in the range of "0" to "9" inclusive, state transition is made to the state 2. Similarly, state transition occurs to the states 3 and 4. When a character other than the numeral (numeric character) is detected in the state 3, this means that a numerical value of three digits has been detected. Similarly, detection of other character than the numeral in the state 4 means that a numerical value of four digits has been detected. Accordingly, the corresponding retrieved results 925 will then be outputted from the states 3 and 4, respectively. The automaton 16 then regains the state 0.

Next, description will be turned to the condition K3 for retrieval of numerical values each of five digits. In this case, the range condition lower limit value register 92 is loaded with "1", "0", "0", "0" and "0", the range condition upper limit value register 94 is loaded with "3", "4", "5", "6" and "7", the minimum value register 91 is loaded with "0", "0", "0", "0" and "0", and the maximum value register 95 is loaded with "9", "9", "9", "9" and "9".

In the state 0, comparative collation is performed for the first digit. In the states and 1 and 2, collation for retrieval is performed for the second digit, while collation for the third digit is performed in the states 3 and 4. Collation for the fourth digit is performed in the states 5 and 6. Finally, in the states 7 and 8, collation is performed for the fifth digit.

More specifically, the state 0 is destined for comparative collation of the the numerical value at the first digit of the input character.

When the first character in the character string 20 is "0", the state remains as it is. When the first character of the string 20 is either "1" or "2", transition is made to the state 1. In case the character of concern is "3", transition to the state 2 takes place.

In the state 1, collation for the second numeral of the input string is performed. When it lies within range of "0" to "9" inclusive, state transition occurs to the state 3.

In the state 2, the second character in the input string 20 is collated. When the second character is a numeral representing a value in the range of "0" to "3" inclusive, transition is made to the state 3. On the other hand, when it is "4", transition is made to the state 4.

In the state 3, comparative collation is performed for a third character of the input character string 20. When this character is a numeral in a range of "0" to "9" inclusive, transition to the state 5 takes place.

In the state 4, collation for the third character of the input character string 20 is performed as well. When the third character is one of numerals "0" to "4", transition is made to the state 5. When this character is a numeral "5", the state 6 is the destination of the state transition.

In the state 5, collation is conducted for the fourth character of the input character string 20. When it is one of numerals "0" to "9", transition is made to the state 7.

In the state 6, collation is also performed for the fourth character of the input character string 20. When this character is one of numerals "0" to "9", transition is made to the state 7, while transition to the state 8 occurs when the character of concern is "6".

In the state 7, collation is performed for the fifth character in the input character string 20. When this character is one of numerals "0" to 9", transition to the state 9 takes place.

In the state 8, collation for the fifth character in the input character string 20 is performed. When this character is one of numerals "0" to "6", state transition occurs to the state 9, while transition to the state 10 takes place when the fifth character is "7".

When characters other than the numericharacter are detected in the states 9 and 10, this means that the numeral string satisfying the range conditions K3 has been detected, whereon the retrieved data 925 is outputted. The automaton then resumes the state 0.

It should be noted that the three retrieving collations based on the partitioned range conditions K1, K2 and K3 are simultaneously executed in parallel with one another.

Figure 17:
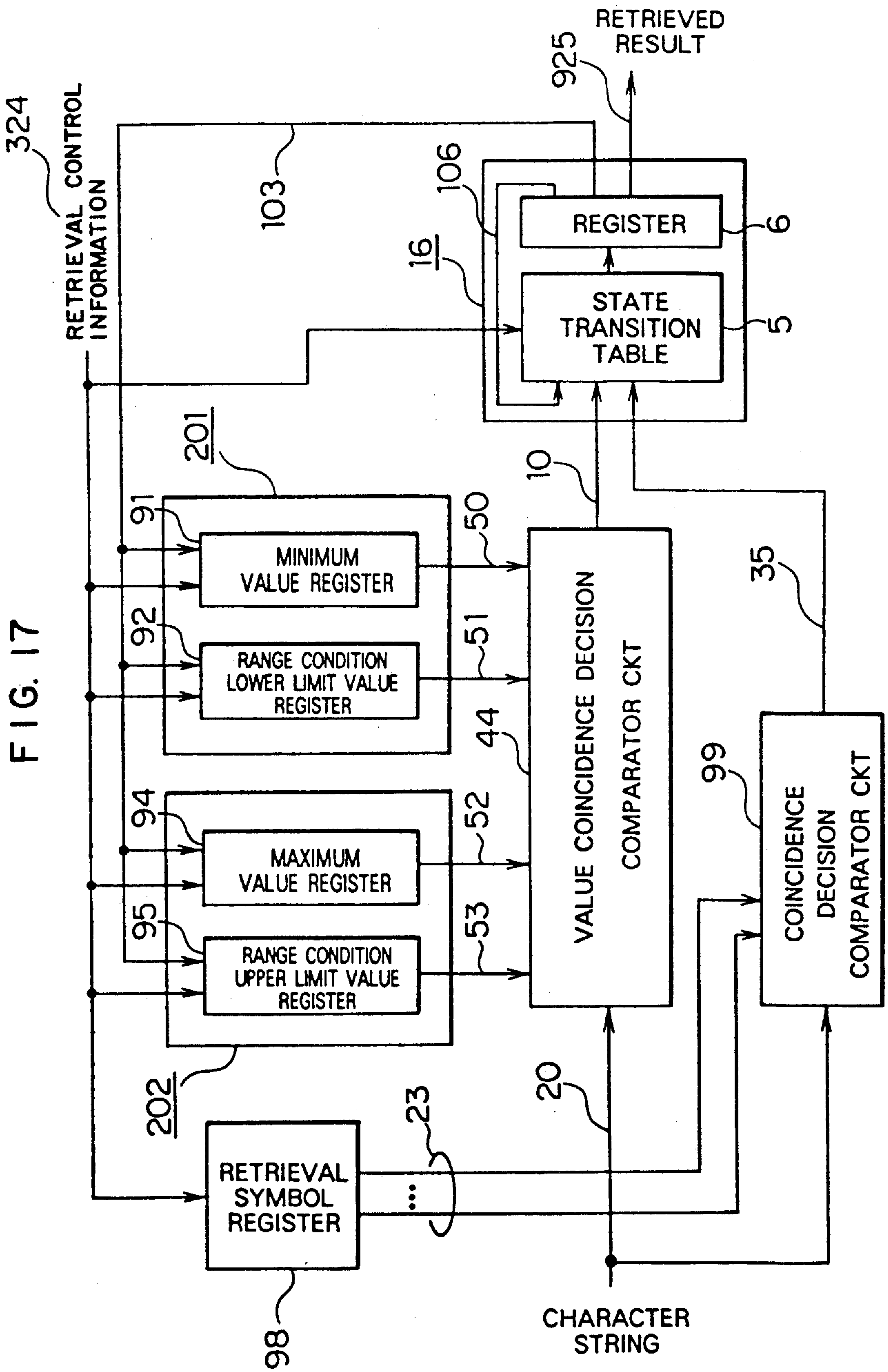
FIG. 17 is a block diagram showing a second embodiment of the partitioned condition collating circuit according to the first aspect of the invention which can be employed in the range-conditional character string retrieving system shown in FIG. 1.

FIG. 17 is a block diagram showing a second embodiment of the partitioned condition collating circuit 901 according to the invention which can be employed in the range-conditional character string retrieving system shown in FIG. 1. This embodiment of the partitioned condition collating circuit 901 is so arranged as to be capable of performing in addition to the retrieval of a numerical value satisfying a given range condition the retrieval of character strings (symbols) affixed in precedence to and in succession to the numeral value as the so-called separators. This circuit differs from the partition condition collating circuit shown in FIG. 6 in respects that a retrieval-designated symbol register 98 for storing the separators and a coincidence decision comparator circuit 99 are additionally provided and that the finite automaton 16 makes state transitions on the basis of the result 10 of comparison between the input character string 20 and the range conditions 50, 51, 52 and 53 and a result 35 of comparison between the former and the symbols for retrieval outputted from the retrieval-designated symbol register 98.

Figure 18:
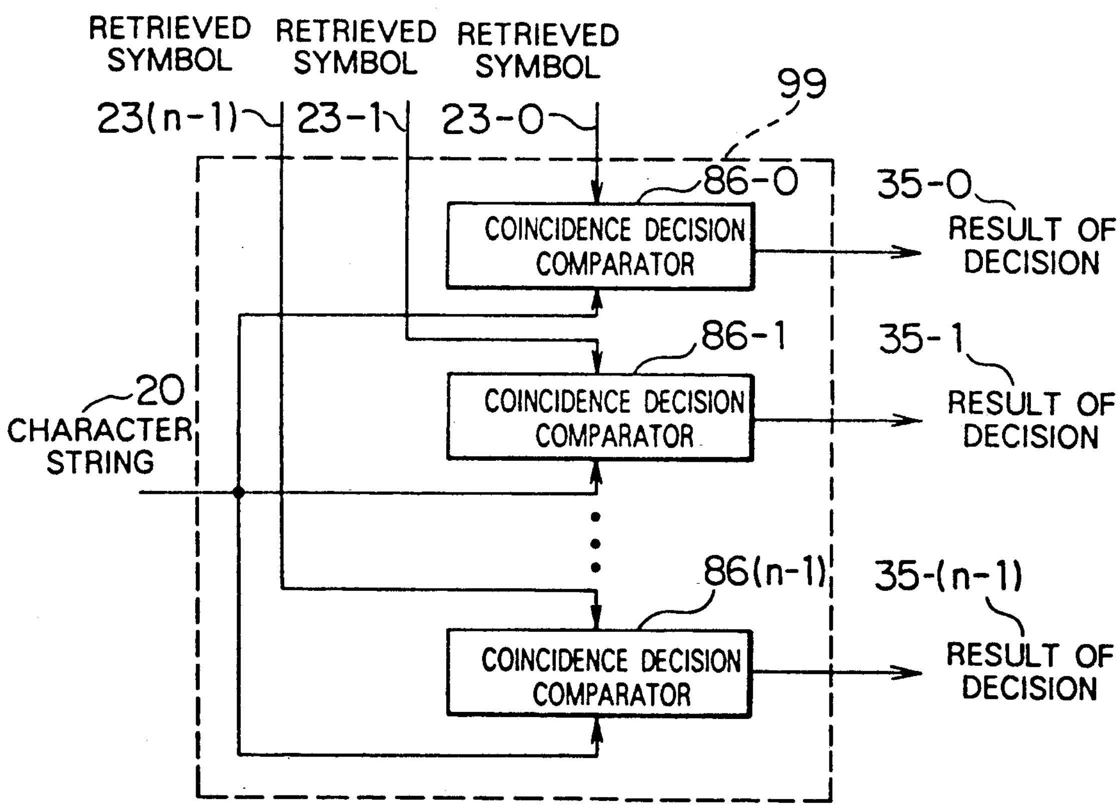
FIG. 18 is a block diagram showing a circuit configuration of a decision comparator circuit incorporated in the partitioned condition collating circuit shown in FIG. 17.

FIG. 18 is a block diagram showing a circuit configuration of the coincidence decision comparator circuit 99 incorporated in the range information retrieving circuit 901 shown in FIG. 17. In the retrieval-designated symbol register 98 (FIG. 17), there are stored character codes corresponding to a plurality of characters to be retrieved, respectively. In order to simultaneously carry out the comparative collations between the retrieval-designated characters 23-i (i=0, . . . , n−1) outputted from the register 98 and the input character string 20, there are disposed in parallel a plurality of comparators 86-i (i=0, . . . , n−1) each capable of making coincidence decision, wherein the retrieved results 35-i for which coincidence has been detected with the retrieval-designated characters 23-i, respectively, are selectively outputted.

The embodiment now under consideration is adapted to retrieve a character string in which numeric character substrings and non-numeric character substrings are mixedly coexistent. An example of the retrieval effectuated by designating the separators (non-numeric character strings) inserted before and after a numericic character string is shown below in terms of a range condition.

Sho-wa 3 nen≦K≦Sho-wa 66 nen where "Sho-wa" is a name of era adopted in Japan and expressed by two discrete Chinese characters "昭" (Sho) and "和" (wa), while "nen" indicates the year number expressed by a single Chinese character "年" (nen). Accordingly, "Sho-wa 3 nen" exemplified above represents the 3rd year of Sho-wa era.

In the range condition exemplified above, the upper limit numerical value and the lower limit numerical value thereof differ from each other by one digit (i.e. the lower limit value "3" is a numerical value of one digit while the upper limit value "64" is of two digits). This range condition is divided into two subconditions mentioned below:

(1) Sho-wa 3 nen≦K1≦Sho-wa 9 nen (condition K1)

(2) Sho-wa 10 nen≦K2≦Shou-wa 64 nen (condition K2)

FIG. 19 shows state transition diagrams corresponding to the partitioned range conditions K1 and K2, respectively, and FIG. 20 shows corresponding contents of the range condition lower limit value register 92, the range condition upper limit value register 94, the minimum value register 91, the maximum value register 95 and the retrieval symbol register 98, respectively. Further, FIGS. 21A and 21B show corresponding contents of the state transition table 5.

Description will first be made in conjunction with the range subcondition K1. In this case, there are placed "3" in the range condition lower limit value register 92, "9" in the range condition upper limit value register 94, "0" in the minimum value register 91 and "9" in the maximum value register 95, respectively. On the other hand, stored in the retrieval symbol register 98 are "sho", "wa" and "nen". The retrieval processing starts from this state.

In the state 0, "sho" in an input character string 20 is waited for. Upon detection of "sho", transition is made to the state 1.

In the state 1, "wa" is awaited. Upon detection of "wa", transition is made to the state 2.

In the state 2, comparative collation for the first character of the numerical value is carried out. More specifically, when the first character of the input string 20 is "0", the automaton 16 remains in the state 2, while when it is a numeral falling within a range of "3" to "9" inclusive, state transition to the state 3 occurs.

In the state 3, "nen" is waited for. Upon detection of "nen", the state "0" is regained. Detection of "nen" means that the string of numerals having the numerical value satisfying the range condition K1 has been detected. Thus, the retrieved result 925 is outputted.

Next, the range condition K2 will be considered. In this case, there are stored "1" and "0" in the range condition lower limit value register 92, "6" and "4" in the range condition upper limit value register 94, "0" and "0" in the minimum value register 91 and "9" and "9" in the maximum value register 95, respectively. On the other hand, the retrieval-designated symbol register 10 is placed with "sho", "wa" and "nen". The retrieval starts from this state.

In the state 0, appearance of "sho" in the input character string 20 is waited for. Upon detection of "sho", transition is made to the state 1.

In the state 1, "wa" is waited for. Upon detection of "wa", transition to the state 2 takes place.

In the state 2, value collation is performed for the first digit of the numerical value. When the first numeral lies in a range of "1" to "5" inclusive, transition, is made to the state 3, while transition to the state 4 takes place when the first numeral is "6".

In the state 3, collation is performed for the second numeric character or numeral in the input character string 20. When this numeral is one of numerals "0" to "9", transition to the state 5 takes place.

In the state 4, collation is performed for the second numeral in the input string 20. When this numeral is one in a range of "0" to "3" inclusive, state transition is made to the state 5, while transition to the state 6 occurs when the numeral is "4".

In the state 5 and 6, appearance of "nen" in the input character string 20 is waited for. Upon detection of "nen", the state 0 is regained. Detection of "nen" means that the numeric character string of the numerical value satisfying the range condition K2 has been detected. Thus, the result 925 of the retrieval is outputted.

Figure 22:
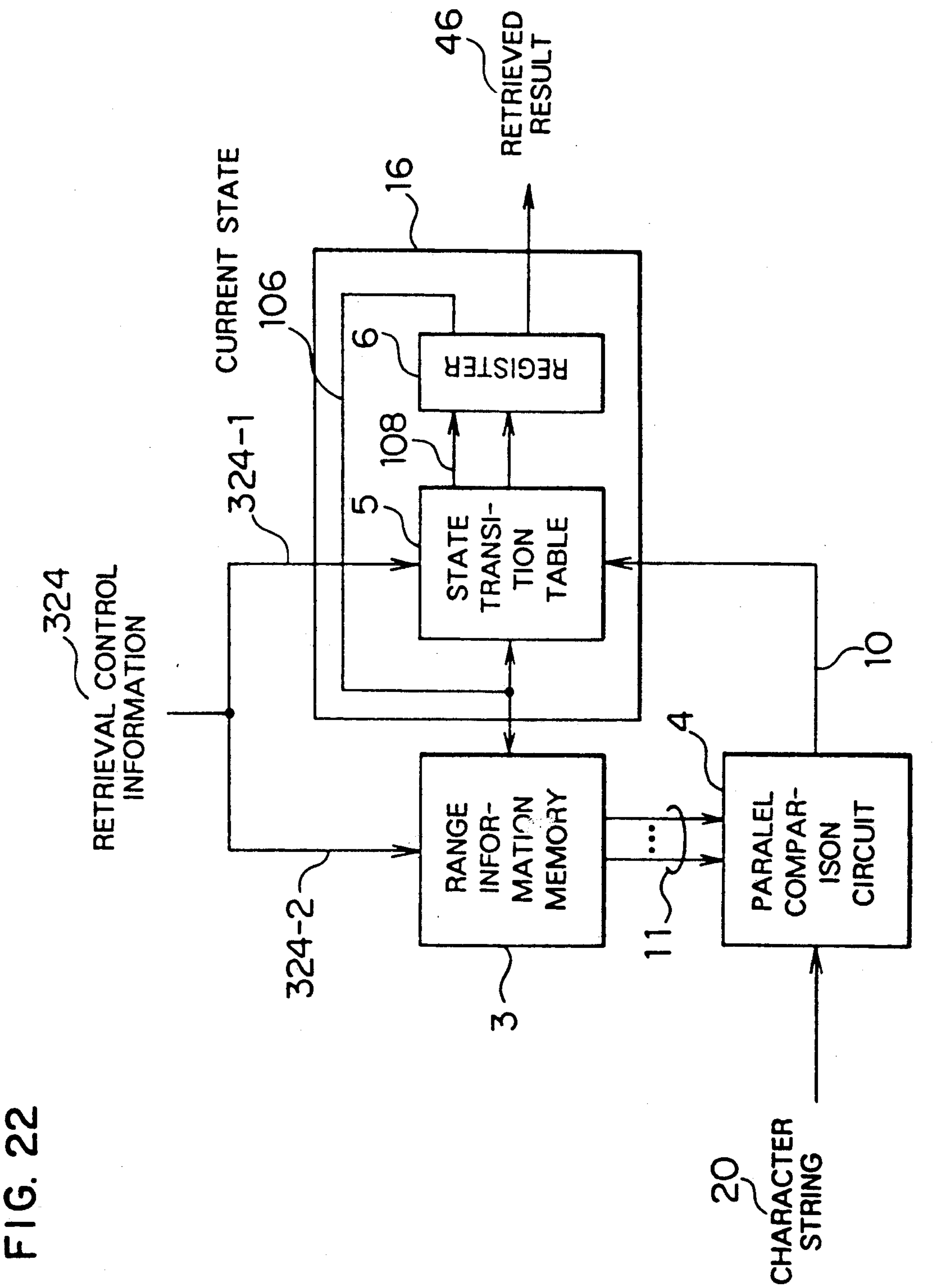
FIG. 22 is a block diagram showing a first exemplary circuit arrangement of the range condition collating circuit according to a second aspect of the present invention.

FIG. 22 is a block diagram showing of the range condition collating circuit according to a second aspect of the present invention which is denoted generally by a reference numeral 315-2. The range condition collating circuit 315-2 now under consideration includes a range information memory 3, a parallel comparison circuit 3 and a finite automaton 16 which is composed of a state transition table 5 and a register 6.

At first, the host computer 400 (see FIG. 1) generates state transition information 324-41 in accordance with a given range condition and transfers the information 324-1 to the state transition table 5 constituting a part of the finite automaton 16. Further, the host computer 400 transfers the condition for the state transitions (upper and lower limit values) for causing state transition from one state to a plurality of states to the range information memory 3 for each of the states. Upon completion of the transfer of the abovementioned information, the range condition collating circuit 315-2 is in the position to start the collation for retrieval.

The finite automaton 16 composed of the state transition table 5 and the register 6 reads out from the range information memory 3 a plurality of conditions for the state transitions 11 from the current state (designated by a numeral 106 in FIG. 22), whereon the characters of the input string 20 read out from the character string storage unit 312 (FIG. 1) are compared with the plurality of the state transition conditions 11 simultaneously in parallel. The comparison result 10 thus obtained is then placed in the state transition table 5. On the bases of the current state 106 and the comparison result 10, the finite automaton 16 makes state transition.

Every time a character of the character string 20 is inputted, the comparative collation and the state transition are performed repeated. Upon transition to the state in which a character string satisfying the range condition as given is detected in the course of retrieval, the result of retrieval is outputted, as indicated at 46 in FIG. 22.

FIG. 25 shows, by way of example, a structure of the range information memory 3. The input address of the range information memory 3 is controlled in comformance with the state transition table 5 such that the upper and lower limit values of the state transition condition are registered for the destination state of transition from the current state, wherein the state transition conditions 11 are read out in accordance with the currently prevailing state 106.

By way of example, on the assumption that when state transition of the finite automaton 16 is made to the state 2 upon detection of a numeral falling within a numerical value range of "0" to "5" inclusive in the state 0 while transition to the state 3 is to take place upon detection of a numeral in a range of "6" to "9", numerical values of "0" and "5" may be registered as a state transition condition 11-0 while "6" and "9" are registered as a state transition condition 11-1.

Figure 23:
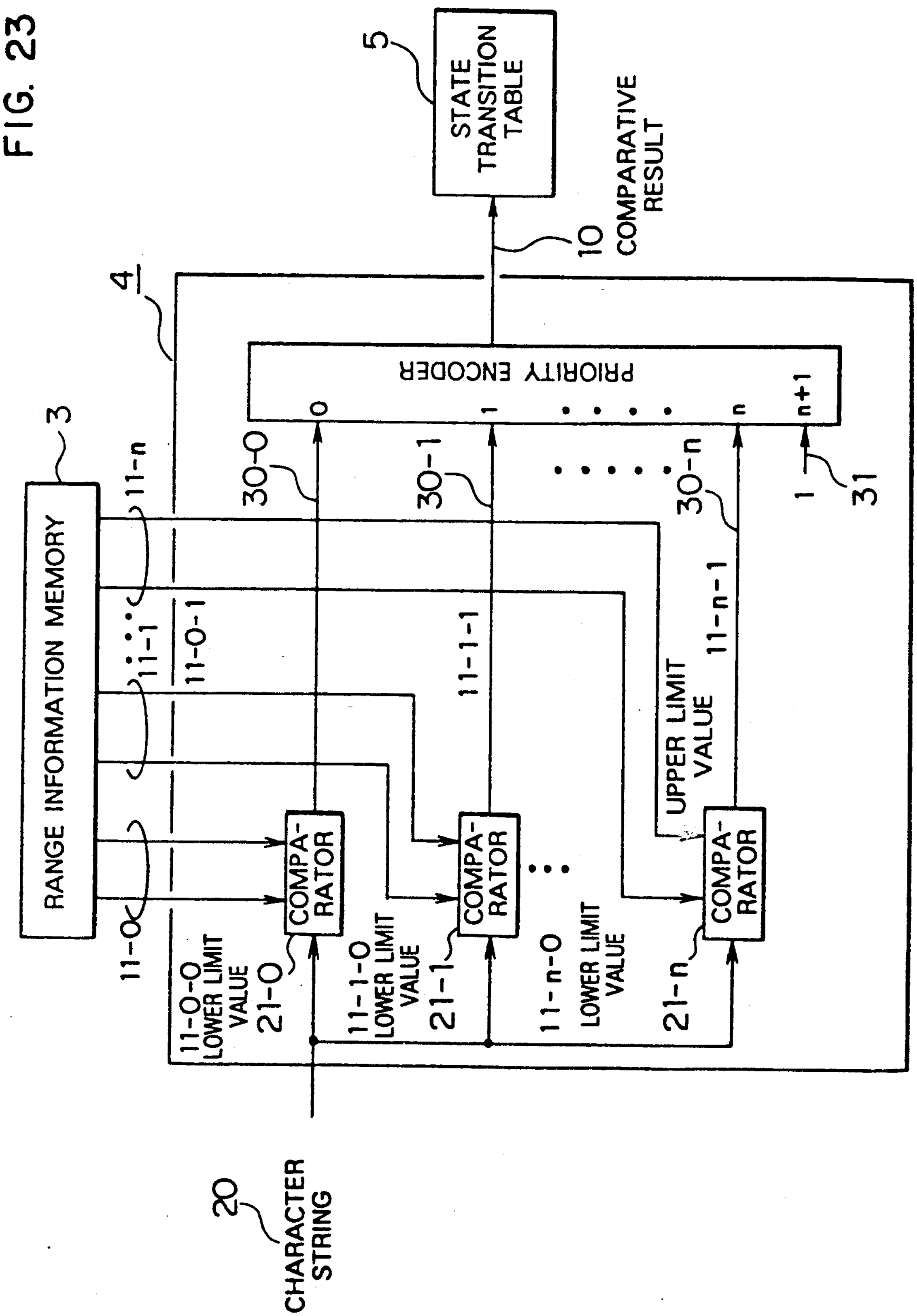
FIG. 23 is a block diagram showing a configuration of a parallel comparison circuit incorporated in the range condition collating circuit shown in FIG. 22.

FIG. 23 is a block diagram showing an exemplary configuration of the parallel comparator circuit 4. As will be seen in the figure, the parallel comparator circuit 4 is constituted by comparators 21-i (i=0, . . . , n) and a priority encoder 24. The upper limit value 11-i-0 and the lower limit value 11-i-1 of the state transition condition read out in parallel from the range information memory 3 are compared with an input character string 20. When the input character string 20 is determined to fall within a predetermined range (i.e. when it coincides with the lower limit value, lies intermediate between the lower and upper limit values or coincides with the upper limit value), the outputs 30-i of the comparators 21-i become high. The outputs 30-i are then encoded by the priority encoder 24 which generates an output 10 representing the result of comparison performed by the parallel comparator circuit 4. In accordance with this comparison result 10, the state transition of the finite automaton 16 takes place. On the other hand, unless the registered conditions 11 for the state transition are satisfied, the input 31 to the priority encoder 24 is selected to be outputted as the comparison result 10 from the parallel comparator circuit 4.

FIG. 24 is a view showing a corresponding state transition table 5. In the succeeding state 108 (i.e. the state succeeding to the current state 106 in this case), comparison is performed between the current state 106 and the comparison result 10. The comparison result of "0" to "n" is selected, when coincidence of the input character string 20 with the registered state transition condition 11 is detected. On the other hand, when the character string 20 is out of the range of the condition as registered, the comparison result 10 will be "n+1". Upon detection of a numerical value satisfying the range condition, "1" is set at the column labeled "retrieved result 46" in FIG. 24.

In the following, description will be made on the assumption that the range condition is established, by way of example only, as follows:

$$15 \leqq K \leqq 142$$

Figure 3:
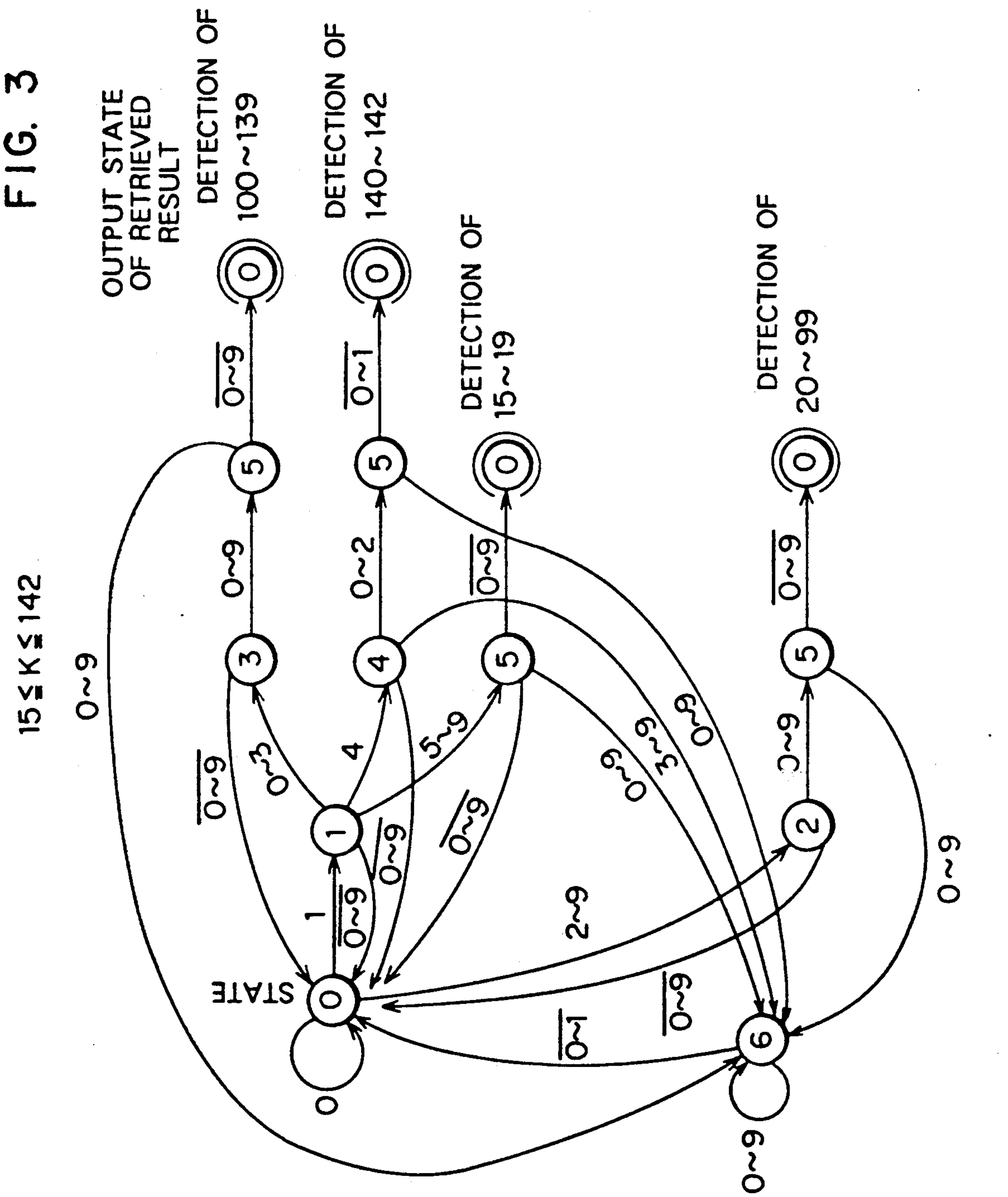
FIG. 3 is a state transition diagram for illustrating an example of numerical value retrieval.

The finite automaton 16 for implementing this range condition may be of the same structure as that shown in FIG. 3.

In the state 0, when a numeral of concern in the input character string 20 is "1", transition to the state 1 occurs, while a numeral in a range of "2" to "9", inclusive, brings about the state transition to the state 2.

In the state 1, when the input character string 20 contains a numeral of "0" to "3", transition is made to the state 3. When it is "4", transition to the state 4 occurs. Further, when the numeral is one of "5" to "9", transition to the state 5 takes place.

In the state 2, when the character string 20 contains a numeral of "0" to "9", transition is made to the state 5.

Similarly, in the state 3, the character string 20 containing a numeral of "0" to "9" brings about the state transition to the state 5.

In the state 4, the character string 20 containing a numeral of "0" to "2" causes state transition to the state 5, while transition to the state 6 is brought about when the numeral is in a range of "3" to "1" inclusive.

Upon detection of a character in the string 20 other than the numeral in the state 5, transition is made to the state 0 (the state 0 indicated as enclosed by double circles), where the retrieved result 46 is outputted. In succession, retrieval of a character string is continued. On the other hand, detection of a numerical value in the state 5 brings about transition to the state 6. In this state 6, it is decided that the detected numerical value does not satisfies the range condition, whereon a processing for skipping the collation of the remaining numerical characters is executed.

FIG. 26 shows a concrete example of the content of the range information memory for the range condition of $15 \leqq K \leqq 142$. In this case, there are prepared five state transition conditions 11 identified by 0 to 4, respectively. It should however be understood that this is only for the purpose of illustration and the present invention is never restricted to the five conditions 11 for the state transitions.

In the state 0, pairs of the lower and upper limit values for the state transition conditions 11 are sequentially set to be (0, 0), (1, 1) and (2, 9), respectively, in correspondence to the state transition diagram.

Similarly, as the lower and upper limit value pairs, there are selected (0, 3), (4, 4) and (5, 9) in the state 1, (0, 9) in the states 2 and 3, (0, 2) and (3, 9) in the state 4 and (0, 9) in the states 5 and 6, respectively. In order to prevent erroneous operation, a character code of such a limit value pair which has a lower limit value greater than the upper limit value may be registered as dummy data at the area of the memory 3 where no state transition condition is placed.

FIG. 27 is a view showing a state transition table 5 corresponding to the content of the range information memory 3 shown in FIG. 26. Any succeeding state 108 is determined on the basis of the preceding current state 106 and the comparison result 10. The comparison results 10 of "0" to "4" are selected upon detection of coincidence with the registered state transition conditions. Unless the character string 20 satisfies the registered conditions, the comparison result 10 is "5". Upon detection of a numerical value which satisfies the range condition, "1", is outputted as the retrieved result 46.

Figure 28:
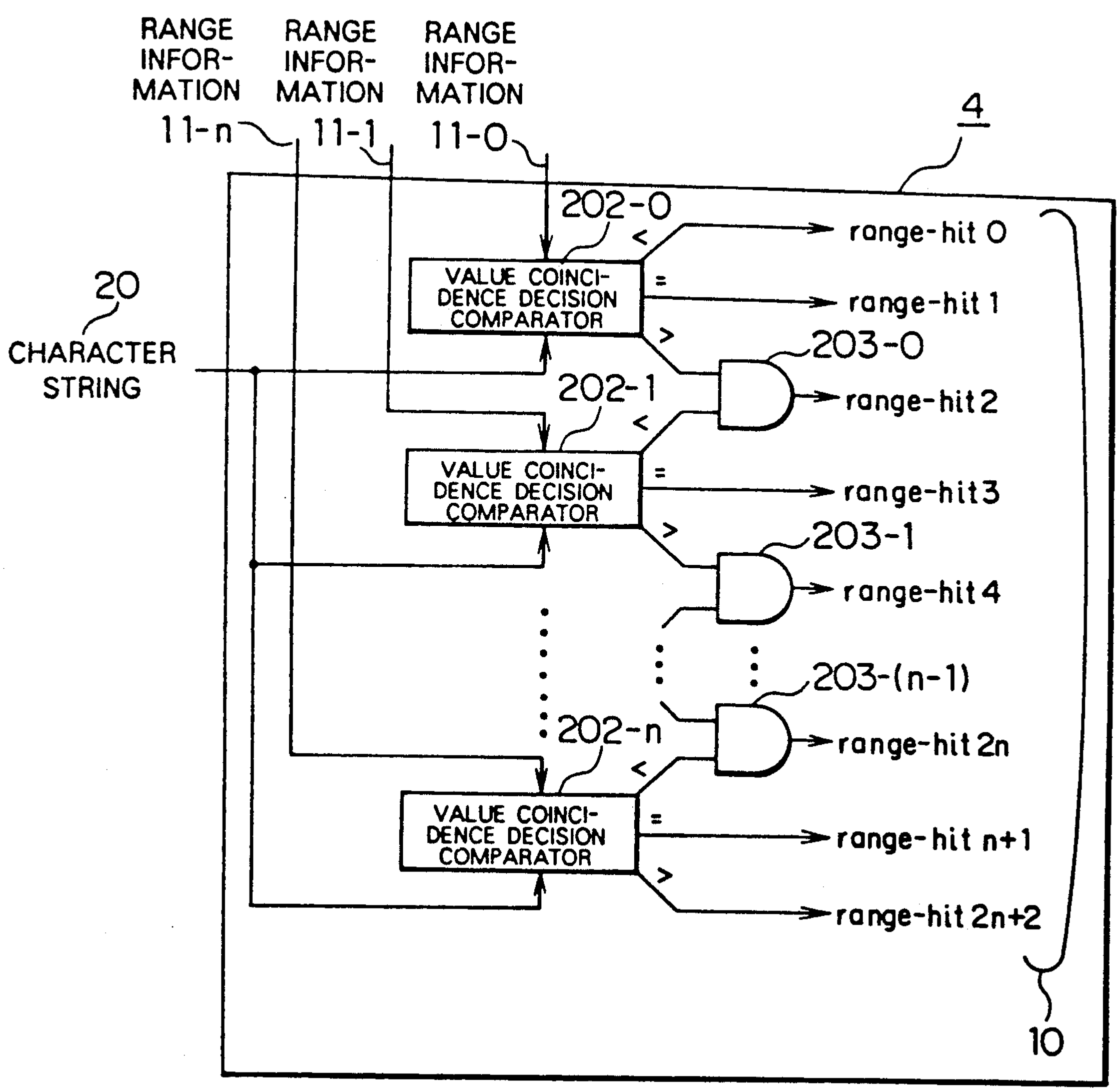
FIG. 28 is a block diagram showing another example of circuit configuration of the parallel comparison circuit of the range condition collating circuit shown in FIG. 22.

FIGS. 28 to 30 show other structures of the parallel comparison circuit 4, the range information memory 3 and the state transition table 5 in the range condition collating circuit 315-2 according to the second aspect of the invention shown in FIG. 22. In the description which follows, it is also assumed that the range condition is established as $15 \leqq K \leqq 142$. The finite automaton for realizing this condition may be implemented in the same structure as shown in FIG. 3.

FIG. 29 shows in concrete another example of the range information memory 3. The above range condition may be divided on the basis of the digit numbers (or on the orders of magnitude). Then, lower and upper limit values on each order of magnitude are given as follows:

15 (lower limit value)
99 (upper limit value)
100 (lower limit value)
142 (upper limit value)

In each of the states, numerical values required in view of the state transition condition are selected from the values corresponding to the numerical values of the digits for collation and registered in the range information memory 3. More specifically, in the state for collating the numerical values of the first digit, "1" and "9" are selected. In the state for collation of the numerical values of the second digit, "0", "4", "5" and "9" are selected. In the state for collation of the numerical values of the third digit, "0" and "2" are selected. Additionally, the minimum value "0" and the maximum value "9" are equally registered in the range information memory 3 in case the numerical value outside of the range of the condition are to be skipped in the collation.

Thus, in the state 0 for collation of the first character of the character string, "1" and "9" are registered in conformance to the state transition diagram.

In the state 1 for collation of the second character, "0", "4", "5" and "9" are registered, while "0" and "9" are registered for the state 2.

In the state 3 for collation of the third character, "0" and "9" are registered, while in the state 4, "1", "2" and "9" are registered with "0" and "9" being registered in the state 5.

Further, in the state 6 for skipping the numerical values which are out of the range condition, "0" and "9" are registered.

In each of the states mentioned above, a maximum value (MAX) is registered at the end as a character code for allowing the skipping of retrieval of the character codes which fall outside of the range condition.

FIG. 27 shows another embodiment of the parallel comparison circuit 4. As can be seen in the figure, the parallel comparison circuit 4 is constituted by a plurality of value coincidence detecting comparators 201-i (i=0, 1, 2, . . . , n) and a plurality of AND gates 203-i (i=0, 1, 2, . . . , n−1). At this juncture, relations among the range information 11-0 to 11'−n in respect to the code values are as follows:

range information 11'-0 ≦ range information 11'-1 ≦ . . . ≦

-continued range information 11'-n

Since the range information 11' has previously been sorted, the AND gate 203-0 can detect the code intermediate between the range information 11'-0 and 11'-1. Similarly, the AND gate 203-(n−1) can detect the code between the range information 11'-(n−1) and 11'−n.

As the result of the comparison with the character string 20 by the parallel comparison circuit 4, detection of a smaller value than the range information 11'-0 is indicated by "range-hit 0" as enabled by the code of the character string 20, coincidence with the range information 11'-0 is indicated by "range-hit 1" as enabled, and detection of a symbol string between the range information 11'-0 and the range information 11'-1 is indicated by "range-hit 2" as enabled.

Similarly, detection of a symbol string between the range information 11'-(n−1) and the range information 11'−n is indicated by "range-hit 2n" being enabled, detection of coincidence with the range information 11'−n is indicated by "range-hit 2n+1" enabled, and detection of a greater value than the range information 11'−n is indicated by "range-hit 2n+2" enabled.

FIG. 30 shows a state transition table 5 which corresponds to the range information memory 3 shown in FIG. 29. Destination of the state transition is designated in accordance with the condition for transition in each of the states. By way of example, the condition for transition from the state 3 to the state 5 is that the lower limit value of the transition condition is "0" with the upper limit value being "9". Accordingly, the state 5 is registered as the destination state, when a numeral of concern coincides with the lower limit value (range-hit 1) as well as, when the numeral is greater than the lower limit value and smaller than the upper limit value (range-hit 2) and when coincidence with the upper limit value is detected (range-hit 3), respectively.

Further embodiments of the range information memory 3, the parallel comparison circuit 4 and the state transition table 5 will be described by reference to FIGS. 31 to 33 on the assumption that two range conditions have to be considered. Incidentally, the parallel comparison circuit 4 may be implemented in the same structure as shown in FIG. 28 and is thus omitted from description.

Figure 31:
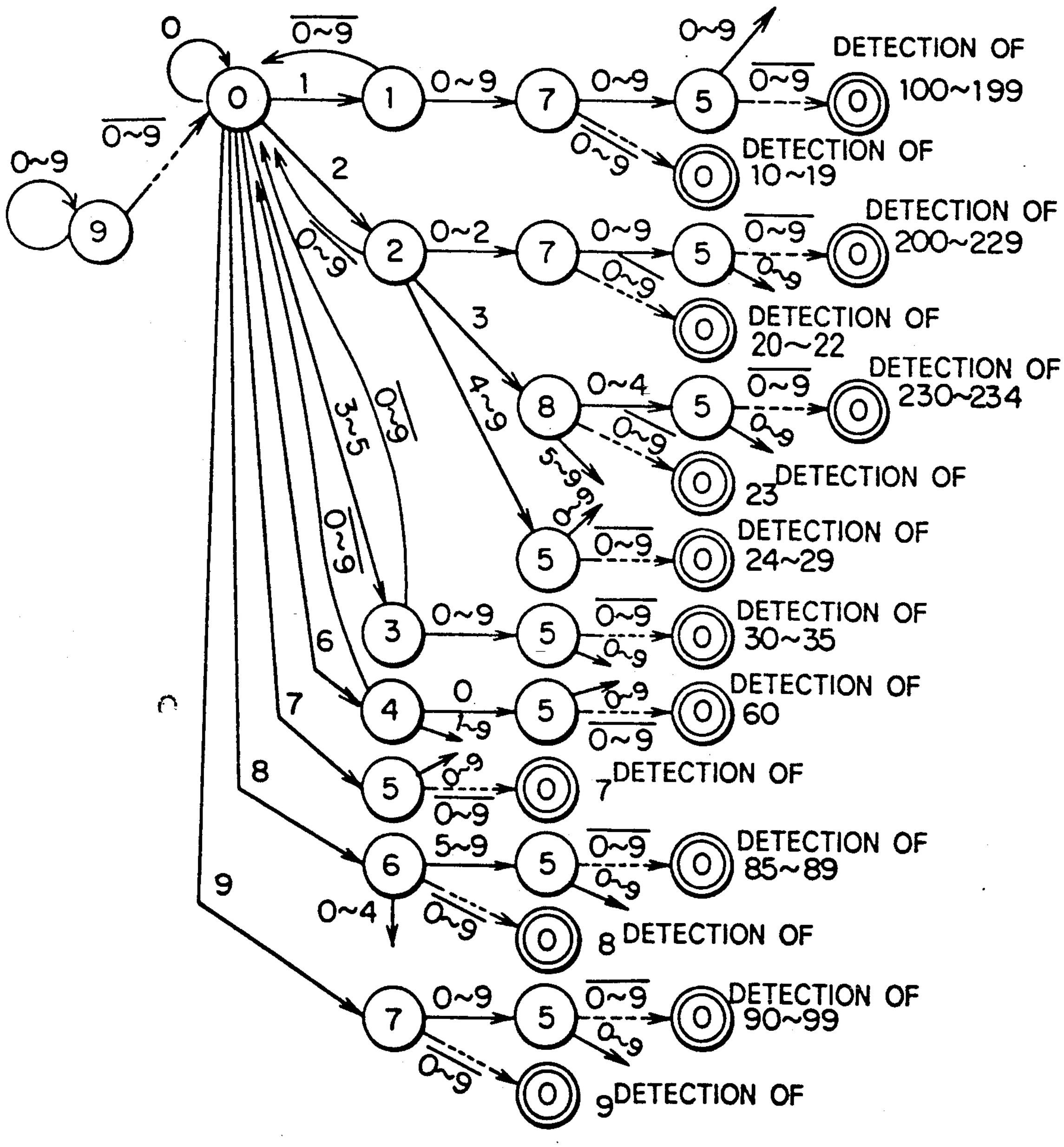
FIG. 31 is a view showing a state transition diagram in case there are given two range conditions.

FIG. 31 shows a state transition diagram in case the range are given by two range conditions:

$$7 \leqq K1 \leqq 60$$

$$85 \leqq K2 \leqq 234$$

These two range conditions are realized by simple finite automatons.

First, transitions from the state 0 will be considered.

When an input character string 20 is "0" in the state 0 of the finite automaton, the latter remains in the state 0). When the character string 20 is "1", transition is made to the state 1. When the input character string 20 is "2", transition is made to the state 2. When the character string 20 is from "3" to "5", the automaton transits to the state 3. When the character string 20 is "6", the automaton transits to the state 4. When the character string is "7", the automaton transits to the state 5. When the character string 20 is "8", the automaton transits to the state 6. Finally, when the character string 20 is "9", the automaton makes transition to the state 7.

The finite automaton is so structured that the range conditions can be detected throughout the states 2 to 8 in a similar manner. The state 9 is provided for skipping the retrieval of numerical values which are outside of the range conditions.

FIG. 32 shows corresponding contents of the information memory 3. As can be seen in the figure, the contents of this memory are prepared such that state transitions are effectuated in each state in dependence on the comparative collation results 10 in the manner described above.

FIG. 33 shows contents of the state transition table 5 corresponding to the range information memory 3 shown in FIG. 32. It will be seen that destinations for the state transition are designated in dependence on the results 10 of the comparative retrieval.

Figure 34:
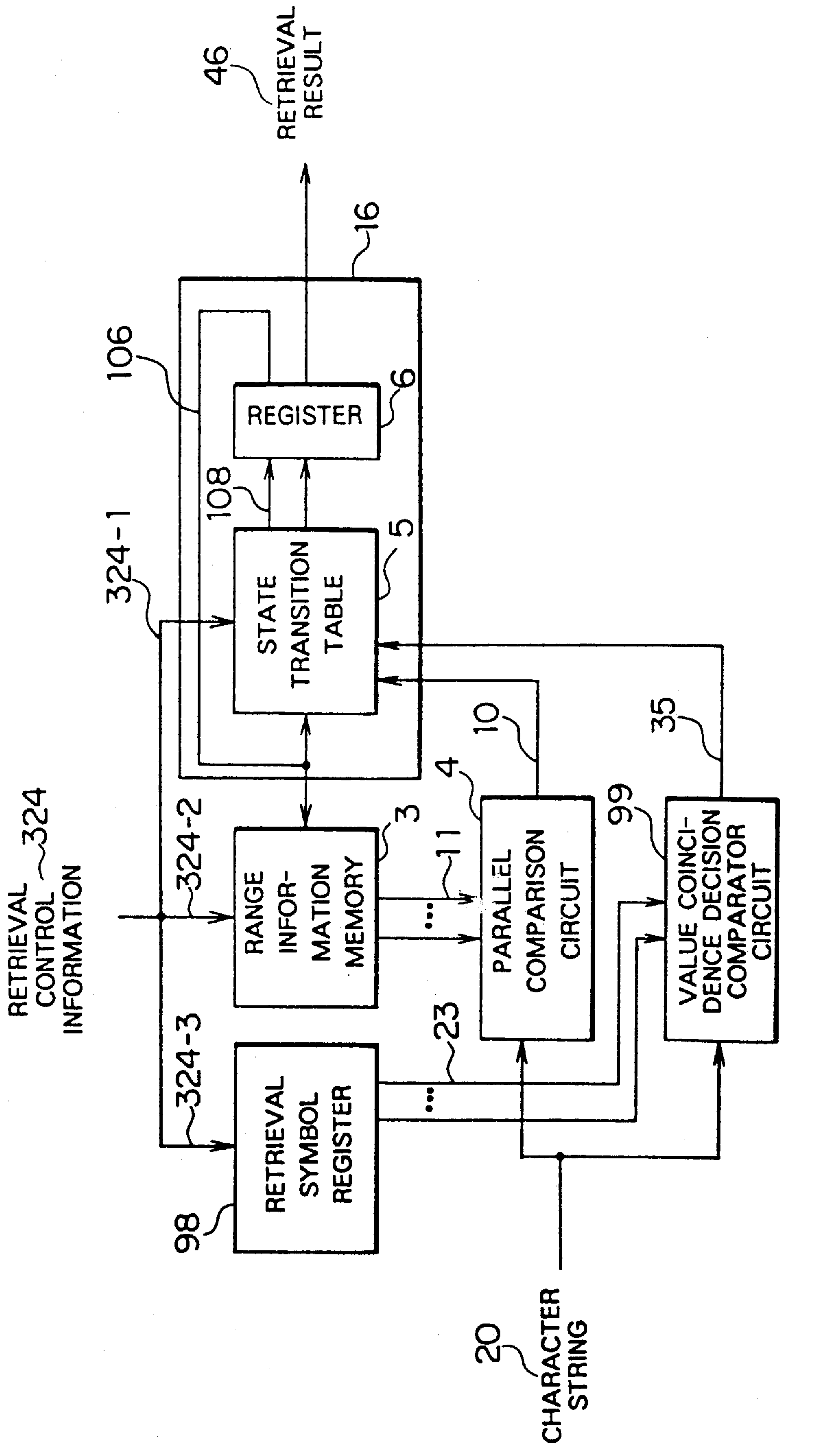
FIG. 34 shows in a block diagram a circuit configuration of a second embodiment of the range condition collating circuit according to the second aspect of the invention.

FIG. 34 shows in a block diagram another embodiment of the range condition collating circuit which can be employed in the range-conditional character string retrieving system according to the second aspect of the invention which is so arranged as to be capable of retrieving retrieval-designated symbols affixed to a numeral string in precedence and succession thereto, respectively. The instant embodiment differs from the circuit shown in FIG. 22 in that there are additionally provided a retrieval symbol register 98 for storing a plurality of retrieval symbols 23 (i.e. symbols designated to be retrieved) and a coincidence decision comparator circuit 99 for comparing the character string 20 with the retrieval symbols 23, wherein a finite automaton 16 is caused to make the state transition in dependence on the result 35 of the comparison made by the coincidence decision comparator circuit 99. The circuit configuration of the coincidence decision comparator circuit 99 may be same as that described hereinbefore by reference to FIG. 18 in conjunction with the range-conditional character string retrieving system according to the first aspect of the invention.

Again, let's consider, by way of example only, the range condition in which symbols "sho-wa" and "nen" are attached before and after a numerical value, respectively, as exemplified below:

$$\text{Sho-wa 3 nen} \leqq K \leqq \text{Sho-wa 64 nen}$$

Figure 35:
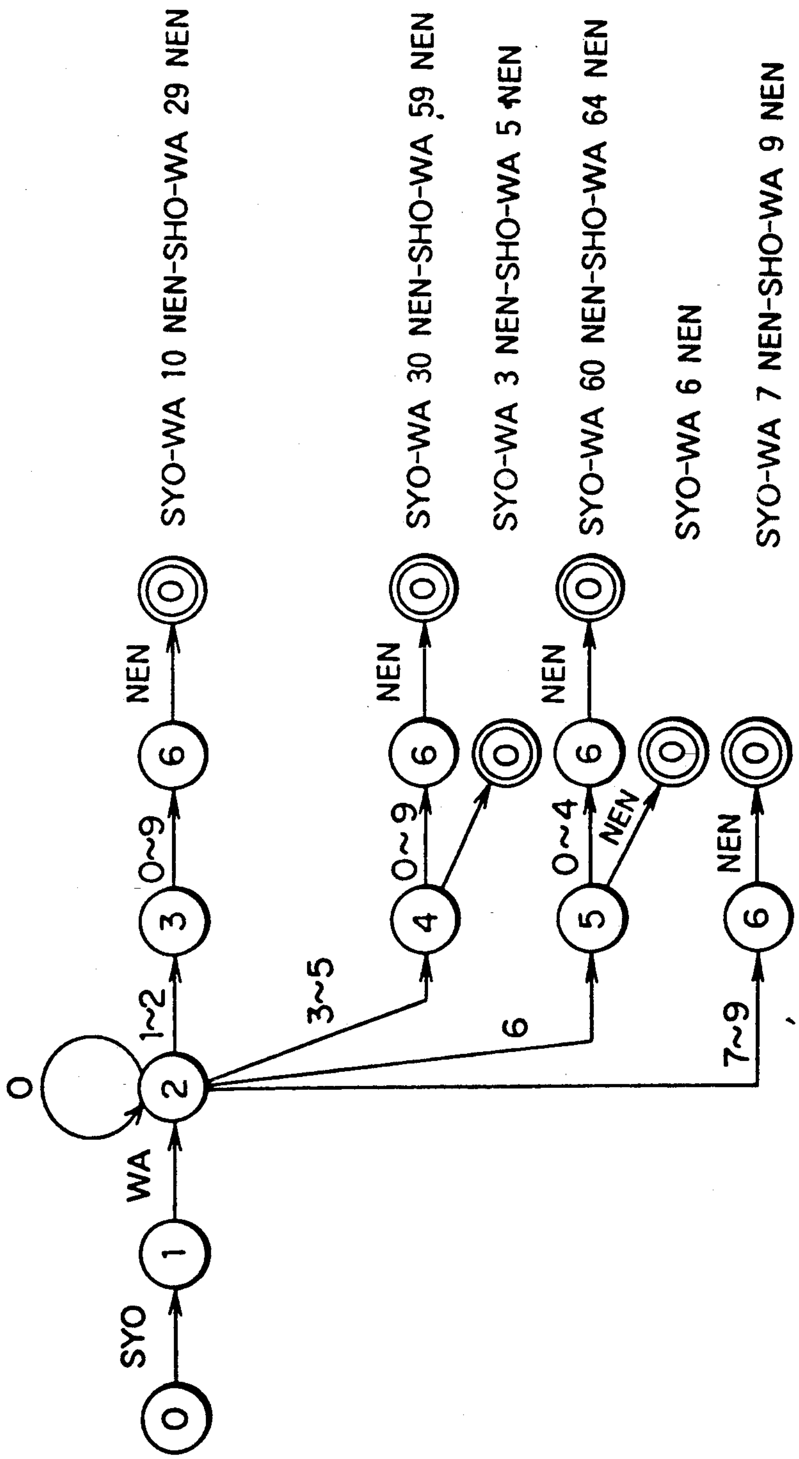
FIG. 35 is a view showing a state transition diagram for illustrating a first example of operation of the range condition collating circuit shown in FIG. 34.

FIG. 35 shows a state transition diagram corresponding to the range condition mentioned above.

At first, in the state 0, the finite automaton 16 makes state transition to the state 1 in response to the input "sho".

In the state 1, transition to the state 2 takes place in response to the input of "wa".

In the state 2, when a numeral in the input character string 20 is "0", the automaton 16 remains in the state 2. On the other hand, when it is a numeral of "1" or "2", transition to the state 3 takes place, while the numeral of the character string 20 in a range of "3" to "5" brings about the transition to the state 4. Further, when the numeral of the string 20 is "6", the automaton 16 transits to the state 5 while it transits to the state 6 when the numeral of concern falls within the range of "7" to "9" inclusive.

Through similar procedure, the state transitions occur so as to satisfy the range condition, as described previously. Upon final detection of "nen", the retrieved result 46 is outputted.

FIG. 36 shows the content of the range information memory 3 and that of the retrieval symbol register 98 in the abovementioned case. Further, FIG. 37 shows the content of the state transition table 5 which corresponds to that of the range information memory 3. Any succeeding state 108 is determined on the basis of the comparison results 10 and 35 (i.e. outputs of the parallel comparison circuit 4 and the coincidence determining comparison circuit 99, respectively).

FIG. 38 shows other examples of the range information memory 3 and the retrieval symbol register 98 which can be employed in the range condition collating circuit shown in FIG. 34. Further, FIG. 39 shows another structure of the state transition table corresponding to that shown in FIG. 37.

Figure 40:
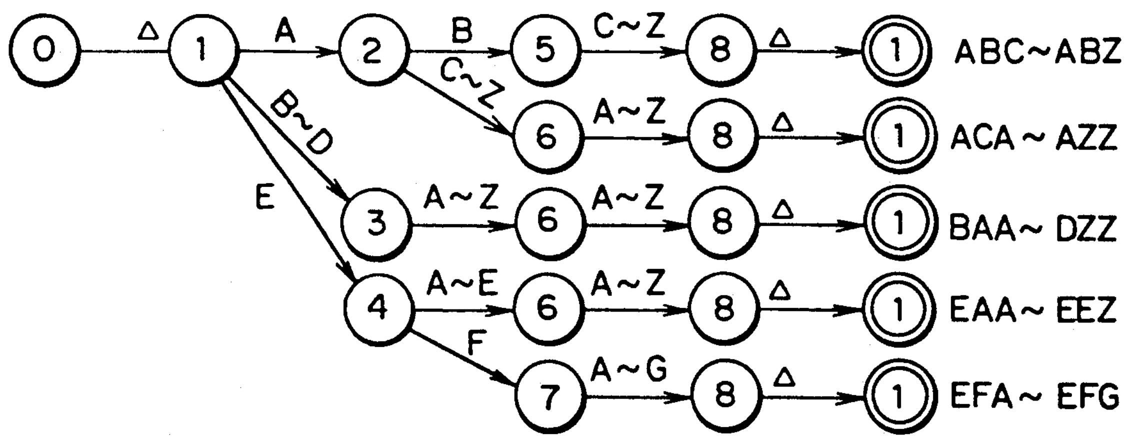
FIG. 40 is a view showing a state transition diagram for illustrating another example of operation of the range condition collating circuit shown in FIG. 34.

Next, an example of retrieval of the range conditions given by alphabetic letter strings will be considered on the assumption that the alphabetic letter strings are punctuated or separated by "Δ" (blank) from one another. FIG. 40 shows a state transition diagram in the case where the range condition is given by

ABC≦K≦EFG

This range condition means that such alphabet strings are to be retrieved which can satisfy one of the following conditions or ranges:

| | | |
|---|---|---|
| ABC | to | ABZ |
| ACA | to | AZZ |
| BAA | to | DZZ |
| EAA | to | EEZ |
| EFA | to | EFG |

In the state 0, a blank is waited for.

In the state 1, transition is made to the state 2 when an alphabetic letter of concern in the character string 20 is "A", to the state 3 when it falls within a range of "B" to "D", and to the state 4 when the letter in the string 20 is "F". In the states 2 to 8, the state transitions take place in similar manner in accordance with the range conditions. Upon detection of a blank in the state 8, the retrieved result 46 is the outputted.

FIG. 41 shows corresponding contents of the range information memory 3 and the retrieval symbol register 98. In each of the states, the conditions 11 for the state transition are designated in terms of the ranges. FIG. 42 shows content of the state transition table corresponding to that of the range information memory. The destination states for transition are designated by the comparison results 10 and 35.

FIG. 43 shows other exemplary structures of the range information memory 3 and the retrieval symbol register 98 corresponding to those shown in FIG. 41 for the alphabetic letter strings. Further, FIG. 44 shows another exemplary structure of the state transition table 5 which corresponds to that shown in FIG. 37.

As will be appreciated from the above, the range condition retrieval for the alphabetic letter string requires only a few conditions for the state transitions by virtue of the fact that the state transition conditions are designated in terms of the ranges.

In the case of the embodiments of the invention described so far, collation of the character string containing a single character (numeral, letter) requires access to the state transition table 5 which is followed by access to the range information memory 3. In other words, memory access has to be done twice for each collation of one character, which means that the time taken for the collation increases correspondingly.

Figure 45:
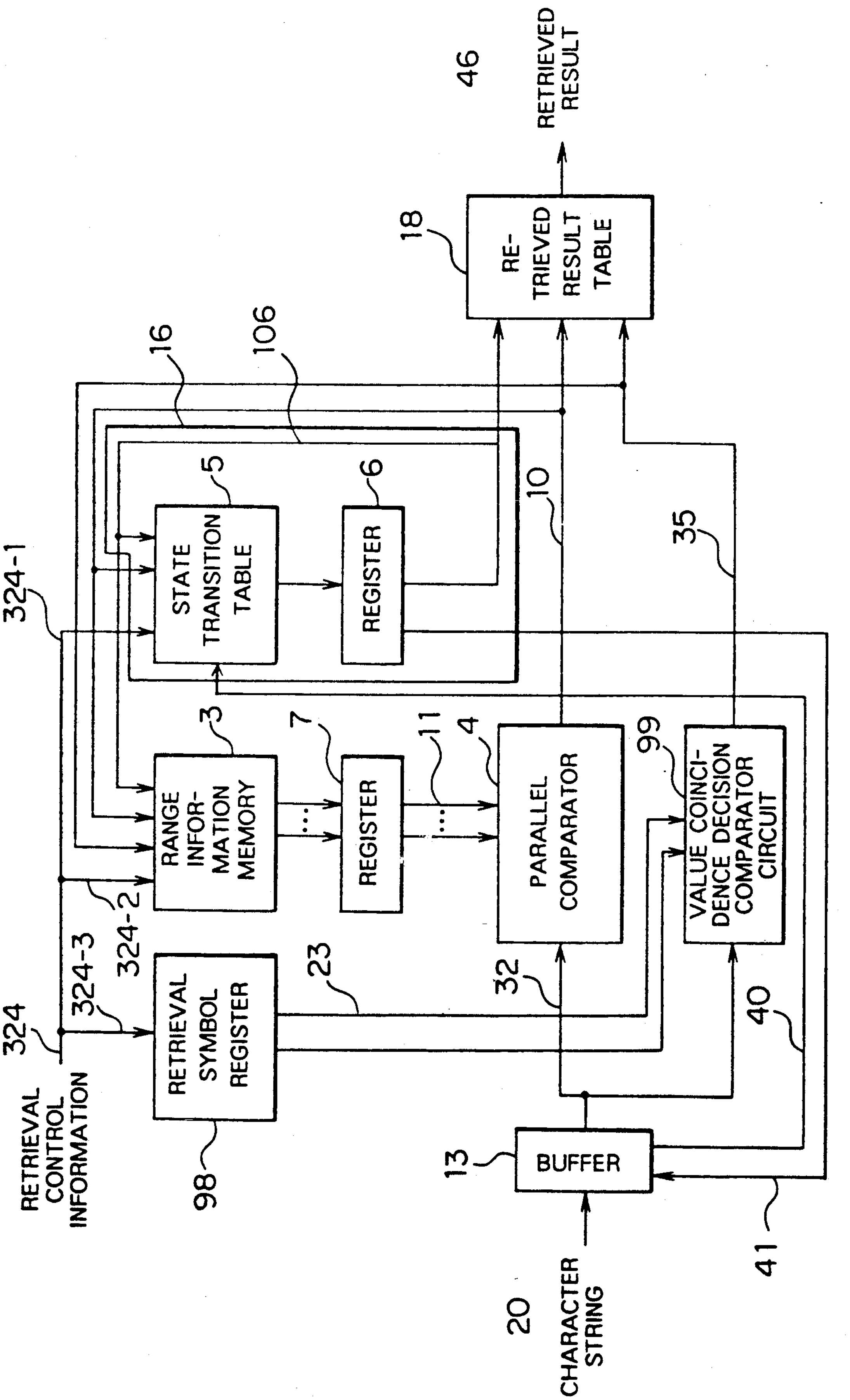
FIG. 45 shows in a block diagram still another embodiment of the range condition collating circuit according to the second aspect of the present invention.

For coping with this problem, FIG. 45 shows in a block diagram still another version of the range condition collating circuit 315-2 for the retrieving system according to the second aspect of the invention. More specifically, the range condition collating circuit 315-2 now under consideration is so arranged that the state transition table 5 in the finite automaton 16 and the range information memory 3 can be accessed in parallel. To this end, the range condition collating circuit 315-2 includes a buffer 13 for storage of decision bits each for designating in each state whether collation is to be again performed for a same character string by changing the state transition condition, wherein the state transition is executed in accordance with the current state 106 of the finite automaton 16 and the comparison results 10 and 35 while at the same time the range information 11' required for the collation in the succeeding state is read out from the range information memory 3 on the basis of the current state 106 of the finite automaton 16 and the comparison results 10 and 35. As a result of this, the state transition can take place within one memory cycle, whereby a high-speed retrieval operation can be realized.

It is however noted in conjunction with the embodiment of the range condition collating circuit shown in FIG. 45 that because of necessity of reading out the content of the range information memory 3, all the range information 11' corresponding to the comparison results 10 and 35 must be stored in the memory 3 for each of the states, which thus involves a problem that the capacity of the range information memory 3 will have to be correspondingly increased.

For illustrating operation of the range condition collating circuit according to the instant embodiment, let's consider again the following range condition Sho-wa 3 nen≦K≦Sho-wa 64 nen In this case, the state transition diagram is same as that shown in FIG. 35. Besides, the state transition table 5 has same content as that of the table shown in FIG. 39. However, difference is found in the structure of the range information memory 3 because of the reading in advance.

FIG. 46 shows the content of the range information memory 3 in this case. It will be seen that range information 11' is stored for each of the comparison results 10, 35 in each state. Assuming, for example, that "nen" is detected in the state 1, the range information 11' required in the state 2 is registered at a place corresponding to the comparative collation result 35-1 outputted in the state 1, whereon upon detection of "nen" in the state 1, transition is made to the state 2 and at the same time the range information for the state 2 is read out from the information memory 3. By virtue of this arrangement, a high-speed retrieving operation can be realized.

Figure 47:
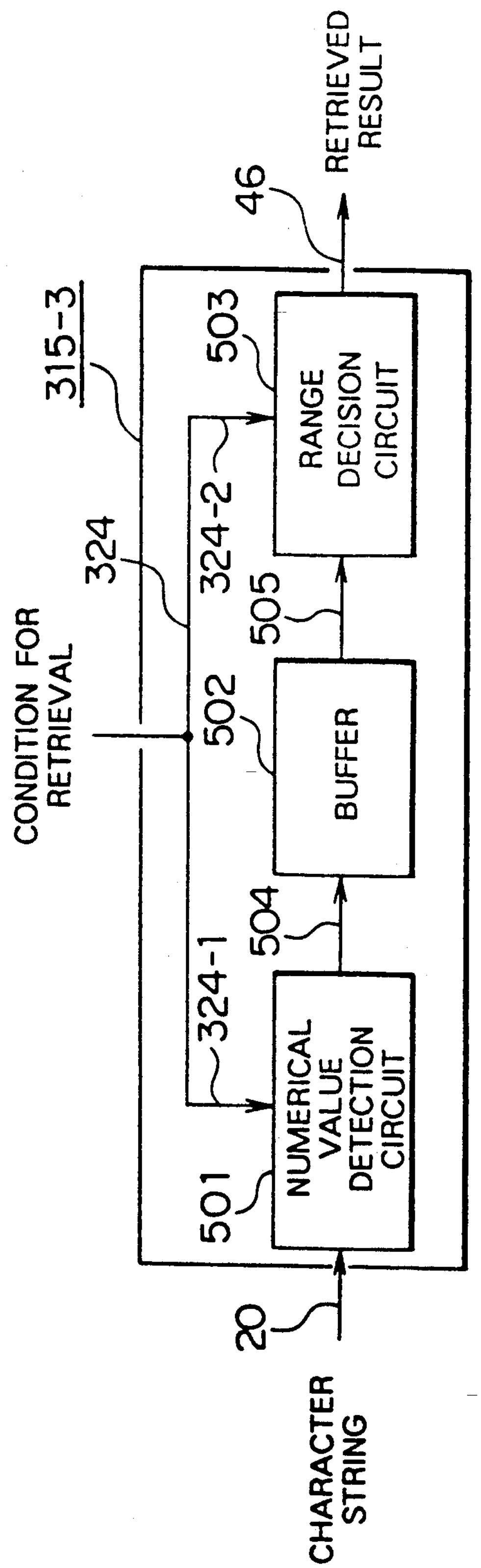
FIG. 47 shows in a block diagram a range condition collating circuit according to a third aspect of the present invention.

FIG. 47 shows in a block diagram another embodiment of the range condition collating circuit according to a third aspect of the present invention. This embodiment of the range condition collating circuit denoted generally by a reference symbol 315-3 is composed of a numerical value detecting circuit 501, a buffer 502 and a range decision circuit 503.

Referring to FIG. 47, the host computer 400 transfers to the numerical value detecting circuit 501 code information 324-1 of numerical values or numeric characters (numerals) prepared in accordance with the type of the character code as used (such as ASCII code or the like). Besides, the host computer 400 transfers to the range decision circuit 503 the range condition 324-2 for the numerical values to be retrieved. Upon completion of the data transfer, the range decision circuit 503 is in the position to start the retrieving operation.

The numerical value detecting circuit 501 makes decision as to whether or not an input character string 20 transferred from the character string storage unit 312 is a numeric character string. If so, the numeric character string is then written in the buffer 502. Upon detection of a punctuation or interruption in continuation of numeric characters in the string, it is then decided that one numerical value (a unit numeric character string) has ended in detection, whereon a punctuation symbol is written in the buffer 502 for discriminating the detected numerical value from a succeeding one. When the buffer 2 has been loaded with the numerical value together with the punctuation symbol, the buffer 502 assumes the state ready for being read-out. Then, the range decision circuit 503 reads out from the buffer 502 the numeric character string stored therein up to the punctuation mark and makes decision as to whether the numerical value of the string read out can satisfy the condition for the range designated for the numerical value (i.e. if the numerical value falls within the range). When the condition is satisfied, the retrieved result (i.e. result of the retrieval) 46 is outputted from the range decision circuit 503.

Figure 48:
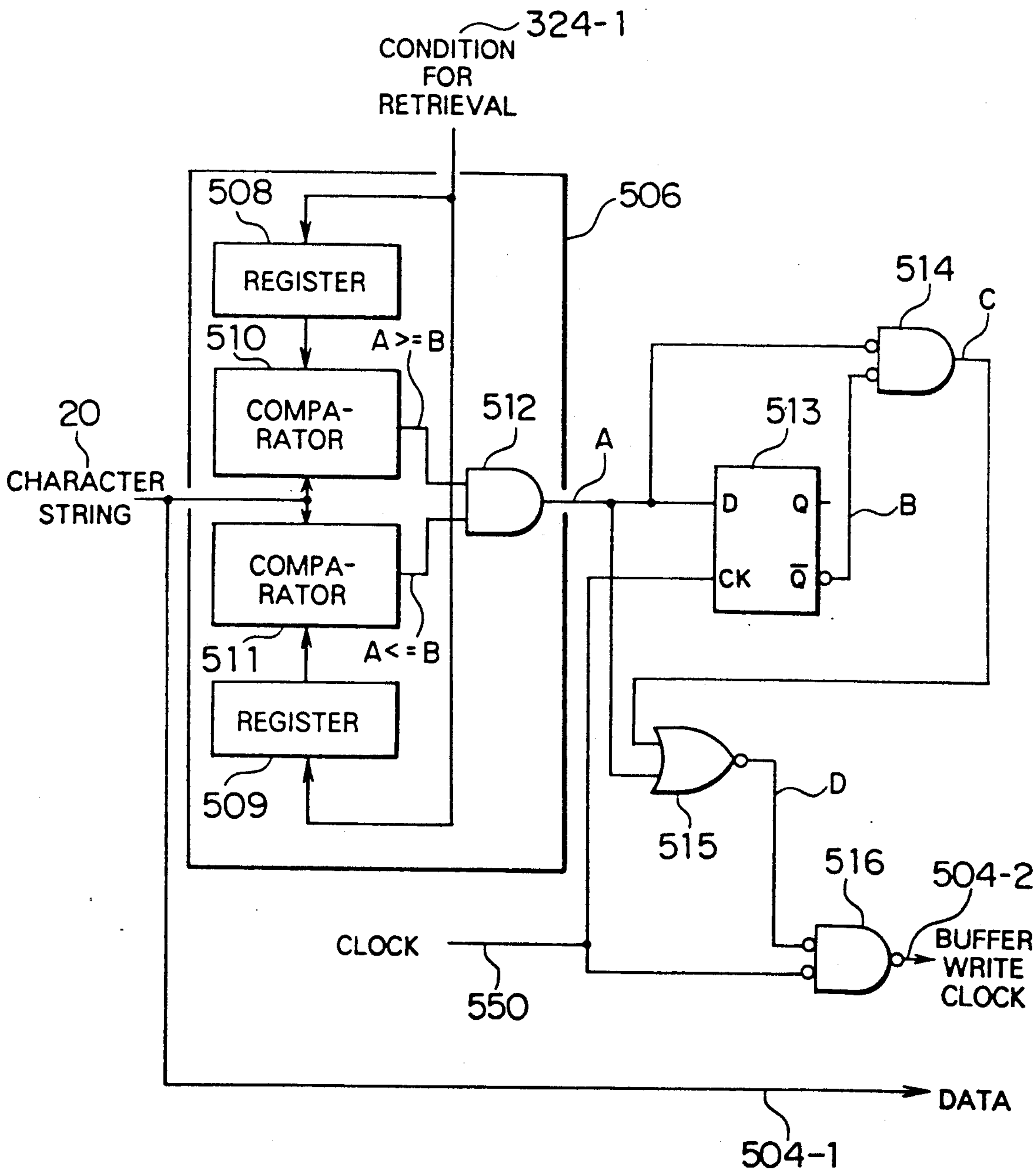
FIG. 48 is a block diagram showing a first embodiment of a numerical value detecting circuit incorporated in the range condition collating circuit shown in FIG. 47.

FIG. 48 is a block diagram showing a first embodiment of the numerical value detecting circuit 501. The numerical value detecting circuit 501 is constituted by a charactetr string discriminating circuit 506, a flip-flop circuit 513 for generating a write clock signal for the buffer 502, NOR gates 514 and 515 and an OR gate 516. The character string discriminating circuit 505 is composed of a register 508 at which the upper limit numerical value is set, a register 509 at which the lower limit numerical value is set, a comparator 510 for deciding whether an input numeral of the numeric character string 20 is equal to the upper limit value or smaller than the latter, a comparator 511 for deciding whether the input numeral of the character string 20 is equal to or greater than the lower limit value and an AND circuit 512 for deciding on the basis of the decision results of the comparators 510 and 511 whether the input numeral of the numeric character string 20 is equal to the upper limit or the lower limit or intermediate between the upper and lower limit values.

Figure 49:
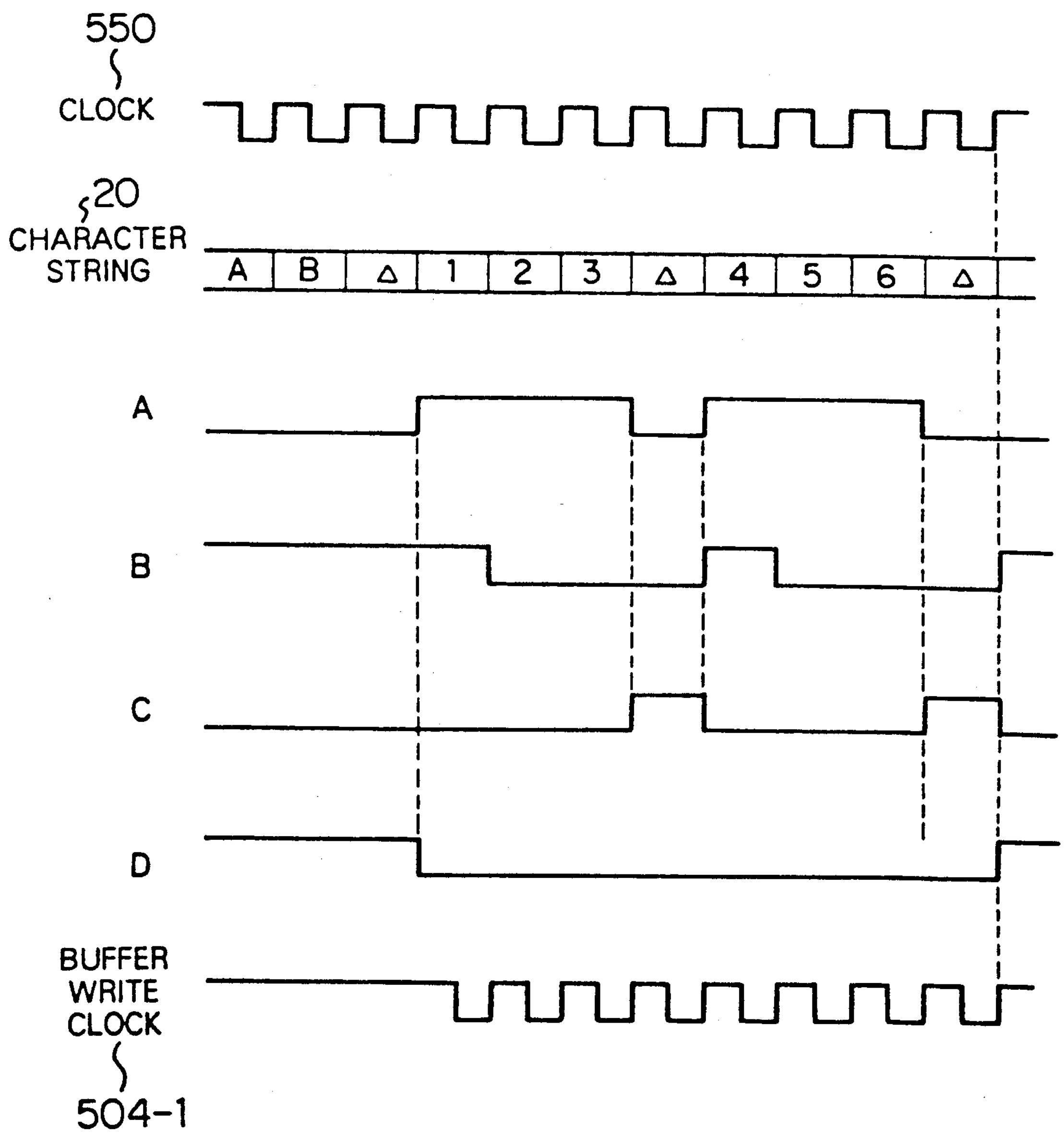
FIG. 49 is a timing chart for illustrating operation in case the numerical value detecting circuit shown in FIG. 48 is employed.

FIG. 49 is a timing chart for illustrating operation of the numerical valve detecting circuit 501 on the assumption that "ABΔ123Δ456Δ" is inputted as the character string 20. In this conjunction, a symbol "Δ" represents a blank or absence of character and is used as the punctuation symbol. Referring to FIG. 49, a numerical value detection signal A assumes a level of "1" when the numeric character substrings "123" and "456" are detected in the input character string 20. A signal B corresponding to the signal A delayed for one clock and inverted is generated by the flip-flop 513, whereon a pulse signal C is generated by the NOR gate when both signals A and B simultaneously assume a low level. In other words, the pulse signal C is generated at the timing of the falling edge of the signal A. The signals A and C are then logically ORed by the OR gate 515. During a period corresponding to the logical sum thus derived, loading of the numeric character strings in the buffer 502 can take place. In this manner, the numeral character string and one character (punctuation symbol) succeeding thereto can be loaded in the buffer 502.

Figure 50:
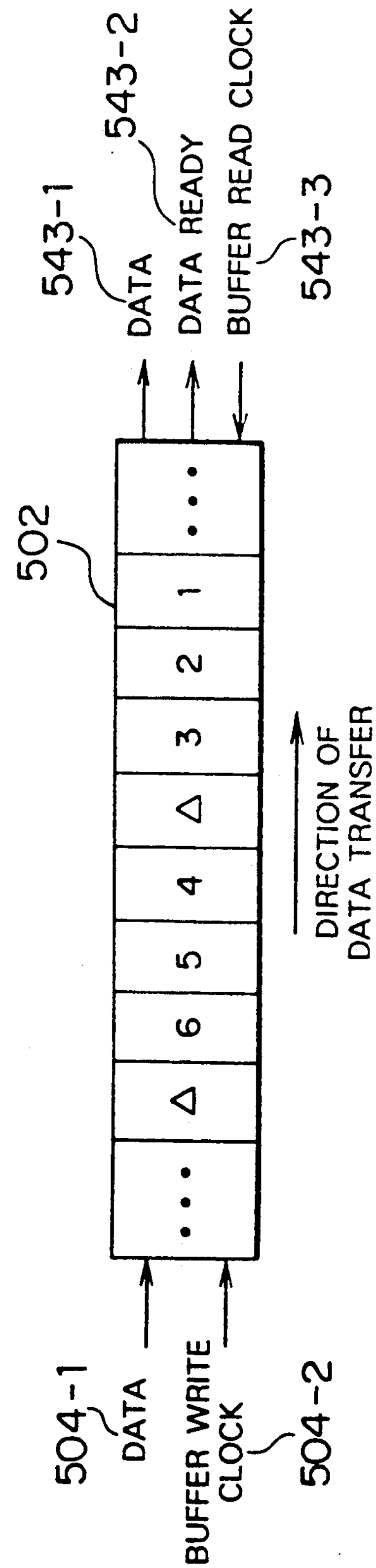
FIG. 50 is a view showing content placed in a buffer when the numerical value detecting circuit shown in FIG. 48 is employed.

FIG. 50 shows numeric information placed in the buffer 502 through the process mentioned above. The buffer 502 should preferably be constituted by a FIFO (first-in, first-out) memory, a two-port RAM memory or the like which allows simultaneous access of the numerical value detecting circuit 501 and the range decision circuit 503, although the buffer 502 may be composed of a conventional type memory as well. There are stored in the buffer 502 the numeric character string "123Δ" detected first and the numeral character string "456Δ" detected second in this order.

Next, description will be made of the range decision circuit 503. In the system according to the invention, the numerical value detecting circuit 501 is required to operate at a high speed. In contrast, the range decision circuit 503 is allowed to operate at a relatively slow processing speed because the amount of data to be processed by the range decision circuit 503 is significantly reduced due to elimination of unnecessary characters (i.e. characters other than the numeric characters) by the numerical value detecting circuit 501. Accordingly, the range decision circuit 503 may be implemented by using a microcomputer (microprocessor).

Figure 51:
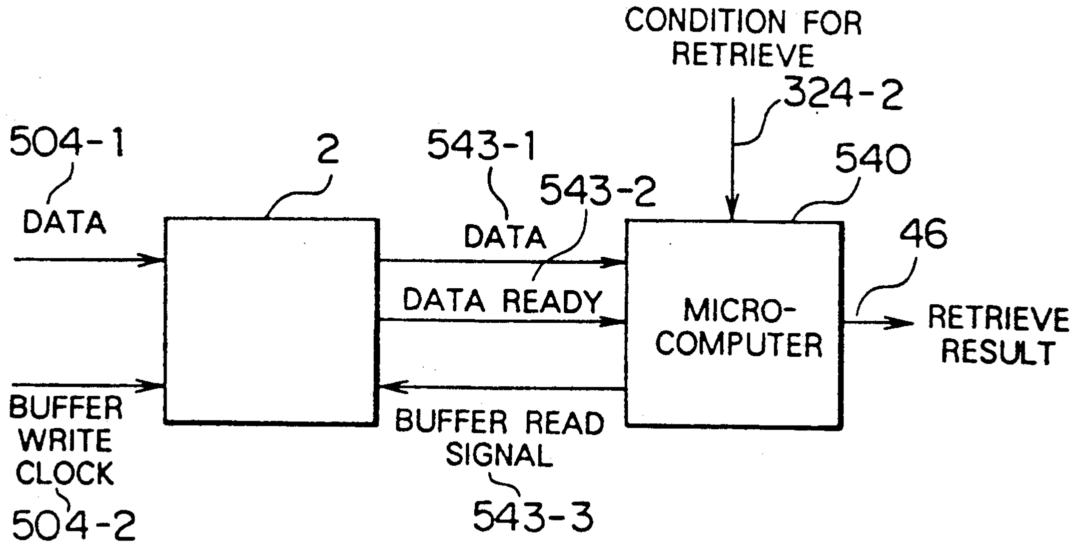
FIG. 51 is a block diagram showing a first embodiment of a range decision circuit incorporated in the range condition collating circuit shown in FIG. 47.

FIG. 51 is a block diagram showing a first embodiment of the range decision circuit 503 in which a microcomputer is made use of. Referring to the figure, the condition for retrieval indicated at 324-2 is transferred to the microcomputer 540 from the host computer 400 (FIG. 1). In accordance with the retrieving condition 324-2, the numerical values detected by the numerical value detecting circuit 501 are read out from the buffer 502 to be checked by the range decision circuit 503. When it is decided that the numerical value fulfills the given range condition, the range decision circuit 503 outputs the retrieved result 46.

Now, description will be turned to a sequence of processings executed by the range decision circuit 540 constituted by a microcomputer on the assumption that the range condition is given by $15 \leq K \leq 142$ and that the data shown in FIG. 50 is stored in the buffer 502. Then it is apparent that the first numeric character string "123" satisfies the range condition. This fact is messaged to the host computer 400 as the retrieved result 46. On the other hand, the second numeric character string "456" does not meet the range condition. Accordingly, this substring "456" is skipped from being read out. In this way, the microcomputer- based range decision circuit 540 makes decision as to whether or not the numerical value (represented by the numeric character string) detected by the numerical value detecting circuit 501 satisfies the given range condition.

Figure 52:
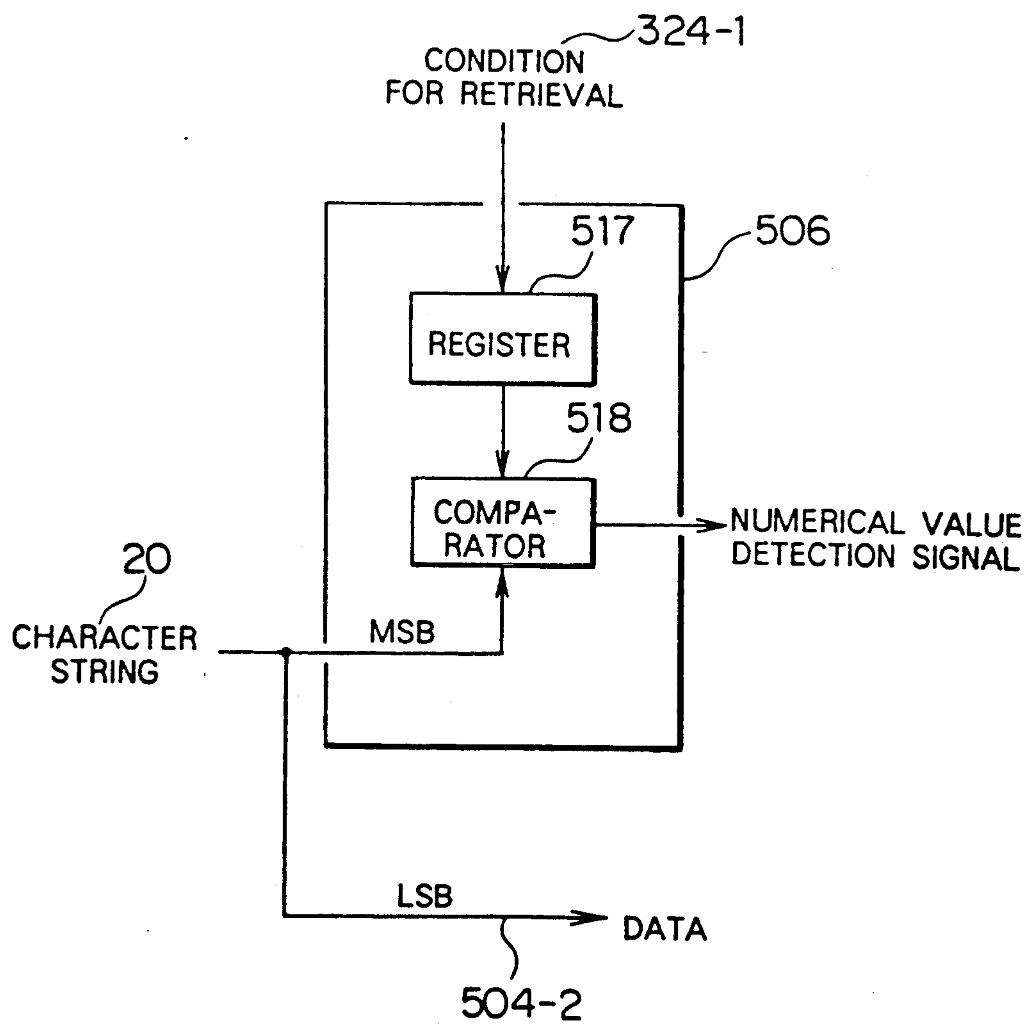
FIG. 52 is a block diagram showing a circuit configuration of a second embodiment of the numerical value detecting circuit range condition collating circuit shown in FIG. 47.

FIG. 52 is a block diagram showing a configuration of the character string decision circuit 506 incorporated in a second embodiment of the numerical value detecting circuit 501 which is adapted to discriminatively identify the numeric characters from the others with more significant bits of the character code while identifying discriminatively the numerical values in the range of "0" to "9" with the aid of the less significant bits. In the case of ASCII code, by way of example, four more significant bits of a code corresponding to "3" represents that the code is a numeric charactercode, wherein four less significant bits represent an associated numerical value.

Referring to FIG. 52, the second embodiment of the numerical value detecting circuit 501 is composed of a register 517 for holding the more significant bits of the numeric character code and a comparator 518 for comparing the more significant bits of a character of the input character string 20 with the output of the register 507. When coincidence is found with the more significant bits of the character code in the character string, it is then decided that the character code of concern is that of the numeric character. The second embodiment of the numerical value detecting circuit 501 can be realized in a compact structure and thus suited for implementation in LSI.

Figure 53:
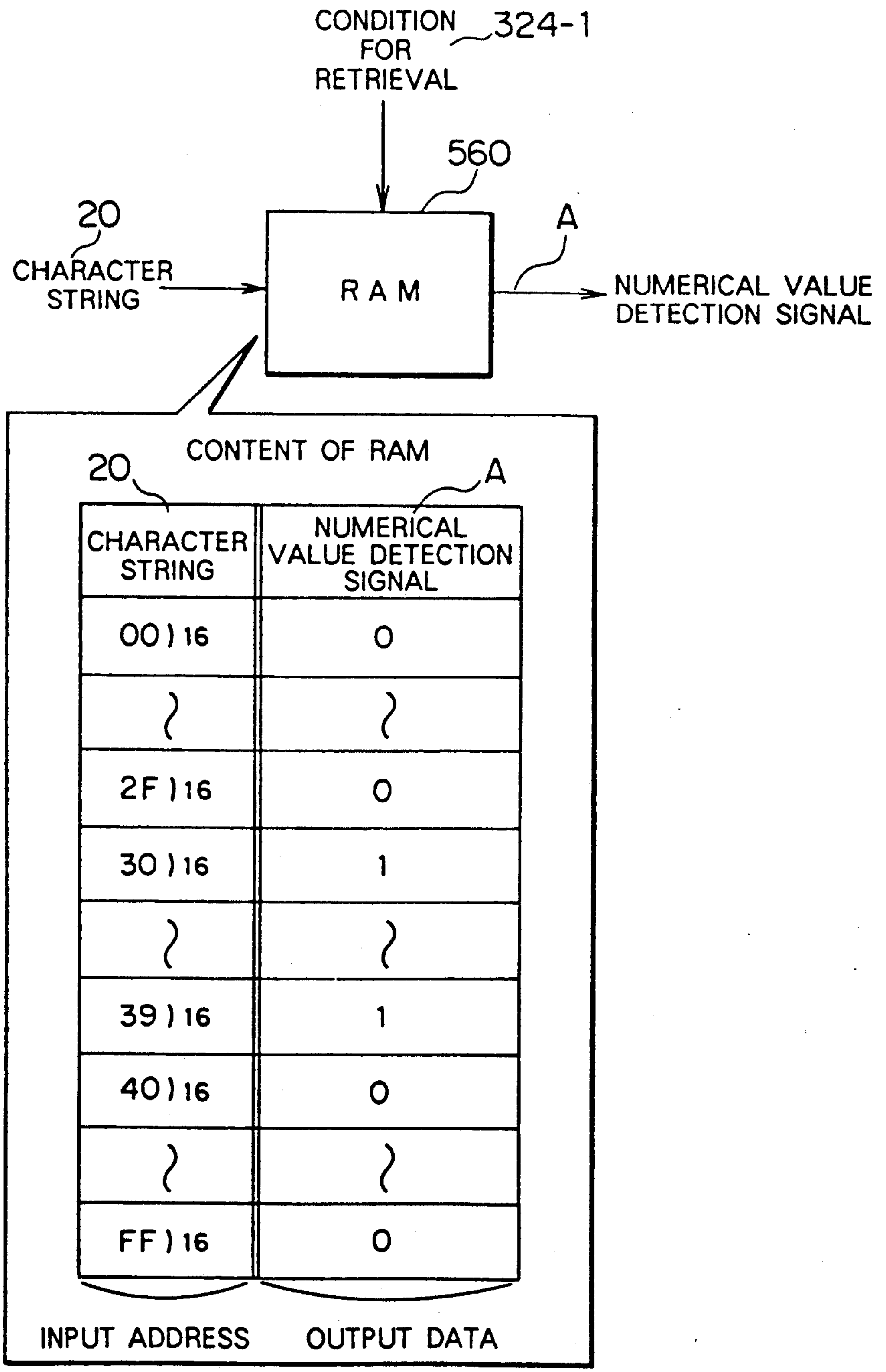
FIG. 53 is a block diagram showing a third embodiment of the numerical value detecting circuit of the range condition collating circuit shown in FIG. 47.

FIG. 53 is a block diagram showing a character string decision circuit 506 in a third embodiment of the numerical value detecting circuit 501. This character string decision circuit 506 is composed of a RAM 560 adapted for detecting the numerical values on the basis of the character codes. To this end, code information 324-1 is loaded in the RAM 560 from the host computer 400 so that the numerical value detection signal A is enabled in case a character string 20 is a numeric character string. In FIG. 53, an example of the RAM table based on the ASCII code is illustrated. When four more significant bits of a character code is "3", this means that the character code represents a numeric character.

In case the character codes to be processed are fixed, the RAM may be replaced by a ROM.

Figure 54:
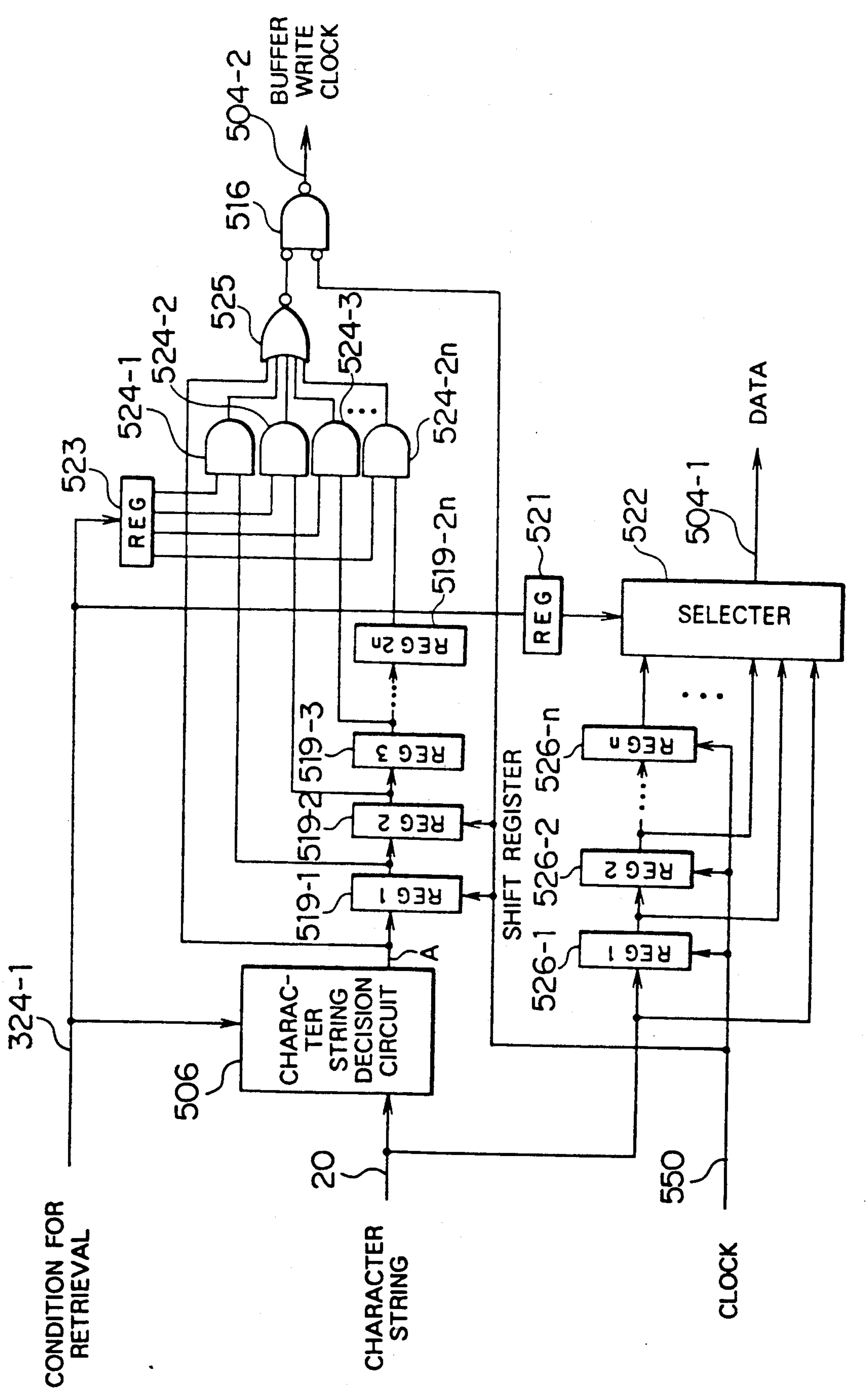
FIG. 54 is a block diagram showing a fourth embodiment of the numerical value detecting circuit incorporated in the range condition collating circuit shown in FIG. 47.

FIG. 54 is a block diagram showing a fourth embodiment of the numerical value detecting circuit 501 which is designed to be incorporated in the third embodiment of the range collation circuit 315-3 for carrying out the retrieval of the numerical value in accordance with the range condition in which a numeric character string is affixed with characters of other species (e.g. Chinese characters, alphabetic letters, blank symbols) in precedence and in succession to the string, respectively. As can be seen from FIG. 54, there are stored not only the numerical value detected by the numerical value detecting circuit 501 but also the other type characters or non-numeric character strings preceding and succeeding to the numerical value.

The numerical value detecting circuit 501 shown in FIG. 54 is composed of the character string decision circuit 506, a shift register 519 for delaying a detection signal A in synchronism with the clock signal 550, a register 523 for designating the number of non-characters placed in precedence to the numeric character string representing a numerical value, an AND circuit 524 and a NOR circuit 525 for selecting the numerical value detection signals, an OR circuit 516 for generating a buffer writing clock signal, a shift register 526 for delaying a character string 20, a register 521 for designating the number of non-numeric characters (e.g. Chinese characters, alphabetic letters or the like) affixed in precedence to the numeric character string to be written in the buffer 502 and a selector 522 for selecting the data to be written in the buffer 502.

At first, the number of non-numeric characters affixed in precedence to the numeric character string to be written in the buffer 502 is designated at the register 521. When the number of the affix characters is one, then "1" is placed in the register 521. On the other hand, there are placed in the register 523 a number of "1s" corresponding to a sum of the numbers of the affix characters located before and after the numeric character string, starting from the zeroth bit of the register 523. Assuming, for example, when one affix character precedes to a numeric character string with one affix character succeeding thereto, "1s" are set at the zeroth and first bits (i.e. bits "0" and "1"), respectively, in the register 523. In case two affix characters are present in precedence to the numeric character string with one affix character succeeding thereto, "1s" are set at the bits "0", "1" and "2" of the register 523, respectively.

Figure 55:
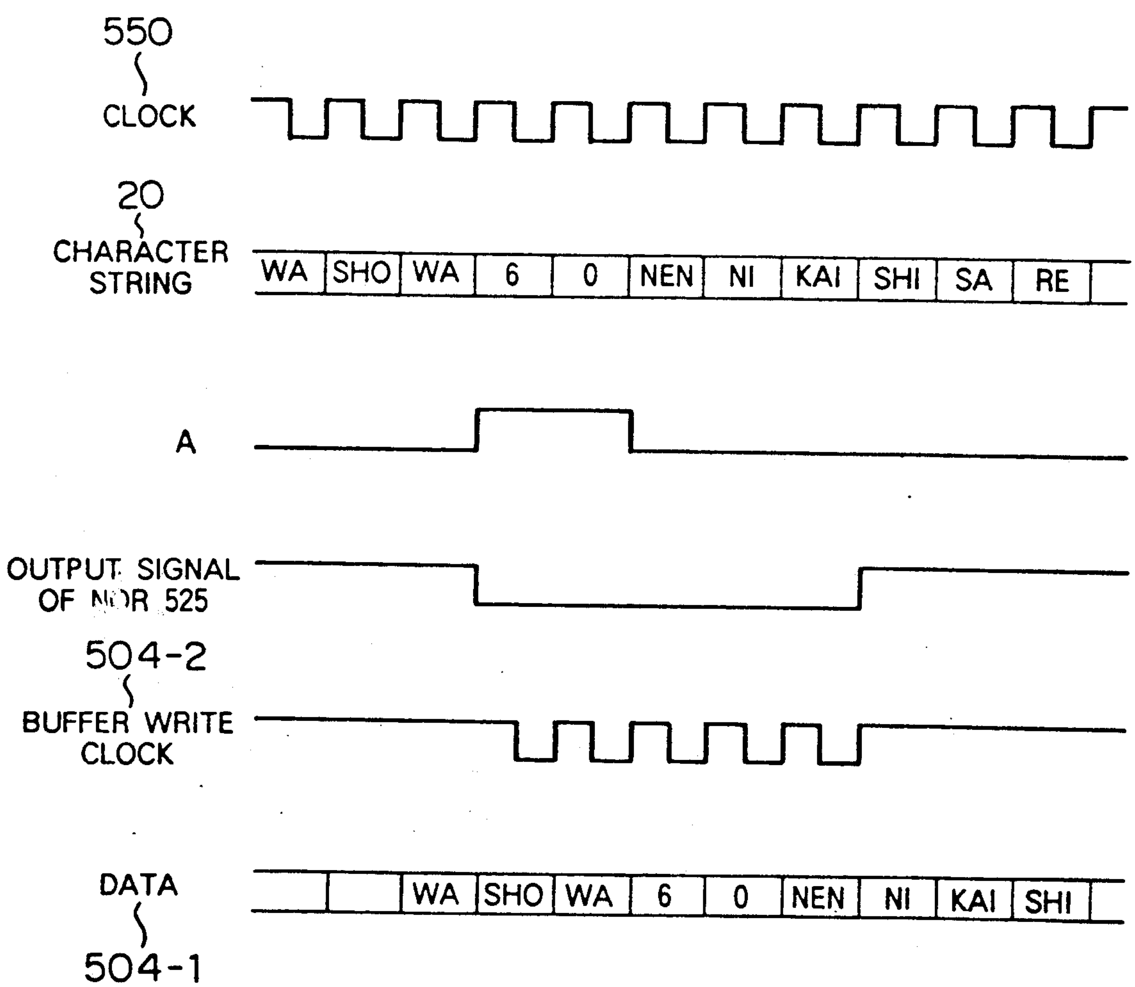
FIG. 55 is a timing chart for illustrating operation in the case where the numerical value detecting circuit shown in FIG. 54 is employed.

FIG. 55 is a timing chart for illustrating operation of the embodiment shown in FIG. 54. In the following description made by reference to FIG. 55, it is assumed that "2" is loaded in the register 521 and the "1s" are set at the bits "0", "1" and "2" of the register 523, respectively. To say in another way, the character string 20 of concern contains a numeric character string having two non-numeric characters affixed in precedence and one non-numeric character affixed in succession. Further, it is assumed that the character string 20 of concern reads, by way of example only, " . . . wa Sho-wa 60 nen ni kai-shi sa re . . . " (" . . . was started in the 60th year of Sho-wa era . . . " in English), wherein "Sho-wa" is expressed by two Chinese characters with "nen" by one Chinese character, as in the case of the example described hereinbefore.

When the numeric character string "60" is inputted, the numerical value detection is validated, resulting in generation of the signal A of logic "1" level. Because the 0th, 1st and 2nd bits of the register 523 are set to "1", the outputs of the AND gates 524-1, 524-2 and 524-3 are selected, wherein the buffer writing period is determined by a logical sum of the signal A and the outputs of the registers 519-1, 519-2 and 519-3. In other words, data is written in the buffer 502 during a period which corresponds to a sum of the durations of the signal A and three clocks. Accordingly, in the case of the illustrated example, data is written in the buffer 502 during a period of five clocks, because the duration of the signal A corresponds to a period of two clocks.

Figure 56:
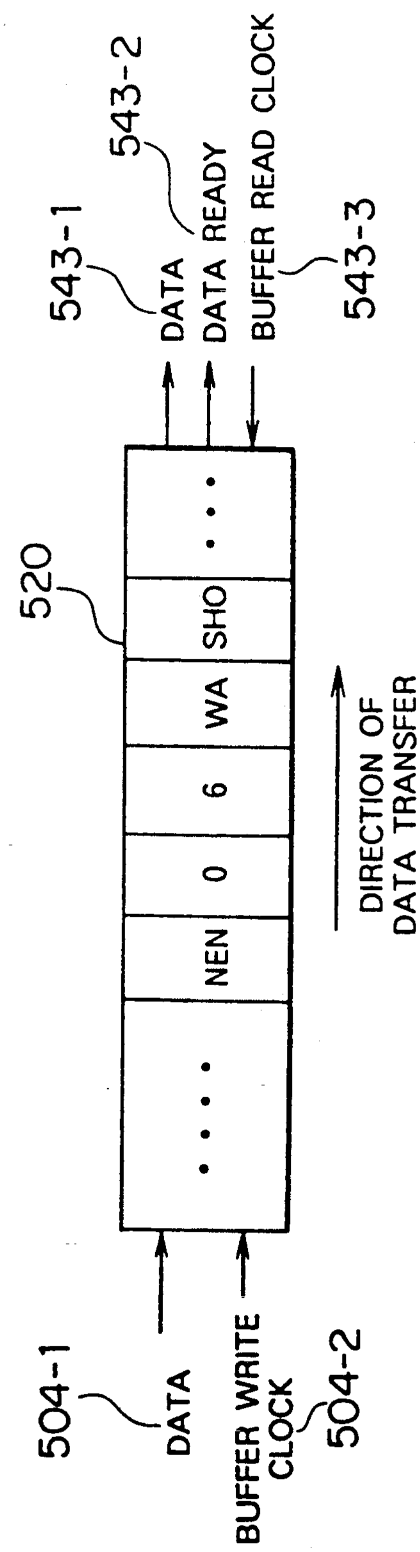
FIG. 56 is a view showing the content of a buffer when the numerical value detecting circuit shown in FIG. 54 is employed.

Next, the timing for data transfer will be considered. When the character string 20 is written in the buffer 502 as it is, there will be placed in the buffer 502 "60 nen ni kai-shi" without the preceding affix character substring "sho-wa". Under the circumstances, there is provided the shift register 526 for delaying the character string 20 for a time corresponding to the number of the affix non-numeric characters preceding to the numeric character string. When zero is placed in the register 521, the character string 20 is selected straightforwardly. On the other hand, when "1" or greater numerical value is placed in the register 521, then the character string 20 is outputted with a delay corresponding to the numerical value of the register 521. In the case of the assumed, example, the affix character substring preceding to the numeric character substring contains two characters (i.e. "sho" and "wa"), the register 521 is loaded with "2", as the result of which the data delayed by two clocks relative to the character string 20 (i.e. the output of the register 526-2) is selected. Thus, there can be written in the buffer 502 the character string "sho-wa 60 nen", as is exemplified in FIG. 56. In this way, by reading out the data from the buffer 502, the range decision circuit 503 can retrieve the numerical value which satisfies the given range condition from those interposed between "sho-wa" and "nen".

Figure 57:
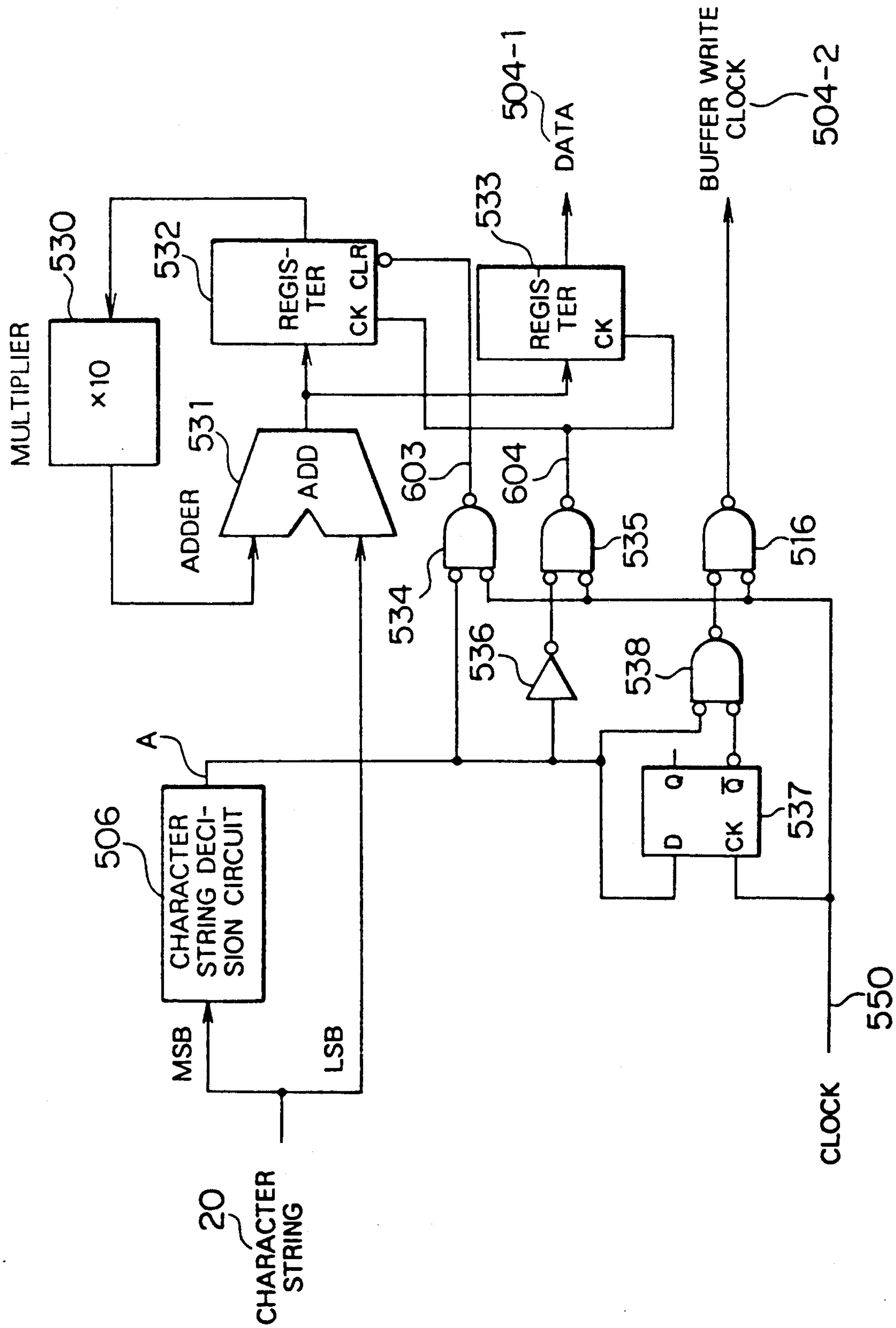
FIG. 57 is a block diagram showing a fifth embodiment of the numerical value detecting circuit of the range condition collating circuit shown in FIG. 47.

FIG. 57 shows in a block diagram a fifth exemplary embodiment of the numerical value detecting circuit 501 which is so arranged as to write the character code of the detected numerals in the buffer 502 after having converted them into binary codes. The numerical value detecting circuit 501 shown in FIG. 57 is composed of the character string decision circuit 506 shown in FIG. 52, a multiplier 530 for multiplying a numerical value with "10", an adder 531 for adding together binary numerical values, registers 532 and 533 for holding the results of the addition, respectively, an OR circuit 534 for generating a clear signal for clearing the register 532, an inverter 536 and an OR circuit 535 for updating the values held in the registers 532 and 533, a flip-flop 537 for generating a clock signal for enabling the data writing in the buffer 502, and OR circuits 538 and 516.

Figure 58:
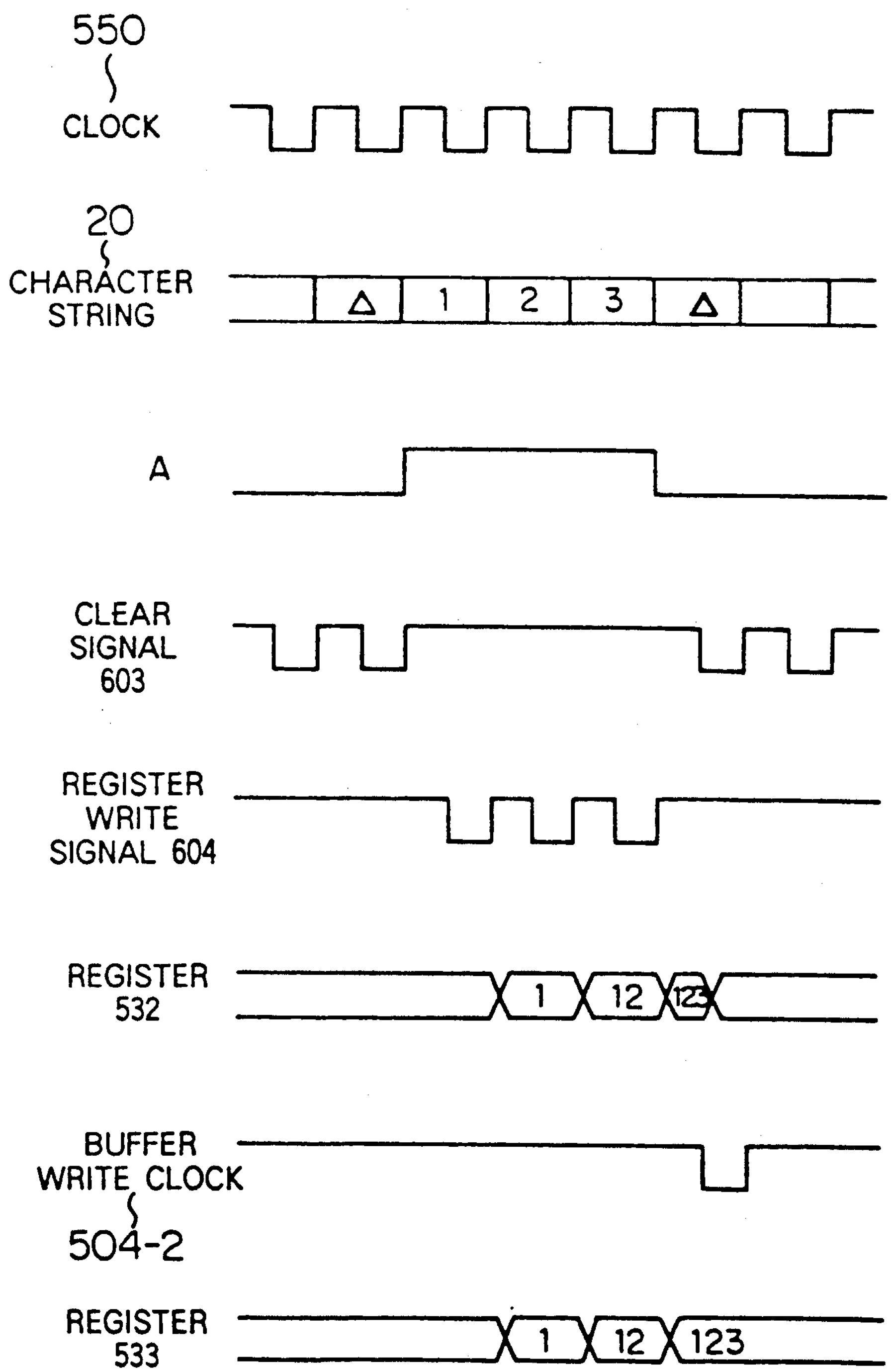
FIG. 58 is a timing chart for explaining operation of the numerical value detecting circuit shown in FIG. 57.

FIG. 58 is a timing chart for explaining operation of the numerical value detecting circuit 501 shown in FIG. 57 on the assumption that the character string 20 is represented by "Δ123Δ". Referring to FIG. 58 along with FIG. 57, every time the character other than the numeric character is detected, the register 532 is cleared by the output signal of the OR circuit 534. When a numeric character "1" is detected by the character string decision circuit 506, a binary number corresponding to "1" (less significant bits of the corresponding character code) is inputted to the adder 531. In the initial state, the content of the register 532 is zero. Accordingly, the value of the numeric character detected is loaded in the register 535 as it is. Upon detection of the numeric character "2", the result of addition ("12" in binary notation) of a product outputted from the multiplier 530 (i.e. the value in register 532 multiplied with a factor of "10") and binary-code value corresponding to the detected numeric character "2" is stored in the register 532. It should be noted that the register 533 is also loaded with the same value as that of the register 532. Further, upon detection of the numeric character "3", the register 532 is then loaded with "123" (in binary notation) through the similar processing as described just above.

Figure 59:
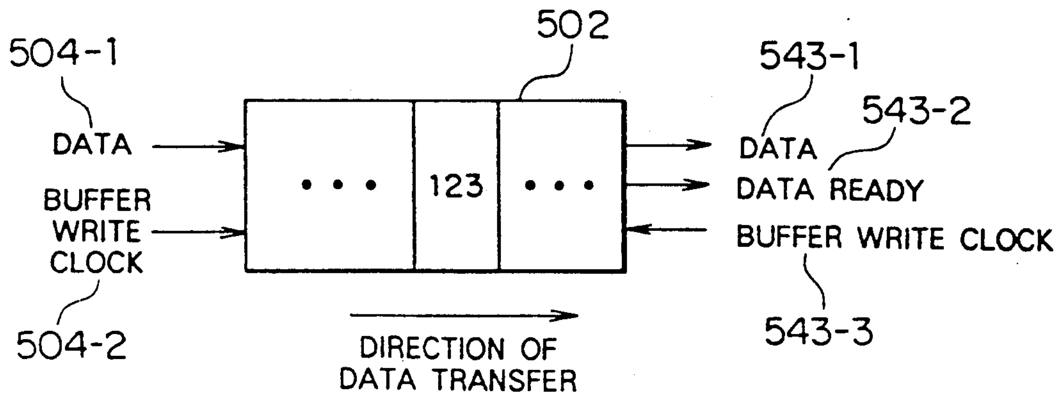
FIG. 59 is view showing the content of a buffer when the numerical value detecting circuit shown in FIG. 57 is employed.

Next, upon detection of a punctuation symbol "Δ", it is decided through cooperation of the flip-flop 537 and the OR gate 538 that the numeric character string has ended in detection. At this time point, the binary-code number of the register 533 is stored in the buffer 502. FIG. 59 shows the content of the buffer 502. At the same time, the register 532 is cleared in order to allow arithmetic operation for determining the binary-code value of a numeric character string to be next detected. In the case of the instant embodiment, there are required the registers 532 and 533 each of increased bit width as well as the adder 531 and the multiplier 530. However, the capacity of the buffer 502 may be significantly small to a benefit, while comparative collation as to whether the numerical value as detected meets the range condition can be executed by using only a compare instruction of the microcomputer 540, which in turn means that the processing to be executed by the microcomputer 540 can extremely be simplified to another advantage.

In the above description of the numerical value detecting circuit 501 shown in FIG. 57, it has been assumed that the character string decision circuit 506 shown in FIG. 52 is employed. It should however be noted that the detected numerical value may equally be transformed into a binary-coded value by using the RAM 560 of the character string decision circuit 506 shown in FIG. 53.

Figure 60:
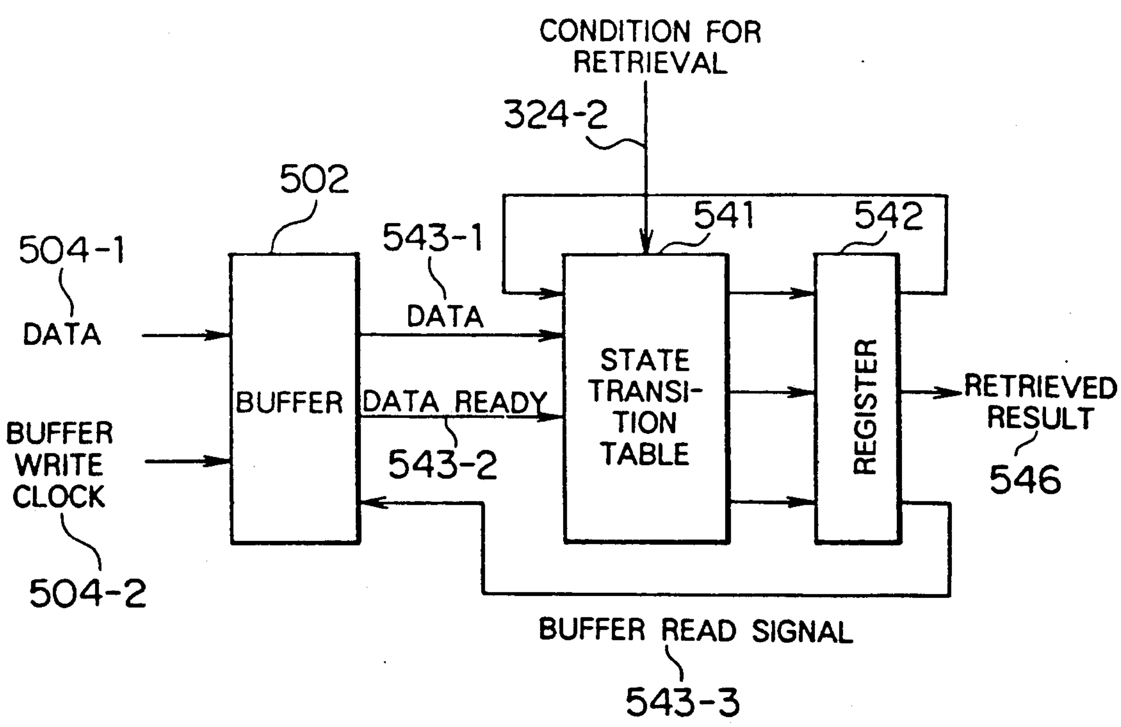
FIG. 60 shows in a block diagram a second embodiment of the range decision circuit incorporated in the range condition collating circuit shown in FIG. 47.

FIG. 60 shows in a block diagram a second exemplary embodiment of the range decision circuit 503 in which a finite automaton is employed. By using the finite automaton, the retrieval of one character can be realized in one machine cycle, which means that the retrieval can be accomplished at a relatively high speed. The finite automaton is constituted by a state transition table 541 and a register 542. The host computer 400 generates the finite automaton corresponding to a given range condition, wherein the state transition information or data of the automaton is stored in the state transition table 541. Data is read out from the buffer 502 on a one-by-one character basis. The state transition of the finite automaton takes place in dependence on the numerical value of the character data read out from the buffer 502 for thereby making decision as to whether or not the numerical value satisfies the range condition. When the range condition is satisfied, the retrieved result 46 is outputted.

Since unnecessary data is eliminated by the numerical value detecting circuit 501 in the case of this embodiment as well, the machine cycle of the finite automaton may be on the order of 200 ns even when the character string reading clock is as high as 50 ns. Consequently, the circuit design can correspondingly be simplified. Besides, because of no need of using an expensive high-speed memory for the state transition table, the range decision circuit 503 according to the instant embodiment can be implemented with inexpensive hardware.

As a third embodiment of the range decision circuit 503, it is conceived to combine this circuit with the numerical detecting circuit 501 shown in FIG. 57 which is so arranged as to perform the binary conversion of the detected numerical value. In this case, the range decision circuit 503 may be implemented in the same circuit configuration as that of the character string decision circuit 506 shown in FIG. 48. More specifically, the upper limit value of the range condition converted to the binary value is stored in the register 508, while the lower limit value is similarly stored in the register 509, wherein the upper and lower limit values are compared with the numerical value undergone the binary conversion by the comparators 510 and 511, respectively. When the comparison shows that the range condition is satisfied, the output of the AND gate 512 assumes logic "1" level. The retrieved result 46 is thus represented by the output signal of this AND gate 512.

With the circuit arrangement described above, the buffer 502 is rendered unnecessary, whereby the range decision circuit 503 can be realized in a simplified hardware structure. Further, when retrievals are to be simultaneously performed for a plurality of range conditions, a corresponding number of the range decision circuits may be disposed in parallel, wherein the upper limit values and the lower limit values of the range conditions are placed in the associated registers 508 and 509, respectively. As a result of this, the circuit configuration of the range condition collating circuit 315 is simplified, whereby implementation of the collating circuit 315 in LSI is much facilitated.

Now, description will be directed to the range-conditional character string retrieving system and the range condition collating circuit according to a fourth aspect of the invention.

Figure 61:
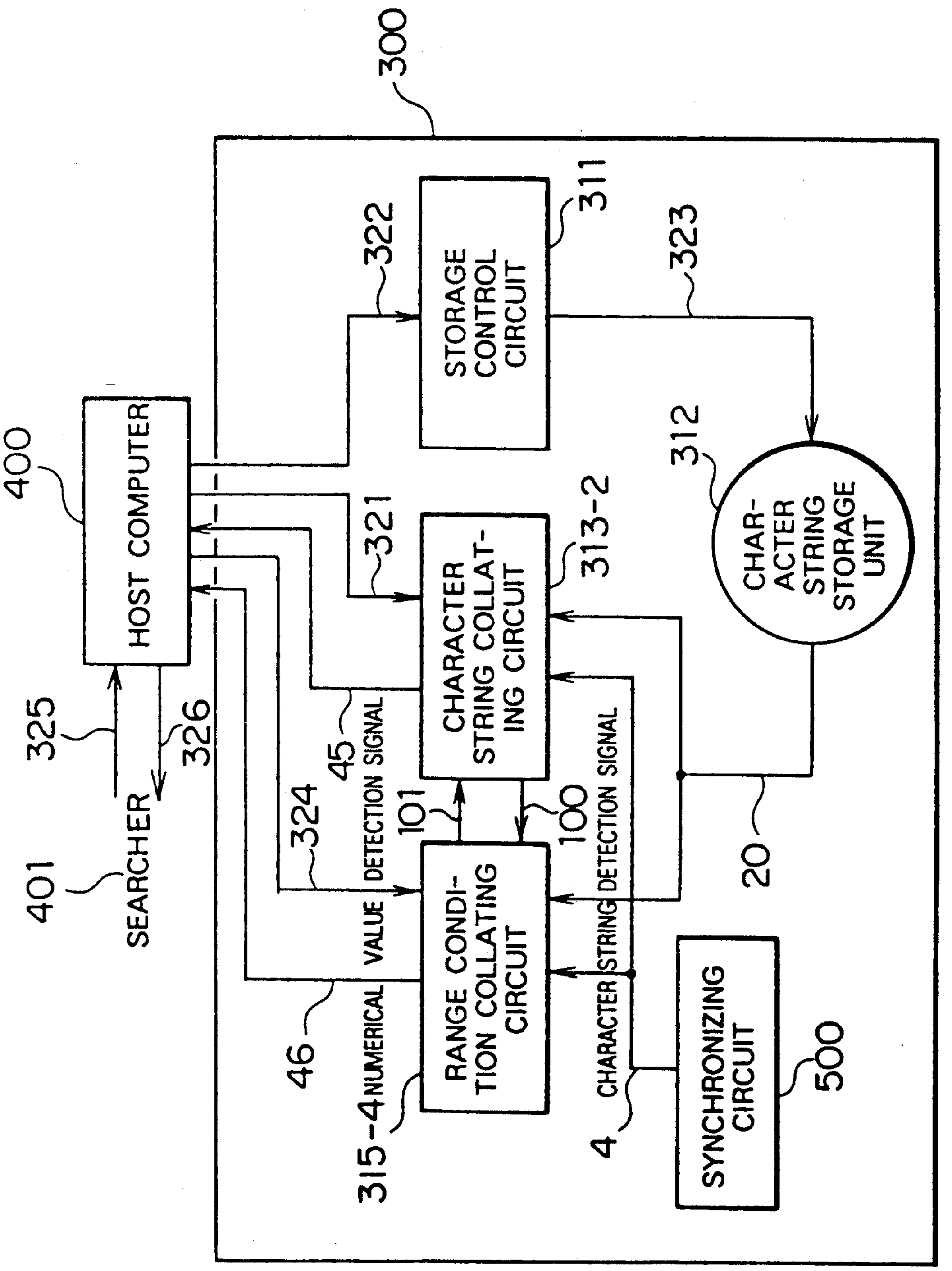
FIG. 61 shows in a block diagram a general arrangement of a range-conditional character string retrieving system according to a fourth aspect of the present invention.

FIG. 61 shows in a block diagram a general arrangement of the range-conditional character string retrieving system 300 according to the fourth embodiment of the invention. The searcher or operator 401 loads a host computer 400 with the condition of retrieval. The host computer 400 analyzes the retrieving condition 325 to transfer retrieval control information 324 for the numeric character string (range condition) contained in the retrieving condition 325 to a range condition collating circuit 315-4, while retrieval control information for the non-numeric character string contained in the retrieving condition 325 is transferred to a character string collating circuit 313-2. The character string collating circuit 313-2 and the range condition collating circuit 315-4 operate in parallel with each other to read out a character string 20 from a character string storage unit 312 for the retrieval on a one-by-one character basis. Every time a numerical value satisfying the retrieving condition is detected in the input character string 20 by the range condition collating circuit 315-4, a numerical value detection signal 101 is transferred to the character string collating circuit 313 from the collating circuit 315-4, while upon detection of a non-numeric character string satisfying the retrieving condition by the character string collating circuit 313-2, a non-numeric character string detection signal 100 is transferred to the range condition collating circuit 315-4. When character substrings to be retrieved are detected from the numeric character string and the non-numeric character string, retrieved results 45 and 46 are transferred to the host computer 400 from the range condition collating circuit 315-4 and the non-numeric character string collating circuit 313-2 in dependence on combinations of the numeric character string and the non-numeric character string, whereupon the host computer 400 supplies the searcher or operator 401 with document or text information 326 containing the character string which satisfies the retrieving condition.

A synchronizing circuit 500 is provided for synchronizing operations of the range condition collating circuit 315-4 and the character string collating circuit in performing the retrieval for the character string 20 so that communication between the range condition collating circuit 315-4 and the character string collating circuit 312-2 at a high speed without involving any latency time.

Now, description will be made in detail of a sequence of signal transfers or transactions between the range condition collating circuit 315-4 and the character string collating circuit 313-2 by referring to a concrete example of the retrieving condition composed of numerical values (numeric character substrings) and non-numeric character substrings.

In the first place, let's assume that a character string to be retrieved is composed of a non-numeric character string and a numerical value (numeric character string) in this order and consider the sequence of signal transaction between the range condition collating circuit 315-4 and the character string collating circuit 313-2. As a concrete example of the retrieving condition, there may be mentioned a character string reading "retrieve a document containing a phrase or description 'from centigrade degree 10 (meaning 10° C. ) to centrigrade degree 30 (30° C.)'" (note that the corresponding Japanese phrase "ses-shi (centrigrade degree)" is represented by two Chinese characters and affixed in precedence to the numerical value in Japanese). In this case, the character string collating circuit 313-2 performs retrieval or search of the non-numeric character string, wherein upon detection of "centigrade degree", the non-numeric character string detection signal 100 is issued to the range condition collating circuit 315-4. On the other hand, the range condition collating circuit 315-4 searches or retrieves the numerical values "10" to "30" which lie within the range designated by the character string representing the retrieving condition. Every time the numerical value falling within this range is detected, the retrieved result 46 is outputted.

Next, consideration will be made of the sequence of signal transactions between the range condition collating circuit 315-4 and the character string collating circuit 313-2 in the case where the character string for retrieval is composed of a numerical value and a non-numeric character string in this order, as exemplified by a retrieving condition 325 reading, for example, "retrieve a text or document containing a description 'from 10 kHz to 100 kHz'". In this case, the range condition collating circuit 315-4 performs retrieval of numerical values falling within the range of "10" to "100". Upon detection of a numerical value within this range, the character string detection signal 101 is issued to the character string collating circuit 313-2 from the range condition collating circuit 315-4. Then, the character string collating circuit 313-2 carries out retrieval of "kHz". Upon detection of this non-numeric character substring, the collating circuit 313-2 outputs the retrieved result 45.

Next, let's consider, by way of example, the retrieval of a character string of such a structure that "a non-numeric character string A is followed by a numeric character string which is then followed by a non-numeric character string B", as exemplified in concrete by "retrieve a text containing a description 'from Sho-wa 3 nen to Sho-wa 64 nen'". In this case, the character collating circuit 313-2 detects "Sho-wa" and issues the character string detection signal 100 to the range condition collating circuit 315-4, which responds to reception of the character string detection signal 100 by starting the search and retrieval of the numerical values falling within the range of "3" to "64" inclusive. Upon detection of a numerical value satisfying this condition, the range condition collating circuit 315-4 issues the numerical value detection signal 101. The character string collating circuit 313-2 then responds to reception of the numerical value detection signal 101 by retrieving "nen". Upon detection of "nen", the retrieved result 45 is outputted.

In this manner, the character string collating circuit 313-2 and the range collating circuit 315-4 retrieve the non-numeric character string and the numerical value (numeric character string), respectively, and mutually transfer the retrieved results to thereby search and retrieve a character string of concern which is composed of a character string(s) and a numerical value(s).

Figure 62:
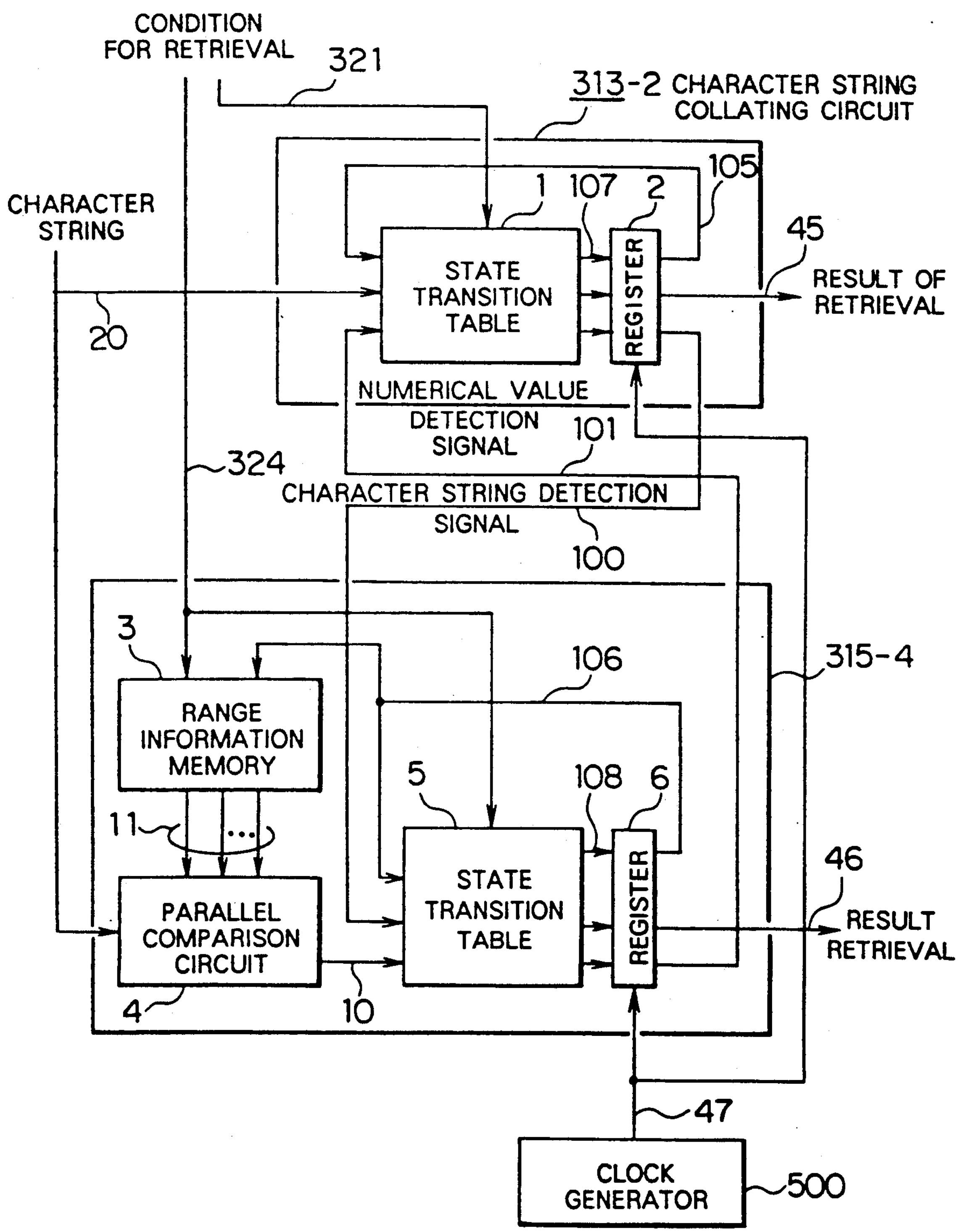
FIG. 62 shows in a block diagram circuit configurations of a character string collating circuit and a range condition collating circuit, respectively, of the range-conditional character string retrieving system shown in FIG. 61.

FIG. 62 is a block diagram showing, by way of example, circuit configurations of the range condition collating circuit 315-4 and the non-numeric character string collating circuit 313-2, respectively, of the range-conditional character string retrieving system shown in FIG. 61. Referring to FIG. 62, the non-numeric character string collating circuit includes a finite automaton for retrieval of non-numeric character string which is constituted by a state transition table 1 for storing information of state transitions taking place in the automaton and a register 2. On the other hand, the range condition collating circuit 315-4 includes a finite automaton for retrieval of numerical value which is constituted by a state transition table for storing the information of state transistions taking place in the automaton and a register 6, a range information memory 3 for storing the numerical values such as upper and lower limit values of a numeric character string corresponding to the state transition conditions in the form of character codes, and a parallel comparison circuit 4 for performing comparative collation between the outputs of the range information memory 3 and a character string.

FIG. 63 shows an example of the state transition table 1 of the character string collating circuit 313-2. The input address is composed of a current state 105, the numerical value detection signal 101 and a character string 20, while the output data is composed of a succeeding state 107, retrieved result 45 and the character string detection signal 100. As can be seen from FIG. 63, the state transition takes place in a given state in accordance with the numerical value detection signal 101 and the non-numeric character string. In the case where a constituent or partial character string (i.e. substring) in a character string for retrieval (e.g. "Shou-wa" in "Sho-wa 50 nen") is detected in a given state, the non-numeric character string detection signal 100 is outputted, while the retrieved result 45 is produced as the output when a character string coinciding with the last non-numeric character string (i.e. "nen" in "Sho-wa 50 nen") is detected in the character string subjected to retrieval.

FIG. 64 shows an example of the state transition table 5 of the range condition collating circuit 315-4. The input address is composed of a current state 106, the character string detection signal 100 and the result of comparison between the output 11 of the range information memory 3 and the character string 20, while the output data is constituted by a succeeding state 108, retrieved result 46, the numerical value detection signal 101 and a select signal 103 for designating a position of the numeric character stored in the range information memory 3. In other words, the state transition from a given state occurs in accordance with the character string detection signal 100 and the result of comparison between the output 11 of the range information memory 3 and the character string for retrieval. Further, when a numeric character string constituting a part of the character string to be retrieval (e.g. "50" in "Sho-wa 50 nen") is detected, the numerical value detection signal is outputted, while upon detection of the last numeric character string in the character string subjected to retrieval (e.g. "50" of "centigrade degree 50"), the retrieved result 46 is outputted.

The range information memory 3 may be implemented in a same structure as the one shown in FIG. 25 and described hereinbefore in conjunction with the range condition collating circuit 315 according to the second aspect of the invention. Further, the parallel comparison circuit 4 may be of a same structure as that shown in FIG. 26.

In the following, description will be made concerning the sequence of retrieving operation carried out by the character string collating circuit 313-2 and the range condition collating circuit 315-4 on the assumption that the range condition is given, for example, by "Sho-wa 3 nen≦K≦Sho-wa 64 nen".

The above condition is in the form of "non-numeric character string A+ numerical value+ non-numeric character string B" in more general terms, wherein "sho-wa" corresponds to the non-numeric character string A, the numerical value of concern lies in a range of "3" to "64" inclusive, and the "nen" corresponds to the non-numeric character string B.

FIG. 65 shows a state transition diagram for the character string collating circuit 313-2.

Referring to FIG. 65, "sho" it waited for in the state 0. Upon detection of "sho", state transition is made to the state "1". In this state 1, "wa" is waited for. Upon detection of "wa", transition is made to the state 2. At this time point, a character string detection signal 100 indicating detection of "sho-wa" is issued to the range condition collating circuit 315-4. In the state 2, a numerical value detection signal 101 is awaited which messages the detection of a numerical value (numeric character string in the range of "3" to "64" inclusive). When the numerical value detection signal 101 and "nen" are simultaneously detected, the result of detection indicated at 45 is outputted. Every time "sho" is detected in any of the states, transition is made to the state 1, whereon retrieval is newly repeated, starting from the beginning.

FIG. 66 shows a state transition table 1 corresponding to the aforementioned state transitions. Referring to FIG. 66, the input address is composed of the current state 105, the numeric value detection signal 101 and the character string 20, while the output data is composed of the succeeding state 107, retrieved result 45 and the character string detection signal 100. It is assumed that state transition is made to the state "0" when a signal other than the input signals listed in the state transition table is detected.

Figure 67:
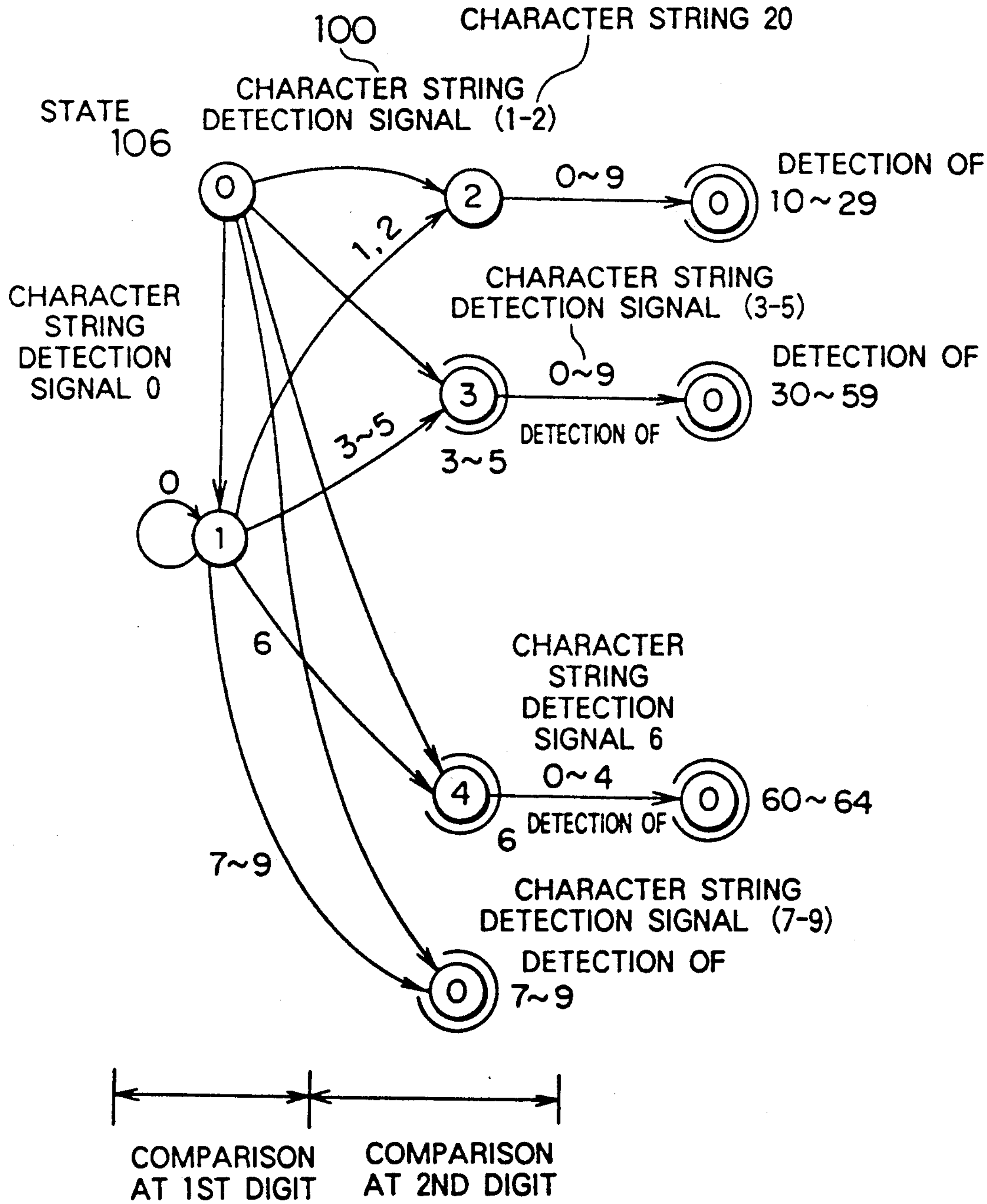
FIG. 67 is a view showing a state transition diagram of the range condition collating circuit shown in FIG. 62.

Next, description will be turned to operation of the range condition collating circuit 315-4. FIG. 67 shows a state transition diagram of the range condition collating circuit 315-4. Transition to the state 0 takes place upon every detection of the non-numeric character string, although this state transition path is omitted from illustration.

At first, the character string detection signal 100 messaging the detection of "sho-wa" by the character string collating circuit 313-2 is waited for in the state 0, whereon the character string detection signal 100 and the character string 20 are simultaneously checked, which is then followed by the corresponding state transitions. More specifically, when the character string 20 contains "0" in the state 0, transition is made to the state 1. When the character string 20 contains "1" or "2" in the state 1, the state transition to the state 2 takes place. When the character string 20 contains a numeric character in a range of "3" to "5", transition is made to the state 3, while transition is made to the state 4 when the character string 20 contains "6". State transition to the state 0 occurs when the numerical value lies is a range of "7" to "9".

As will be seen, the state transition from the state 1 to the state 4 occurs in accordance with the character string 20 as well. Upon detection of a numerical value which satisfies the range condition, a numerical value detection signal 101 is issued without making confirmation as to whether or not the numeric character string is completed. In contrast, the character string collating circuit 313-2 can perform the comparative collation on a succeeding character at the same timing as the reception of the numerical value detecting signal 101 because the character string collating circuit 313-2 operates in synchronism with the range condition collating circuit 315-4. As a result, when the succeeding character is "nen", this means that the character string collating circuit 313-2 has detected the character string to be retrieved. On the other hand, so long as the numeric characters succeed to one another, the character string collating circuit 313-2 will have to wait for detection of "nen". When a numerical value satisfying the rang condition has been detected, the range condition collating circuit 315-4 makes state transition to the state 0 and waits for the non-numeric character string detection signal.

As will be appreciated from the above, by virtue of synchronous operation of the character string collating circuit 313-2 and the range condition collating circuit 315-4, there can be realized a high-speed retrieval without causing the character string 20 to wait for processing even in the course of communication between the character string collating circuit 313-2 and the range condition collating circuit 315-4.

FIG. 68 shows a structure of the range information memory 3 for realizing the state transitions described above, while FIGS. 69A and 69B show a corresponding state transition table. Although the range information memory 3 illustrated is so arranged as to be capable of registering five sets of conditions for the state transitions, it should be understood that the present invention is never restricted to such specific number of registrations.

Description will be made of the range information memory. In the case of the example now under consideration, it is assumed that the state transition is allowed be made up to the state 4. Accordingly, the state transition conditions are registered in the state 0 to 4. More specifically, for the state 0 and 1, there are registered five different state transition conditions of "0", "1" to "2", "3" to "5", "6" and "7" to "9", respectively. For each of the states 2 and 3, one state transition condition of "0" to "9" is registered. Similarly, for the state 4, one transition condition of "0" to "4" is registered.

These state transition conditions are compared with the character string 20 by the parallel comparison circuit 4. In the state 0, the result of comparison indicated at 10 is "0" when the character string 20 is "0", while assuming "1" when the character string 20 is "1" or "2". Further, the presence of a numeral in the range of "3" to "5" in the character string 20 results in the comparison result 10 of "2", and a numeral "6" in the character string 20 leads to the comparison result of "3". When the character string 20 is of a numerical value of "7" to "9" inclusive, the comparison result 10 is "4". The comparison result for the characters in the character string 20 other than the numerals mentioned above is "5". Same applies to the state 2 and others.

Next, description will be made of the contents of the state transition table shown in FIGS. 69A and 69B. Registered in the state transition table 5 are the state transition destination, the numerical value detection signal 101 and the retrieved result 46 in accordance with the result of comparison 10 between the state transition condition 11 and the character string 20 as well as the character string detection signal 100 outputted from the character string collating circuit 313.

The range condition collating circuit 315-4 issues the numerical value detection signal 101 whenever it detects a numeric character of a value satisfying the range condition in any one of the states independent of whether or not the numeric character is an intermediate one in the string of successive numeric character. Let's assume, for example, a numeric character "5" is detected in the state 0. Since this numeric character is of a value which satisfies the given range condition, the numerical value detection signal 101 is outputted regardless of whether or not the next character in the character string represents a numeric value. It is the role of the character string collating circuit 313-2 to decide the end of the numeric character substring in the character string 20. In other words, the character string collating circuit 313-2 retrieves the succeeding character for making the aforementioned decision simultaneously with reception of the numerical value detection signal 101. In the case of the example under consideration, the character string for retrieval is assumed to end in the non-numeric character string. Accordingly, the retrieved result 46 is not outputted even when the numeric character substring comes to an end. However, in the case of the retrieval of a character string which ends in a numeric character such as, for example, retrieval of a text containing a description "from 'centigrade 10 degree' to 'centigrade 50 degree'", the range condition collating circuit 315-4 confirms the end of the numeric character string by checking a character succeeding to the last numeric character, whereon the circuit 315-4 outputs the retrieved result so far as the numerical value as detected satisfies the range condition.

In more concrete, let's consider a character string 20 reading "sho-wa 60 nen", wherein the characters "sho", "wa", "6", "0" and "nen" are successively inputted in this order.

Figure 70:
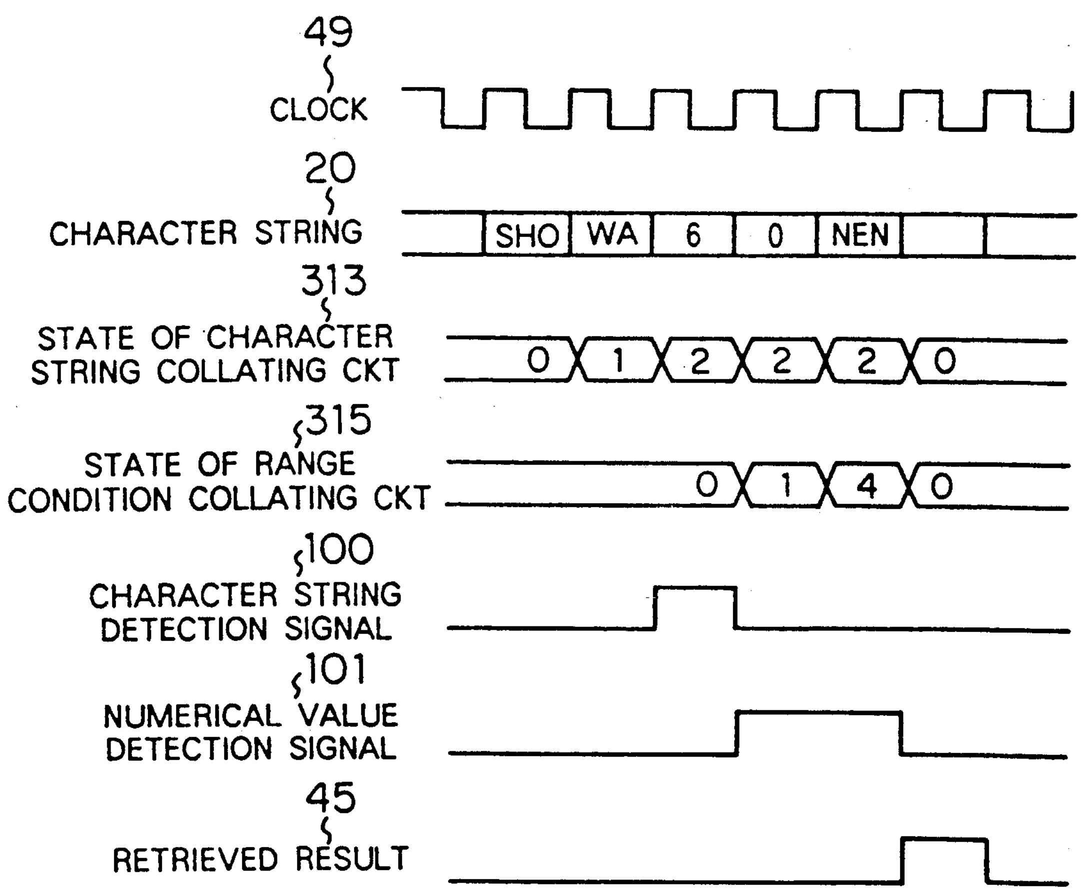
FIG. 70 is a timing chart for illustrating operations of the character string collating circuit and the range condition collating circuit shown in FIG. 62.

FIG. 70 is a timing chart for illustrating operations of the character string collating circuit 313-2 and the range condition collating circuit 315-4 in this case.

(1) When the character string collating circuit 313-2 detects a character "sho" in the character string 20, it makes transition to the state 1.

(2) When the character string collating circuit 313-2 detects a character "wa", it transits to the state 2 and at the same time issues the character string detection signal 100.

(3) For "6" in the character string 20, the range condition collating circuit 315-4 receives the character string detection signal 100 and simultaneously detects "6", whereon the circuit 315-4 transits to the state 4 and issues the numerical value detection signal 101.

(4) Upon detection of "0" in the character string 20, the character string collating circuit 313-2 receives the numerical value detection signal 101 and remains in the state 2 because the character "nen" is not detected yet.

When the range condition collating circuit 315-4 detects "0", it transits to the state 0 and issues the numerical value detection signal 101.

(5) Finally, the character string collating circuit 313-2 detects the numerical value detection signal 101 and "nen", whereupon the circuit 313-2 transits to the state 0 and at the same time issues the retrieved result 45.

Through communication of the results of the collations between the character string collating circuit 313-2 and the range condition collating circuit 315-4 in the manner described above, the range condition for retrieval given by a character string and containing designated non-numeric character substrings in precedence and in succession to a numeric character substring, respectively, can be realized.

FIG. 71 shows in a block diagram details of the range-conditional character string retrieving system according to a further embodiment of the invention. Referring to the figure, the host computer 400 includes a CPU 410, a main memory 405, a CRT display 403, a keyboard 404 and a communication adapter 402. The searcher inputs a keyword for retrieval with the aid of the keyboard 404. The main memory 405 stores therein an automation generating program 406 and a retrieval controlling program 407. The automaton generating program 406 is executed by the CPU 410 to thereby generate an automaton corresponding to the input keyword.

Subsequently, the retrieval controlling program 407 is executed by the CPU 410, as a result of which state transition information of the automaton is transferred to the range condition collating circuit 315 and the character string collating circuit 313 via the communication adapter 402 to activate a storage control circuit 311 of the range-conditional character string retrieving system 300. The storage control circuit 311 then selects a predetermined disk from a character string storage unit 312 containing a plurality of disks to read out a character string from the selected disk. The character string as read out is then transferred to the range condition collating circuit 315 and the character string collating circuit 313 which responds thereto by retrieving the numerical value and the non-numeric character string, the result of the retrieval being transferred to the CPU 410. Information of a document text retrieved in this manner is then displayed on the CRT display 413.

Figure 72:
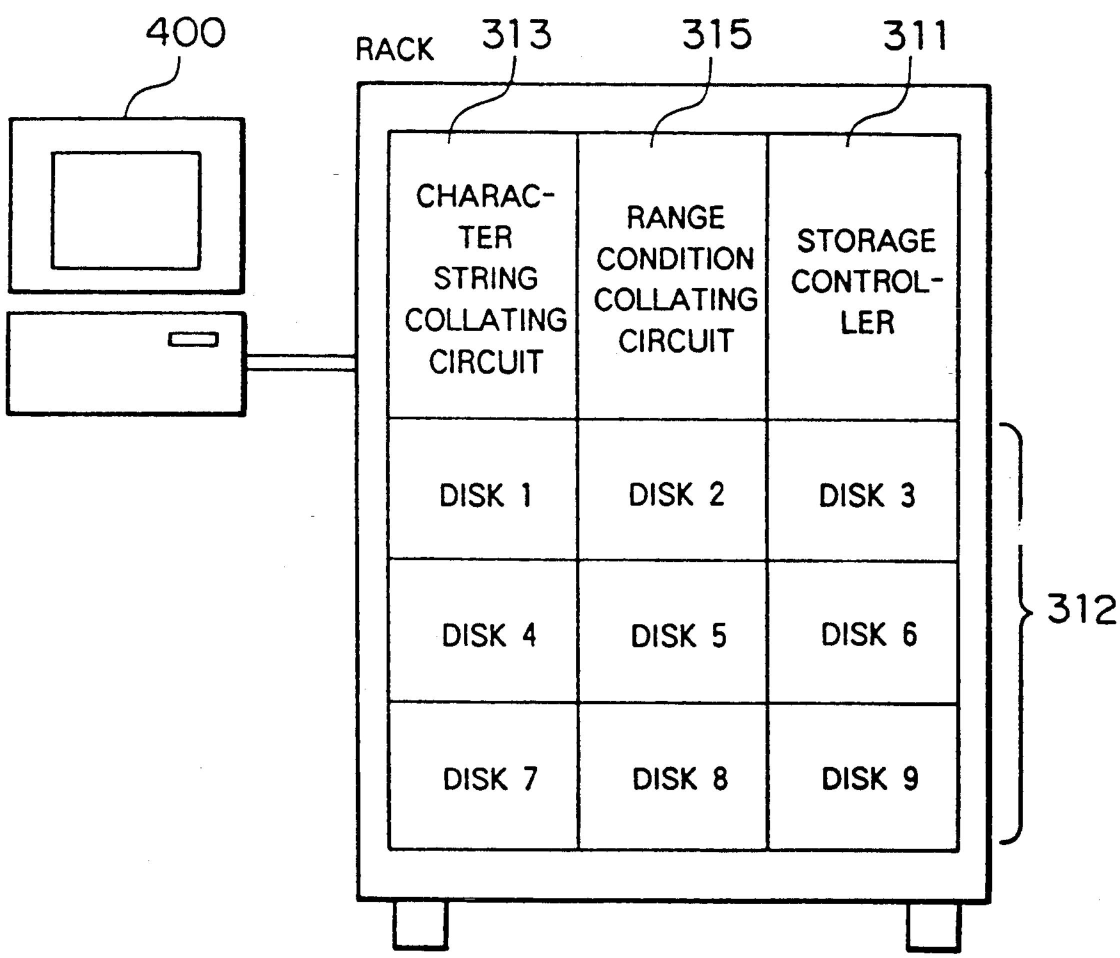
FIG. 72 is a pictorial view showing only schematically an outer appearence of a range-conditional character string retrieving system according to the present invention.

FIG. 72 is a pictorial view showing only schematically an outer appearance of the range-conditional character string retrieving apparatus. The host computer may preferably be constituted by a personal computer or workstation. Other constituents may conveniently be accommodated within a small size rack.

In the foregoing description of the various aspects and embodiments of the invention, it has been presumed that the range-conditional character string retrieving system 300 is inplemented as an independent unit adapted to receive the automaton state transition information from the host computer 400. It should however be understood that the character string collating circuit 313, the range condition collating circuit 315, the storage control circuit 311 and others which constitute parts of the range-conditional character string retrieving system may be incorporated in the host computer or alternatively be implemented independently by dedicated units without resorting to the use of the host computer.

Further, in the above description, the system for retrieving or searching a character string containing a numerical value or values (numeric character string or strings) has been referred to as the range-conditional character string retrieving system. It should however be added that the present invention is never limited to the retrieval of the numerical value (numeric character string) but can equally be applied to retrieval or search of other types of character strings, as will be appreciated from the descriptions made in conjunction with various modes of carrying out the invention.

As will be appreciated from the foregoing description, there has been proposed according to the present invention a range-conditional character string retrieving system for retrieving or searching from a series of characters composed of symbols expressed in a code a character string composed of a specific character string and a numerical value within a predetermined range, which system is composed of a specific character string collating circuit for retrieving the specific character string and the range condition collating means for detecting the numerical value within the predetermined range from an input character string, wherein the specific character string and the numerical value can be retrieved simultaneously.

In the range-conditional character string retrieving system according to the first aspect of the present invention in which retrieval of the numerical value is realized by resorting to an automaton technique, the condition for retrieval (i.e. retrieving condition) designated in terms of a range of the numerical value to be retrieved is divided or partitioned into a number of conditions which correspond to the number of digits of the numerical value, wherein the automaton is generated for each of retrieval conditions resulting from the patition. With such arrangement, generation of the automatons can be much simplified with the time taken for generation of the automatons being correspondingly reduced. Simplification of the automaton in turn means that the number of the state transitions can correspondingly be decreased, which in turn results in reduction in the capacity of the state transition table incorporated in the range condition collating circuit. Besides, the time required for the host computer to transfer the automaton state transition information to the range condition collating circuit can be shortened.

In a preferred mode for carrying out the invention in conjunction with the first aspect thereof, the numerical value retrieving circuit may be provided for each of the range conditions partitioned on the digit basis for thereby allowing these circuits to to perform the respective numerical value retrieving operations simultaneously in parallel. With this arrangement, an increased retrieving speed can be realized.

Further, in the range-conditional character string retrieving system according to the first aspect of the invention, the range condition collating unit may be provided with a register for storing a character string and a comparator for comparing the character string stored in the register with character series to undergo retrieval. Thus, there can be realized retrieval of the numerical value (numeric character string) by designating non-numeric character strings which precedes and/or succeeds to the numerical value, respectively.

In the range-conditional character string retrieving system according to the second aspect of the invention, the automaton for retrieving numerical value(s) is generated such that the conditions for state transition from a predetermined state to plural other states can be designated by respective ranges of character codes (upper and lower limit values). Thus, the number of the state transitions (transition paths) can be decreased, whereby the capacity of the state transition table can significantly be reduced. Besides, because the amount of state transition information can be reduced, the time taken for the host computer to transfer the state transition information generated thereby to the range condition retrieving circuit can equally be reduced. In this manner, a high-speed retrieval can be accomplished.

Additionally, due to designation of the state transition conditions with the aforementioned range, the range-conditional retrieval may equally be effectuated for character codes such as alphabetic letters, Japanese cursive or square kanas arrayed in a preestablished order in addition to those of the numeric values.

The range condition retrieving circuit of the range-conditional character string retrieving system according to the second aspect of the invention may equally be provided with register for storing a specific character string and a comparator for comparing it with an input character string subjected to the retrieval to thereby allow retrieval of the numerical value by designating character substring(s) preceding and/or succeeding to the numerical value.

In the range-conditional character string retrieving system according to the third aspect of the invention, the range condition collating circuit is provided with a numerical value detecting circuit for detecting a numerical value from a character string and a range decision circuit for deciding whether or not the numerical value detected by the numerical value detecting circuit lies within a specific range. By virtue of this structure, search of a numeric character string as well as determination of the numerical value thereof can be performed at a high speed. Thus, high-speed retrieval can be realized.

By providing the numerical value storing circuit for buffering the numerical value detected by the numerical value detecting circuit, the range decision circuit may be implemented by a processor of a low processing speed. Thus, the numerical value retrieving system may be implemented inexpensively.

The range condition collating circuit of the range-conditional character string retrieving system according to the third aspect of the invention may be provided with a shift register for storing temporarily at least one of character strings positioned immediately before or after the numerical value detected by the numerical value detecting circuit to thereby detect simultaneously the specific character string and the numerical value of a predetermined range, which in turn makes it possible to retrieve the numerical value by designating the character string preceding or succeeding thereto.

Further, by providing the binary conversion circuit for converting the code of numerical value detected by the numerical value detecting circuit to a binary code, circuit configuration of the range decision circuit can be simplified, whereby the system can be manufactured inexpensively.

Besides, use of a microcomputer as the range decision circuit leads to cost reduction in implementation of the range decision circuit and hence the range-conditional character string retrieving system.

When the rage decision circuit is implemented as a finite automaton, retrieval of one character can be realized in one machine cycle, rendering it possible to perform the retrieval at a high speed.

With the range-conditional character string retrieving system according to the fourth aspect of the invention which is provided with a character string collating circuit for retrieving a specific character string and range condition collating circuit for detecting a numerical value of a predetermined range from an input character string subjected to the retrieval, retrieval of the numerical value can be carried out by designating the character string preceding and/or succeeding to the numerical value.

In this case, by providing in association with the character string collating circuit a first communication circuit for transmitting a character string detection signal to the range condition collating circuit while providing a second communication circuit for transmitting a numerical value detection signal to the character string collating circuit in association with the range condition collating circuit, the latency time can be suppressed to a minimun in the communication between the range condition collating circuit and the character string collating circuit, whereby the retrieval can correspondingly be speeded up.

Additionally, by providing synchronizing circuit for establishing synchronism in operation between the character string collating circuit and the range condition collating circuit, the latency time involved in the communication between the range condition collating circuit and the character string collating circuit can further be decreased to ensure a higher speed of retrieval.

As will be seen from the above, the present invention presents significantly advantageous numerous effects.

We claim:

1. A range-conditional character string retrieving system, comprising range condition collating means for retrieving a numerical value within a specific range from a character string subjected to retrieval which is composed of symbols expressed in codes, wherein when an upper limit value and a lower limit value defining said specific range for the numerical value to be retrieved differ from each other by at least two in the number of digits, means constituting a part of said range condition collating means partitions said specific range for said numerical value to be retrieved into (a) a range extending from said lower limit value to a maximum numerical value of a same digit number as that of said lower limit value, (b) a range extending from a minimum numerical value of a digit number greater than that of said lower limit value by one digit to a maximum value of a digit number smaller than that of said upper limit value by one digit, and (c) a range extending from a minimum numerical value of a same digit number as that of said upper limit value to said upper limit value, while when said lower limit value and said upper limit values differ by one in the digit number, said specific range for the numerical value to be retrieved is partitioned into the aforementioned ranges (a) and (c), and when said lower limit value and said upper limit value are of a same digit number, said specific range is held intact, whereon said means performs retrieval of said numerical value in each of said ranges resulted from said partition or in said specific range held intact.

2. A range-conditional cahracter string retrieving system according to claim 1, wherein said range condition collating means includes:

upper limit value storage means for storing said upper limit value of said specific range and a maximum numerical value of a same digit number as that of said upper limit value;

lower limit value storage means for storing said lower limit value of said specific range and a minimum value of a same digit number as that of said lower limit value;

value coincidence decision means for comparing said character string subjected to retrieval with output of said upper limit value storage means and output of said lower limit value storage means; and range condition decision means having a finite automaton function for designating the output of said upper limit value storage means and the output of said lower limit value storage means, controlling input of said character string subjected to retrieval and making state transitions on the basis of results of decisions made by said value coincidence decision means.

3. A range-conditional character string retrieving system according to claim 2, wherein said range condition collating means further includes:

retrieval-designated symbol storage means for storing a symbol designated for retrieval and affixed at least in precedence to or in succession to said numerical value; and symbol coincidence decision means for comparing said character string subjected to retrieval with the output of said retrieval-designated symbol storage means; and wherein said range condition decision means makes state transition on the basis of the results outputted from said value coincidence decision means and said symbol coincidence decision means, respectively.

4. A range-conditional character string retrieving system according to claim 1, wherein at least two said range condition collating means are integrated on one and same chip.

5. A range-conditional character string retrieving system according to claim 1, wherein said range-conditional character string retrieving system is externally supplied with retrieval control information prepared in accordance with difference in the number of digits between the lower limit value and the upper limit value of said specific range of the numerical value to be retrieved and retrieves from the character string subjected to retrieval stored in character string storage means the numerical value within said specific range on the basis of said retrieval control information.

6. A range-conditional character string retrieving system, comprising range condition collating means for retrieving from a character string subjected to retrieval and composed of symbols expressed in a code a numerical value lying within a specific range, wherein said range condition collating means includes:

means for partitioning range condition for the specific range of the numerical value to be retrieved into sub-ranges in accordance with difference in the number of digits between an upper limit value and a lower limit value of said specific range, wherein retrieval of the numerical value is performed in each of said sub-ranges.

7. A range-conditional character string retrieving method for retrieving from a character string composed of symbols expressed in a code and subjected to retrieval a numerical value lying within a specific range, wherein when an upper limit value and a lower limit value defining said specific range for the numerical value to be retrieved differ from each other by at least two in the number of digits, said specific range for said numerical value to be retrieved is partitioned into (a) a range extending from said lower limit value to a maximum numerical value of a same digit number as that of said lower limit value, (b) a range extending from a minimum numerical value of a digit number greater than that of said lower limit value by one digit to a maximum value of a digit number smaller than that of said upper limit value by one digit, and (c) a range extending from a minimum numerical value of a same digit number as that of said upper limit value to said upper limit value, while when said lower limit value and said upper limit values differ by one in the digit number, said specific range for the numerical value to be retrieved is partitioned into the aforementioned ranges (a) and (c), and when said lower limit value and said upper limit value are of a same digit number, said specific range is held intact, whereon retrieval of said numerical value is performed in each of said ranges resulted from said partition in parallel or in said specific range held intact.

8. A range-conditional character string retrieving system, comprising range condition collating means for retrieving from a character string composed of symbols expressed in codes and subjected to retrieval a numerical value falling within a specific range by resorting to use of a finite automaton, wherein said range condition collating means includes:

range information storage means for storing state transition conditions for allowing said finite automaton to make state transition to at least one state from each state in terms of upper limit value and lower limit value of coded symbols;

value coincidence decision means for making decision as to coincidence between said character string subjected to retrieval and said state transition conditions; and range condition decision means supplied as input thereto with said character string subjected to retrieval and incorporating a finite automaton function of performing state transitions on the basis of result of decision made by said value coincidence decision means to thereby output result of retrieval.

9. A range-conditional character string retrieving system according to claim 8, wherein said range condition collating means further includes:

retrieval-designated symbol storage means for storing a symbol designated for retrieval and affixed at least in precedence to or in succesion to said numerical value, and symbol coincidence decision means for comparing said character string subjected to retrieval with the output of said retrieval-designated symbol storage means; and wherein said range condition decision means makes state transition on the basis of the results outputted from said value coincidence decision means and said symbol coincidence decision means, respectively.

10. A range-conditional character string retrieving system according to claim 9, wherein at least two of said range information storage means, said value coincidence decision means, said range condition decision means, said retrieval-designated symbol storage means and said coincidence decision means are integrated on one and same chip.

11. A range-conditional character string retrieving system according to claim 9, wherein said range condition collating means includes:

re-decision bit storage means for commanding whether or not collation be again performed on the same character string subjected to retrieval by changing the state transition condition in each of said states; and wherein said range condition decision means performs control of the input of said character string subjected to retrieval and the state transition on the basis of the results of decision made by said value coincidence decision means and said coincidence decision means and the output of said re-decision bit storage means.

12. A range-conditional character string retrieving system according to claim 11, wherein at least two of said range information storage means, said value coincidence decision means, said range condition decision means, said retrieval-designated symbol storage means, said coincidence decision means and said re-decision bit storage means are integrated on one and same chip.

13. A range-conditional character string retrieving system according to claim 8, wherein said value coincidence decision means incorporated in said range condition collating means includes:

a plurality of value coincidence detecting comparators for comparing said character string subjected to retrieval with a plurality of range data read out from said range information storage means, respectively; and a plurality of range deciding circuits for deciding on the basis of the results of given two of said value coincidence detecting comparators that the code of said character string subjected to retrieval has a greater value than that of the range data inputted to one of said two value coincidence comparators and smaller than that of the range data inputted to the other of said two value coincidence comparators.

14. A range-conditional character string retrieving system according to claim 8, wherein said range-conditional character string retrieving system is externally supplied as input thereto with retrieval control information conforming to said range condition and performs retrieval of the numerical values within the specific range from character string storage means storing said character string subjected to retrieval.

15. A range-conditional character string retrieving system, comprising range condition collating means for retrieving from a character string composed of symbols expressed in codes and subjected to retrieval a numerical value falling within a specific range by resorting to use of a finite automaton, wherein when said finite automaton makes state transition from a predetermined state to at least two states in accordance with the result of collation of said character string subjected to retrieval, said range condition collating means including means for designating conditions for said state transitions in terms of ranges of the codes of said symbols.

16. A range-conditional character string retrieving system, comprising range condition collating means for retrieving from a character string composed of symbols expressed in codes and subjected to retrieval a character falling within a specific range by resorting to use of a finite automaton, wherein when said finite automaton makes state transition from a predetermined state to at least two states in accordance with the result of coilation of said character string subjected to retrieval, said range condition collating means including means for designating conditions for said state transitions in terms of ranges of the codes of said symbols.

17. A method of retrieving from a character string composed of symbols expressed in codes and subjected to retrieval a numerical value or a character falling within a specific range by using a finite automaton, comprising:

a step in which when said finite automaton makes state transition from a predetermined state to at least more than one state in accordance with result of collation of said character string, conditions for said state transitions are stored in terms of ranges of respective codes of the symbols;

a step of reading out the conditions for state transition corresponding to the state of said finite automaton;

a step of comparing said conditions for state transitions with the character to be retrieved; and a step of determining destination state for transition on the basis of result of said comparison.

18. A range-conditional character string retrieving system according to claim 17, wherein said range decision means of said range condition collating means is constituted by a microcomputer.

19. A range-conditional character string retrieving system according to claim 17, wherein said range decision means of said range condition collating means is composed of a finite automaton.

20. A range-conditional character string retrieving system according to claim 17, wherein said range-conditional character string retrieving system is externally supplied with retrieval control information related to a part of a numeric character string representing said numerical value and performs retrieval of said numerical value from character string storage means storing said character string subjected to retrieval.

21. A range-conditional character string retrieving system, comprising range condition collating means for retrieving from a character string subjected to retrieval and composed of symbols expressed in a code a numerical value lying within a specific range, wherein said range condition collating means includes:

numerical value detecting means for detecting a numerical value from said character string subjected to retrieval; and range decision means for deciding whether or not the numerical value detected by said numerical value detecting means lies within said specific range.

22. A range-conditional character string retrieving system according to claim 21, wherein said range condition collating means includes numerical value storage means for buffering the numerical value detected by said numerical value detecting means.

23. A range-conditional character string retrieving system according to claim 21, wherein said range condition collating means includes binary conversion means for converting character code of the numerical value detected by said numerical value detecting means into binary code.

24. A range-conditional character string retrieving system, comprising:

character string collating means for searching a specific character string from a character string composed of symbols expressed in codes and subjected to retrieval; and range condition collating means for detecting a numerical value falling within a specific range from said specific character string;

wherein said character string collating means includes:

first communication means for transmitting a signal indicating detection of said specific character to said range condition collating means; and wherein said range condition collating means includes:

second communication means for transmitting a signal indicating detection of a numerical value falling within said specific range to said character string collating means.

25. A range-conditional character string retrieving system, comprising:

character string collating means for searching a specific character string from a character string composed of symbols expressed in codes and subjected to retrieval;

range condition collating means for detecting a numerical value falling within a specific range from said specific character string; and synchronizing means for establishing synchronism between said character string collating means and said range condition collating means.

26. A range-conditional character string retrieving system comprising:

character string collating means for searching a specific character string from a character string composed of symbols expressed in codes and subjected to retrieval; and range condition collating means for detecting a numerical value falling within a specific range from said specific character string wherein said character string collating means is externally supplied with retrieval control information for a character string part, while said range condition collating means is supplied with retrieval control information for a numerical value part, wherein the value within said specific range is retrieved from character string storage means storing said character string subjected to retrieval.

27. A method of retrieving from a character string composed of symbols expressed in codes and subjected to retrieval a numerical value falling within a specific range, comprising the steps of:

judging an end of a numerical value upon detection of an interruption in a continuous numeric value, and detecting a numerical value upon detection of a punctuation for discriminating the numerical value from a succeeding one;

buffering said numerical value and said punctuation; and reading out said buffered numerical value to said punctuation to judge whether said numerical value falls within the range.

28. A numerical value retrieving system according to claim 27; further comprising:

synchronizing means for establishing a synchronism between timing of said range condition collating means for receiving a signal of retrieval of the specific character string outputted from said character string collating means through said first communication means and timing for starting collation of a numerical value following said specific character string so that both said character string collating means and range condition collating means collate said character string in synchronism with each other by each character of said character string.

29. A numerical value retrieving system, comprising:

character string collating means for retrieving a specific character string from character stings composed of symbols expressed in codes and subjected to retrieval;

range condition collating means for retrieving a numerical value falling within a specific range from said specific character string;

first communication means for transmitting a signal indicating retrieval of said specific character string to said range condition collating means; and wherein said character string collating means activates said range condition collating means by said first communication means on retrieval of a specific character string while retrieving a numerical value following a specific character string, and said range condition collating means retrieves information indicating whether said retrieved numerical value following said specific character string falls within said specific range.

30. A numerical value retrieving system, comprising:

character string collating means for retrieving a specific character string from character stings composed of symbols expressed in codes and subjected to retrieval;

range condition collating means for retrieving a numerical value falling within a specific range said character stings;

first communication means for transmitting a signal indicating retrieval of said numerical value falling within said specific range to said character string collating means; and wherein said range condition collating means activates said character string collating means on retrieval of said numerical value falling within said specific range by said first communication means while retrieving a character string including said specific character string following a numerical value, and said character string collating means retrieves information indicating whether said retrieved character string following said specific numerical value falling within said specific range is said specific numerical value.

31. A numerical value retrieving system according to claim 30, further comprising:

synchronizing means for establishing a synchronism between timing of said character string collating means for receiving a signal of retrieval of a numerical value falling within a specific range outputted from said range condition collating means through said second communication means and timing for starting collation of a character string following a numerical value falling within a specific range so that both said character string collating means and said range condition collating means collate said character string in synchronism with each other by each character of said character string.

32. A numerical value retrieving system, comprising:

character string collating means for retrieving a specific character string from character stings composed of symbols expressed in codes and subjected to retrieval;

range condition collating means for retrieving a numerical value falling within a specific range from said character stings subjected to retrieval;

first communication means for transmitting a signal of retrieval of said specific character string to said range condition collating means;

second communication means for transmitting a signal of retrieval of said numerical value falling within said specific range to said character string collating means; and wherein said character string collating means activates said range condition collating means by said first communication means on retrieval of a first character string while retrieving a numerical value following said first character string and a character string including a second character string following said numerical value, said range condition collating means retrieves information indicating whether said retrieved numerical value following said first character string falls within said range and activates said character string collating means by said second communication means when said numerical value falls within said range, and said character string collating means retrieves information indicating whether said retrieved character string following said numerical value falling within said specific range is said second character string.

33. A numerical value retrieving system according to claim 32, further comprising:

synchronizing means for establishing a synchronism between timing of said range condition collating means for receiving a signal of retrieval of said first character string outputted from said character string collating means through said first communication means and a retrieval start timing of a numerical value following said first character string, and between timing of said character string collating means for receiving a signal of retrieval of a numerical value falling within said specific range outputted from said range condition collating means through said second communication means and a start timing for retrieving a character string following a numerical value falling within a specific range so that both said character string collating means and said range condition collating means collate said character string in synchronism with each other by each character of said character string.

34. A method of retrieving from a character string composed of symbols expressed in codes and subjected to retrieval a numerical value falling within a specific range, comprising at least any one of the following steps:

retrieving a specific character string and retrieving information indicating whether a numerical value following said retrieved specific character string is said numerical value falling within said specific range while retrieving a numerical value following said specific character string;

retrieving said numerical value falling within a specific range while retrieving a character string including a character string following a numerical value, and retrieving information indicating whether a character string following a numerical value falling within a retrieved specific range is said specific character string; and retrieving said first character string while retrieving a character string including a numerical value following said first character string and a characters string including a second character string following said numerical value, and retrieving information indicating whether said numerical value following said first characters string is said numerical value falling within said specific range, and retrieving information indicating whether said character string following said numerical value falling within said specific range is said second character string.

* * * * *